(12) United States Patent
Ingram-Tedd et al.

(10) Patent No.: US 11,377,309 B2
(45) Date of Patent: Jul. 5, 2022

(54) TRANSPORTING DEVICE, STORAGE SYSTEM AND METHOD OF RELOCATING A TRANSPORTING DEVICE

(71) Applicant: OCADO INNOVATION LIMITED, Hatfield (GB)

(72) Inventors: Andrew John Ingram-Tedd, Hatfield (GB); David Sharp, Hatfield (GB); Joseph Zammit, Hatfield (GB); Ben Thomas, Hatfield (GB); Sean Clark, Hatfield (GB); Graham Deacon, Hatfield (GB)

(73) Assignee: OCADO INNOVATION LIMITED, Herts (GB)

( * ) Notice: Subject to any disclaimer, the term of this patent is extended or adjusted under 35 U.S.C. 154(b) by 170 days.

(21) Appl. No.: 16/753,656

(22) PCT Filed: Oct. 3, 2018

(86) PCT No.: PCT/EP2018/076928
§ 371 (c)(1),
(2) Date: Apr. 3, 2020

(87) PCT Pub. No.: WO2019/068775
PCT Pub. Date: Apr. 11, 2019

(65) Prior Publication Data
US 2020/0324971 A1    Oct. 15, 2020

(30) Foreign Application Priority Data

Oct. 4, 2017   (GB) ...................... 1716204

(51) Int. Cl.
*B65G 54/02*   (2006.01)
*B65G 1/04*    (2006.01)
(Continued)

(52) U.S. Cl.
CPC .............. *B65G 54/02* (2013.01); *B65G 1/04* (2013.01); *B65G 1/0478* (2013.01); *B65G 1/065* (2013.01);
(Continued)

(58) Field of Classification Search
CPC .............................. B65G 35/06; B65G 54/02
See application file for complete search history.

(56) References Cited

U.S. PATENT DOCUMENTS 2,701,065 A    2/1955  Bertel
3,273,727 A *  9/1966  Rogers ................. B65G 23/00
                                                180/125
(Continued)

FOREIGN PATENT DOCUMENTS

CN    1113205 A    12/1995
CN    1884013 A    12/2006
(Continued)

OTHER PUBLICATIONS

First Office Action dated Jun. 22, 2021, by the Japanese Patent Office in corresponding Japanese Patent Application No. 2020-519304, and an English Translation of the Office Action. (12 pages).

(Continued)

*Primary Examiner* — Thomas Randazzo
(74) *Attorney, Agent, or Firm* — Buchanan Ingersoll & Rooney PC

(57) ABSTRACT

A storage system as disclosed can maximize storage capacity whilst remaining scalable. A transporting device is arranged to form a cluster with a reconfigurable physical topology. A transporting device can cooperate with a portion of a surface, and with at least one other transporting device in a cluster with a reconfigurable physical topology. An item receiving space and a relocating unit permit relocation of the
(Continued)

transporting device within the cluster by way of interaction with the portion of the surface.

25 Claims, 43 Drawing Sheets

(51) Int. Cl.
*B65G 1/137* (2006.01)
*B65G 1/06* (2006.01)
*B65G 35/06* (2006.01)
*B65G 1/10* (2006.01)

(52) U.S. Cl.
CPC ............... *B65G 1/10* (2013.01); *B65G 1/137* (2013.01); *B65G 1/1371* (2013.01); *B65G 35/06* (2013.01); *B65G 2203/0266* (2013.01); *B65G 2203/0283* (2013.01)

(56) References Cited

U.S. PATENT DOCUMENTS

| | | | |
|---|---|---|---|
| 8,725,287 | B2 | 5/2014 | Lindblom |
| 10,822,166 | B2 | 11/2020 | Ingram-Tedd et al. |
| 2008/0211358 | A1* | 9/2008 | Borgwarth ........... B65G 1/0478 312/35 |
| 2013/0006412 | A1 | 1/2013 | Lindblom |
| 2013/0034410 | A1* | 2/2013 | Heise ..................... B65G 1/137 414/222.13 |
| 2013/0302132 | A1 | 11/2013 | D'Andrea et al. |
| 2016/0340125 | A1* | 11/2016 | Møller ................. B65G 39/025 |
| 2017/0108522 | A1* | 4/2017 | Baer ....................... B65G 54/02 |
| 2017/0355489 | A1* | 12/2017 | Moore ............... B65D 21/0224 |
| 2018/0075402 | A1 | 3/2018 | Stadie et al. |
| 2018/0162639 | A1 | 6/2018 | Ingram-Tedd et al. |
| 2018/0229947 | A1* | 8/2018 | Feyrer .................... G03B 21/64 |
| 2018/0276606 | A1 | 9/2018 | Stadie et al. |
| 2018/0276607 | A1 | 9/2018 | Stadie et al. |
| 2018/0276608 | A1 | 9/2018 | Stadie et al. |
| 2019/0018027 | A1* | 1/2019 | Hoehnel .......... G01N 35/00722 |
| 2019/0152724 | A1* | 5/2019 | Philipp .................. G01G 19/22 |
| 2020/0247611 | A1 | 8/2020 | Sharp et al. |
| 2020/0324971 | A1 | 10/2020 | Ingram-Tedd et al. |
| 2020/0407160 | A1 | 12/2020 | Ingram-Tedd et al. |

FOREIGN PATENT DOCUMENTS

| | | | |
|---|---|---|---|
| CN | 102803100 | A | 11/2012 |
| CN | 104386400 | A | 3/2015 |
| DE | 19925157 | A1 | 1/2001 |
| EP | 0767113 | A2 | 4/1997 |
| EP | 1037828 | B1 | 9/2003 |
| EP | 3692427 | A1 | 8/2020 |
| GB | 2520104 | A | 5/2015 |
| GB | 201716201 | | 11/2017 |
| JP | S 61-104985 | A | 5/1986 |
| JP | S63310462 | A | 12/1988 |
| JP | H 4-105007 | U | 9/1992 |
| JP | H04105007 | U | 9/1992 |
| JP | H0664747 | U | 8/1994 |
| JP | H 06211306 | A | 8/1994 |
| JP | 2557985 | Y2 | 12/1997 |
| JP | 2016-141323 | A | 8/2016 |
| JP | 2016160040 | A | 9/2016 |
| JP | 2016160040 | A * | 9/2016 ............ B65G 54/02 |
| JP | 2017-518940 | A | 7/2017 |
| JP | 2018-520965 | A | 8/2018 |
| NO | 317366 | B1 | 10/2004 |
| WO | 2015185628 | A2 | 12/2015 |
| WO | 2016166294 | A1 | 10/2016 |
| WO | 2017129384 | A1 | 8/2017 |
| WO | 2017144054 | A1 | 8/2017 |
| WO | 2019068778 | A1 | 4/2019 |

OTHER PUBLICATIONS

Office Action (Notification of Reason for Refusal) dated Jun. 10, 2021, by the Korean Patent Office in corresponding Korean Patent Application No. 10-2020-7012079, and an English Translation of the Office Action. (31 pages).

Office Action (Notification of Reason for Refusal) dated Jun. 24, 2021, by the Korean Patent Office in corresponding Korean Patent Application No. 10-2020-7010513, and an English Translation of the Office Action. (6 pages).

International Search Report (PCT/ISA/210) dated Jan. 11, 2019, by the European Patent Office as the International Searching Authority for International Application No. PCT/EP2018/076933.

Written Opinion (PCT/ISA/237) dated Jan. 11, 2019, by the European Patent Office as the International Searching Authority for International Application No. PCT/EP2018/076933.

The Examiner's attention is directed to co-pending US application, U.S. Appl. No. 16/753,626, filed Apr. 3, 2020.

Office Action dated May 31, 2021, by the Canadian Patent Office in corresponding Canadian Patent Application No. 3,077,121. (4 pages).

First Office Action dated Jun. 22, 2021, by the Japanese Patent Office in corresponding Japanese Patent Application No. 2020-519409, and an English Translation of the Office Action. (13 pages).

Office Action dated Oct. 20, 2021, by the Chinese Patent Office in corresponding Chinese Patent Application No. 201880078465.5. (7 pages).

First Office Action dated Mar. 25, 2021, by the Chinese Patent Office in corresponding Chinese Patent Application No. 201880078465. 5, and an English Translation of the Office Action. (34 pages).

Office Action (Examination Report) dated Mar. 23, 2021, by the Great Britain Patent Office in corresponding Great Britain Patent Application No. GB1816154.7. (2 pages).

International Search Report and Written Opinion issued in International Patent Application No. PCT/EP2018/076928, 20 pages (dated Jan. 22, 2019).

First Office Action dated Feb. 22, 2022, by the Japanese Patent Office in corresponding Japanese Patent Application No. 2020-519304, and an English Translation of the Office Action. (12 pages).

\* cited by examiner

TRANSPORTING DEVICE, STORAGE SYSTEM AND METHOD OF RELOCATING A TRANSPORTING DEVICE

This application claims priority from UK Patent Application No. 1716204.1 filed 4 Oct. 2017, the content of all of this application hereby being incorporated by reference.

TECHNICAL FIELD

The present invention relates generally to the field of robotic storage systems and more specifically to transporting devices which are arranged to form a cluster with a reconfigurable physical topology. The present invention further provides a method of relocating a transporting device.

BACKGROUND

Some commercial and industrial activities require systems which enable the storage and retrieval of a large number of different products which may be stored in containers. Methods of handling containers stacked in rows have been well known for decades. In some such systems, for example as disclosed in U.S. Pat. No. 2,701,065 (Bertel), free-standing stacks of containers are arranged in rows in order to reduce the storage volume associated with storing such containers, but yet still providing access to a specific container if required. Access to a given container is made possible by providing relatively complicated hoisting mechanisms that can be used to stack and remove given containers from stacks. The costs of such systems are, however, impractical in many situations and they have mainly been commercialised for the storage and handling of large shipping containers.

The concept of using freestanding stacks of containers and providing a mechanism to retrieve and store specific containers has been developed further, for example as disclosed in European patent no. 0 767 113 (Cimcorp). This document discloses a mechanism for removing a plurality of stacked containers, using a robotic load handler in the form of a rectangular tube that is lowered around the stack of containers, and which is configured to be able to grip a container at any level in the stack. In this way, several containers can be lifted at once from a stack. The rectangular tube can be used to move several containers from the top of one stack to the top of another stack, or to move containers from a stack to an external location and vice versa. Such systems can be particularly useful where all of the containers in a single stack contain the same product. Such stacks are known as a single-product stacks. In the system disclosed in European patent no. 0 767 113, the height of the tube has to be at least as high as the height of the largest stack of containers, so that that the highest stack of containers can be extracted in a single operation. Accordingly, when used in an enclosed space such as a warehouse, the maximum height of the stacks is restricted by the need to accommodate the tube of the robotic load handler above the stack.

One known type of system for the storage and retrieval of items in multiple product lines involves arranging storage bins or containers in stacks on top of one another, the stacks being arranged in rows. The storage bins are removed from the stacks and accessed from above by robotic load handling devices, removing the need for aisles between the rows and allowing more containers to be stored in a given space.

European patent no. 1 037 828 (Autostore) discloses a system in which stacks of containers are arranged within a frame structure. Robotic load handling devices can be controllably moved around the stack on a system of tracks on the uppermost surface of the stack. Other forms of robotic load handling device are further disclosed in, for example, Norwegian patent no. 3 173 66.

UK patent publication no. 2 520 104 (Ocado Innovation Limited) discloses a robotic load handling device where each robotic load handler only covers one grid space, thus allowing higher density of robotic load handlers and thus higher throughput of a given size system. However, any suitable form of load handling device can be used.

However, each of the known robotic storage systems described above possess one or more of the following drawbacks. In all examples, a peripheral frame structure is required above/around the stacks of storage bins. The frame structure supports robotic load handlers traversing on top of the frame structure above the stacks of storage bins. The use of such a frame structure reduces the density at which storage bins may be stored because space is consumed by the frame structure. Moreover, such a frame structure isn't dynamically scalable because the frame structure must be constructed to accommodate the maximum anticipated capacity, even if such capacity is uncertain or in the far future.

Additionally, the robotic load handlers also have to "dig" down into a stack of storage bins in order to retrieve a selected storage bin, which represents a time and energy overhead when retrieving a storage bin. It also follows that the systems described above requires robotic load handlers, which represent an additional cost of the system.

Furthermore, when coordinating such a system, positive progress by a robotic load hander from a start location to a destination location typically requires the robotic load handler to undertake a number of unnecessary, unproductive and/or costly steps, such as avoiding other robotic load handling devices using route planning and/or collision avoidance. Also, when a storage bin becomes stuck in a stack of storage bins, it is difficult to recover storage bins beneath the stuck storage bin. Similarly, when a robotic load handler breaks down, access to storage bins below the robotic load handler is restricted until the robotic load handler is removed from its location above the stack of storage bins. Additionally, it may be difficult to recover a robotic load handler when it breaks down.

SUMMARY

In view of the problems in known storage systems, the present invention aims to provide a storage system which maximises the storage capacity of the storage system whilst remaining scalable and avoiding the above mentioned problems concerning robotic load handlers.

According to the present invention there is provided a transporting device arranged to cooperate with a portion of a surface. The transporting device is arranged to cooperate with at least one other transporting device in a cluster with a reconfigurable physical topology. The transporting device comprises an item receiving space and a relocating unit arranged to permit relocation of the transporting device within the cluster by way of interaction with the portion of the surface.

The present invention also provides a storage system comprising a surface and a plurality of transporting devices. Each transporting device is as previously described and arranged to cooperate with a portion of the surface. Moreover, the plurality of transporting devices are arranged in a three-dimensional cluster with a reconfigurable physical topology.

The present invention also provides a transporting device arranged to cooperate with at least one other transporting device in a cluster with a reconfigurable physical topology. The transporting device comprises an item receiving space and a relocating unit arranged to permit relocation of the transporting device within the cluster by way of interaction with the at least one other transporting device.

The present invention also provides a storage system comprising a plurality of transporting devices, wherein each transporting device is as previously described. Moreover, the plurality of transporting devices are arranged in a three-dimensional cluster with a reconfigurable physical topology.

The present invention also provides a warehouse comprising a storage system as previously described.

The present invention also provides a vehicle comprising a storage system as previously described.

The present invention also provides a zero-gravity or low-gravity environment comprising a storage system as previously described.

The present invention also provides a method of relocating a transporting device arranged in a cluster with a reconfigurable physical topology. The method comprises the steps of causing the transporting device to cooperate with a portion of a surface and relocating the transporting device within the cluster by way of interaction between the transporting device and the portion of the surface.

The present invention also provides a method of relocating a transporting device arranged in a cluster with a reconfigurable physical topology. The method comprises the steps of causing the transporting device to cooperate with at least one other transporting device in the cluster and relocating the transporting device within the cluster by way of interaction between the transporting device and the at least one other transporting device.

The features disclosed herein provide a number of advantages, for example by providing a cluster comprising a number of transporting devices the use of robotic load handlers traversing a frame structure is thereby avoided.

In this way, the associated time penalties and expenses of existing storage systems are avoided. Moreover, the speed, density and efficiency of the apparatus and method of the present invention is greater than existing systems. Additionally, the apparatus and method disclosed herein mitigates access problems where a transporting device becomes stuck/fail. Furthermore, collisions of robotic load handling devices are obviated and the apparatus and method supports the ejection of faulty transporting devices from the cluster. Moreover, such a system is scalable by the addition of further transporting devices to the cluster with a reduced need for infrastructure to support the further transporting devices.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
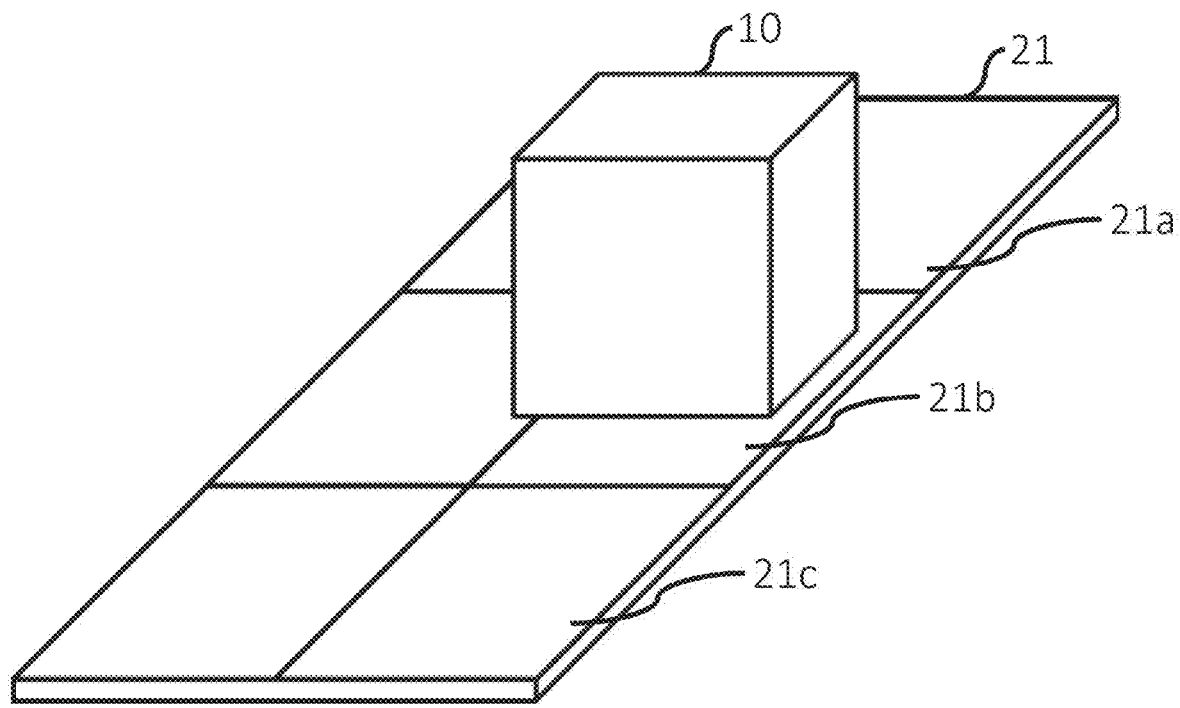
FIG. 1 is a schematic diagram of a storage system according to a first embodiment of the present invention.

FIG. 1 depicts a storage system according to a first embodiment of the present invention. In particular, the storage system comprises a transporting device 10 and a surface 21. The transporting device 10 is arranged to cooperate with a portion of the surface 21 to thereby move/be moved across the surface 21.

Although not shown in FIG. 1, the transporting device 10 may cooperate with other transporting devices 10 so as to form a cluster of transporting devices, the cluster having a reconfigurable physical topology.

Although shown as being underneath the transporting device 10, the surface 21 may be instead be arranged adjacent to any surface of the transporting device 10, for example to the side or above the transporting device 10. Moreover, more than one surface 21 may be used to move the transporting device 10 in more than one dimension. For example, one surface 21 arranged underneath the transporting device 10 and another surface 21 arranged on one side of the transporting device 10 as a wall permits the movement of the transporting device 10 in any orthogonal direction to reconfigure the location of the transporting device 10.

The surface 21 may comprise individual cells 21a, 21b, 21c, where the transporting device 21 cooperates with at least one cell at any moment. In this way, the transporting device 10 may move from cell to cell across the surface 21. For example, the transporting device 10 may be moved from cell 21b to cell 21a to reconfigure the physical topology of a cluster comprising a plurality of transporting devices 10. In this way, the transporting device 10 may be added to or removed from a cluster.

Figure 2A:
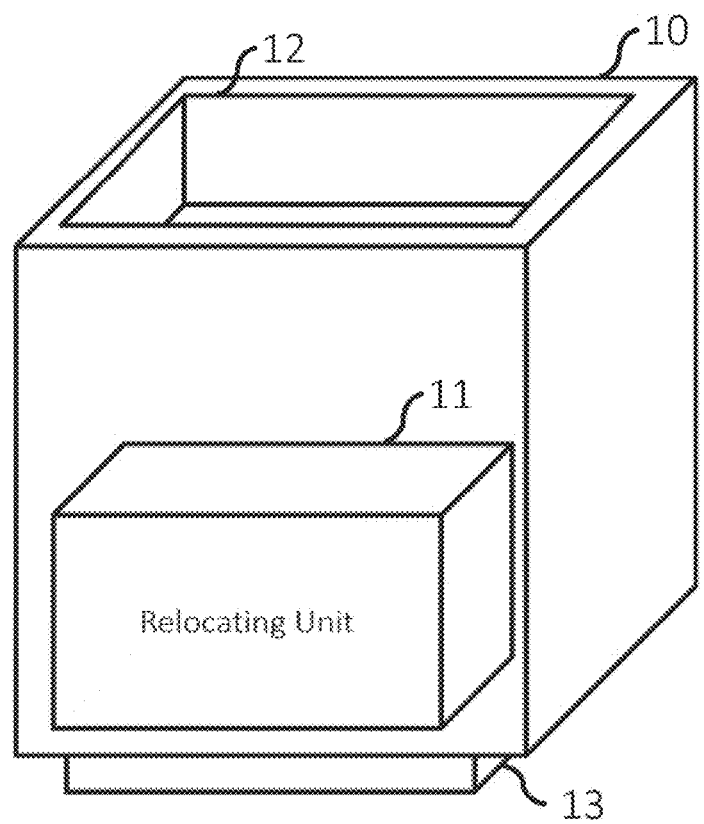
FIGS. 2a and 2b are schematic diagrams of a transporting device according to a first embodiment of the present invention.
Figure 2B:
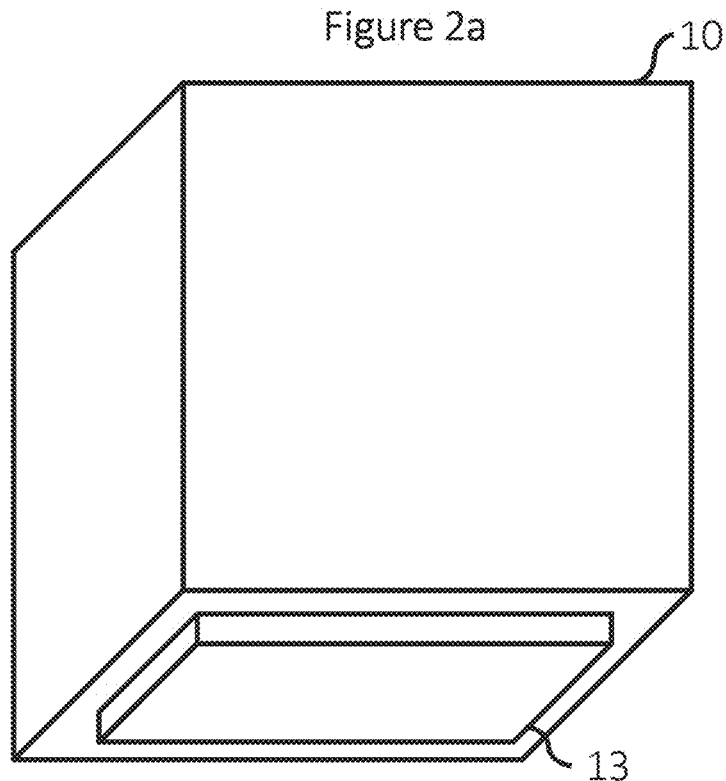

FIGS. 2a and 2b show further detail of a transporting device 10 according to the first embodiment of the present invention. FIG. 2a shows the transporting device 10 from one viewing angle whilst FIG. 2b shows the transporting device 10 from another viewing angle. Although the transporting device 10 is depicted as a cuboid it will be appreciated that any shape and/or size of transporting device 10 is envisaged. Preferably the transporting devices 10 tessellate so as to form a high density cluster when combined with other transporting devices 10. In this way storage density is maximised.

The transporting device 10 comprises a relocating unit 11 and an item receiving space 12. The relocating unit 11 is arranged to permit the relocation of the position of the transporting device 10 on the surface 21. The relocating unit 11 achieves this by way of interaction with at least a portion of the surface 21, for example, with a cell 21b of the surface 21. It is envisaged that the relocating unit 11 may be implemented in a number of ways involving mechanisms which are located inside the transporting device 10 and/or which are located on a face of the transporting device 10. For example, the relocating unit 11 may be implemented using mechanical mechanisms such as wheels, cogs, gears, rack and pinions etc. Additionally or alternatively by way of magnetic mechanisms such as permanent magnets, materials of predetermined magnetic permeability, arrays of magnets etc. Additionally or alternatively by way of electromagnetic mechanisms, for example using planar motors and/or linear electric motors. Other mechanisms are envisaged such as non-contact mechanisms in which the transporting device 10 and the surface 21 do not contact which thereby minimises friction experienced by the transporting device 10.

The transporting device 10 further comprises an item receiving space 12. The item receiving space is envisaged to be a void in the transporting device 10 arranged to receive an item. In this way, the transporting device 10 may be arranged to store an item. For example, the item receiving space 12 may be a location of the transporting device 10 arranged to hold products until they are to be packed and shipped as part of an order placed by a customer. Alternatively, the item receiving space 12 may be arranged to contain items for an inventory system.

Optionally, as depicted in FIGS. 2a and 2b, the transporting device 10 may further comprise an engagement unit 13. The engagement unit 13 may be arranged to engage the transporting device 10 with at least one other transporting device 10. In the example shown in FIGS. 2a and 2b the engagement unit 13 comprises a protrusion of the transporting device 10 arrange to releasably engage with the item receiving space 12 of another transporting device 10. In this way, a cluster of transporting devices 10 may be stably stacked one on top of each other without risk of collapse of the stack. In particular, the engagement unit 13 is arranged to ensure that transporting devices are correctly and accurately located on the surface 21. Although a protrusion is depicted in FIGS. 2a and 2b other way of implementing the engagement unit 13 such as spikes, magnets or other locating means to reliably locate one transporting device 10 relative to another transporting device 10.

Figure 3:
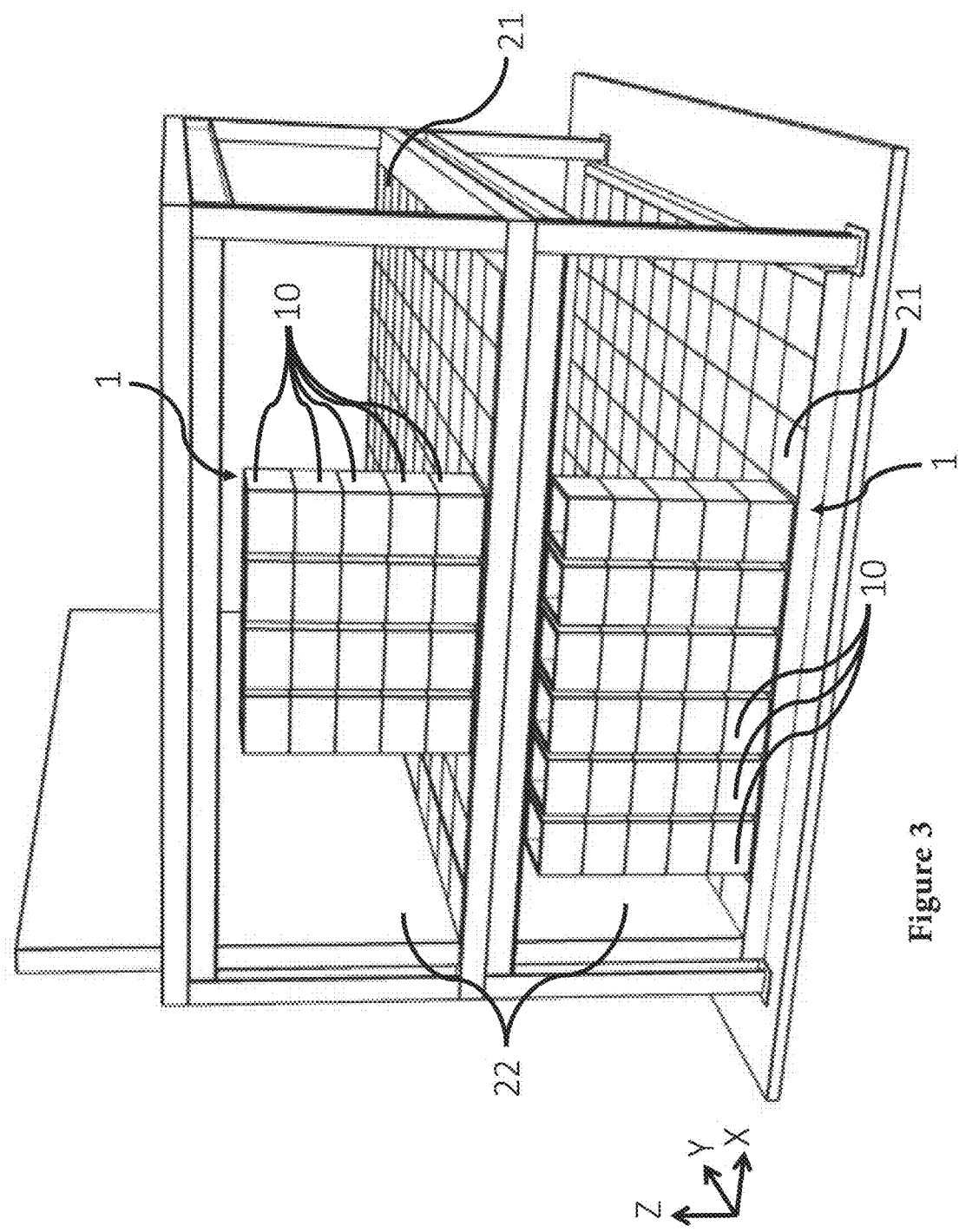
FIG. 3 shows a storage system according to the first embodiment of the present invention where transporting devices are formed into clusters with a reconfigurable physical topology.

FIG. 3 shows a storage system according to the first embodiment of the present invention. The storage system shown in FIG. 3 is similar to that shown in FIG. 1 but with further optional features beyond a transporting device 10 and a surface 21. In the example shown in FIG. 3, the storage system comprises two levels each comprising separate clusters 1 of transporting devices 10. This is shown by way of example only and a storage system may comprise any number of levels. Each level may comprise any number of clusters of transporting devices 10. Moreover, each level of the storage system comprise a surface 21 (referred to as a first surface 21) acting as a floor of each level of the storage system. Additionally, each level of the storage system optionally comprises an additional surface 22 (known as the second surface 22) arranged orthogonal to the first surface 21. By adding the second surface 22 orthogonal to the first surface 21 then transporting devices 10 may be moved in all three ordinal directions by way of cooperation between the transporting device 10 and each surface. For example, each surface may comprise mechanisms which may act upon each transporting device 10 or each stack of transporting devices 10 or each cluster of transporting devices 10 to move the transporting devices 10 in a direction. Examples of mechanisms to achieve such effects will be described later.

Any given level of the storage system may comprise a plurality of surfaces 21. Moreover, each surface of the plurality of surfaces may be arranged at different relative heights from the floor of the level. Moreover, each surface may be arranged with a height, length or width which may or may not be a multiple of a height, length or width (respectively) of a transporting device 10. In this way, a cluster 1 may be operated within a space which contains obstacles such as vertical pillars and/or horizontal pipes. Furthermore, the upper limits of the space containing a cluster 1 may be similarly irregular, and any given space may contain or surround fixed or movable obstacles or forbidden area, around which the transporting device 10 can freely move.

FIG. 3 shows one potential arrangement of a cluster 1 transporting devices 10. Broadly, a cluster 1 is two or more transporting devices 10 arranged in close proximity with each other so as to be controlled and rearranged by way of cooperation with the first surface 21 or the second surface 22. By interaction of the cluster 1 with the surface then the location of individual transporting devices 10 in the cluster 1 can be changed and relocated to thereby provide a cluster 1 with a reconfigurable physical topology. It is envisaged that a cluster 1 with a reconfigurable physical topology may be of any size or shape and/or used in any type of environment. Moreover, each transporting device 10 forming the cluster 1 may be of a variety of sizes. Such sizes may (but not necessarily) include transporting devices 10 of differing widths, lengths and/or heights which are multiples of the width, lengths and/or heights (respectively) of the smallest transporting device 10 in the cluster 1. Such a configuration may permit, for example, the storage and/or transportation of items which otherwise be too large or heavy for a smaller transporting device or due to reasons of energy-efficiency or space-efficiency.

In particular, as shown in FIG. 3, two clusters 1 are shown, one on each level of the storage system. In particular, the cluster 1 shown on the lower level of the storage system comprises six stacks of transporting devices 1. The six stacks are arranged aligned along an X-direction. Each stack comprises five transporting devices 10. As will be appreciated this configuration of cluster 1 is given by way of example only. It is envisaged that any size of cluster 1 can be accommodated, in particular any number of transporting devices 10 may be arranged in each of the X-direction, Y-direction and/or Z-direction as long as the surface of the storage system is sized to support that many transporting devices 10. Therefore, for example, the cluster 1 may extend by any number of transporting devices 10 in each of the X-direction, Y-direction and/or Z-direction. Moreover, a cluster 1 may comprise an empty location in which a transporting device 10 may be temporarily moved when the transporting device 10 is to be relocated in the cluster 1. Accordingly, by moving a transporting device 1 into the empty location a new empty location is formed in the cluster 1 at the location now vacated by the transporting device 1. Accordingly, other transporting devices in the cluster 1 may be moved into the empty location causing the empty location to move to another location in the cluster 1. In this step by step manner the cluster can be re-arranged, one transporting device 10 at a time. Alternatively, when the cluster 1 does not occupy the entire space available in a storage system e.g. there is an empty location in one of the ordinate directions then such an empty location is provided by way of the fact that entire space of the storage system is not occupied.

A cluster 1 may be formed as a three dimensional collection of transporting devices 10. In one example, the cluster 1 comprises transporting devices 10 with at least two transporting devices 10 arranged in an X-direction, at least two transporting devices 10 arranged in a Y-direction and at least two transporting devices 10 arranged in a Z-direction.

With regard to control of individual transporting devices 10 within the cluster 1, the surface 21 interacts with a transporting device 10 and/or a stack of transporting devices 10. Such control strategies are addressed in Ocado Innovation Limited UK Patent Application No. GB1716201.7 filed on 4 Oct. 2017 (Ocado Innovation Limited Reference Number 000164 GB), the content of all of this application hereby being incorporated by reference. In this cross-referenced document transporting device 10 is referred to as a transporting vessel and it is envisaged that such terms may be used interchangeably.

A storage system may comprise the cluster 1. In this regard, the cluster 1 may store at least one item. The storage system may further comprise a controller (not shown) arranged to determine a path for a transporting device from a starting location within/on/outside the cluster 1 to a destination location within/on/outside the cluster 1. The controller may be further arranged to transmit a signal to a communication unit to cause a transporting device to move in accordance with the determined path. In this way, the controller may determine the path for a transporting device and cause the transporting device to move along the determined path. As will be appreciated, the controller is arranged to avoid collisions and enable cooperation of transporting devices.

For example, the controller can be configured to evaluate how to improve work allocations, movements of product and placement of product. The controller can be configured to schedule when specific types of movements should happen and in what order they should occur, depending on, for example, the application of various business rules and/or priority. The controller can be configured to determine both inbound and outbound factors in making decisions relative to, for example, product placement. For example, the controller can estimate delivery location of product supply, and estimated outbound delivery of product. The controller can make decisions, and sends signals for execution by an automatic system, and/or can allocate tasks efficiently to humans (pickers, loaders etc.).

The controller can determine which of one or more transporting devices 10 should be involved in the fulfillment of an order or for any other purpose. The action of the one or more transporting devices can typically require the transporting devices to traverse the cluster, and/or to conduct actions, such as support adjacent transporting devices and/or locomote a given transporting device 10. The controller can be configured to analyse various pathways in the cluster to determine one or more paths that are potentially preferential relative to other pathways, given a set of constraints and conditions. These preferential pathways can be provided, one-time, periodically and/or dynamically to the transporting devices 10 to control their movements throughout the cluster and/or roles they perform within the cluster 1.

A path can be preferential for a number of reasons, including, but not limited to: least distance traveled, greater expected average velocity of transporting devices 10, lower probability of encountering traffic (i.e. congestion), less total time required, lower probability of collision, less power used, ease of switching to alternate pathways, ability to avoid obstacles, for example a broken transporting device, a broken path, and/or a part of the path that is under repair.

The controller can use various algorithms to identify, design and/or control the movement of various transporting devices to which it is connected. The controller can be configured to optimise the movement of transporting devices through applying various algorithms to determine potentially advantageous routes from one location to another. The potential advantages can include shorter distance traveled, lower likelihood of encountering congestion, shorter time required, lower power consumption, co-ordination with movements of other transporting devices, routing around obstacles such as broken transporting devices or broken areas of surface, or co-ordination with various workstation operations. In some examples, the controller can be implemented using one or more servers, each containing one or more processors configured to perform one or more sets of instructions stored upon one or more non-transitory computer readable media. Potential advantages for computer implementation include, but are not limited to, scalability, ability to handle large amounts of processing and computational complexity, increased reaction speed, ability to make decisions quickly, ability to conduct complex statistical analysis, ability to conduct machine learning, among others.

The controller may be implemented in any number of ways, for example, the controller may be implemented as a distributed computing system. For example, some or all of the functions of the controller may be distributed to the transporting devices 10 themselves. For example, given respective destinations, transporting devices 10 may communicate with nearby transporting devices 10 in the cluster 1 and with the surface(s) 21 to thereby coordinate/negotiate movements and collaboration in order for each of them to achieve their objective.

FIG. 3 also shows a second cluster 1 on an upper level of the storage system. This cluster 1 is similar to the one on the lower level of the storage system and is controlled in a similar manner. The second cluster is formed of four stacks of transporting devices 10 with each stack comprising five transporting devices 10. As mentioned previously, this is by way of example only and the second cluster 1 may have any number of transporting devices 10 in any of the X-direction, Y-direction or Z-direction.

Figure 4A:
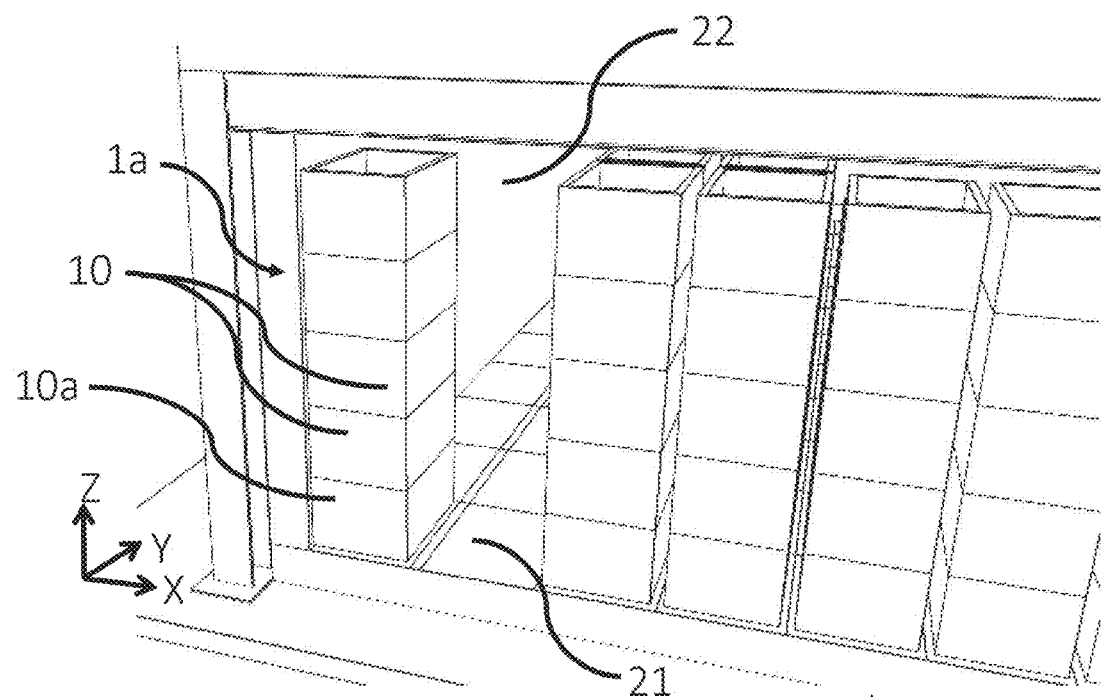
FIGS. 4a and 4b show further detail of a cluster of transporting devices being reconfigured by way of interaction with a surface of the storage system.
Figure 4B:
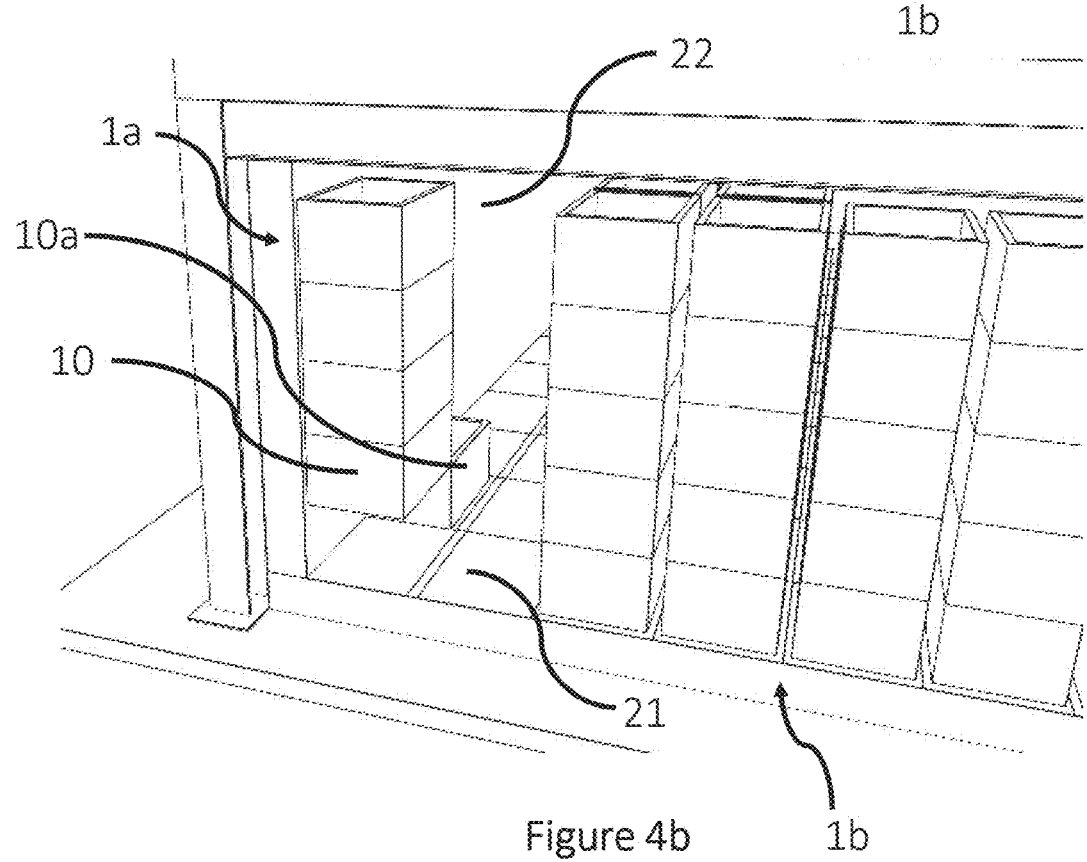

FIGS. 4*a* and 4*b* show an operation performed on a cluster 1 showing the process by which a cluster 1 may be re-arranged and/or have a transporting device 10 removed therefrom. In particular, FIG. 4*a* shows the cluster 1 referred to in FIG. 3 having now split into a first cluster 1*a* and a second cluster 1*b*. To achieve this the cluster 1 has cooperated with the surface 21 to move one stack of the cluster 1 away from the cluster 1. In this way, a first cluster 1*a* and second cluster 1*b* are formed. In this example, to remove an individual transporting device 10 from the first cluster 1*a*, the first cluster 1*a* interacts with the second surface 22. In particular, the first cluster 1*a* is moved away from the second cluster 1*b* by way of interaction with the first surface 21. For example, the first surface 21 may act upon the bottom of the first cluster 1*a* to relocate the stack of transporting devices 10 across a number of cells in an X-direction and Y-direction to bring the stack of transporting devices 10 into close proximity with the second surface 22 from which the second surface 22 and transporting devices 10 of the first cluster 1a can cooperate.

In particular, the second surface 22 can manipulate the transporting devices 10 of the first cluster 1a in a Y-direction and a Z-direction. Therefore, the combination of manipulation by the first surface 21 and second surface 22 can manipulate transporting devices 10 in any of the three ordinate directions.

FIG. 4b shows an example of the physical reconfiguration of the topology of the first cluster 1a by way of interaction of the first surface 21, second surface 22 and transporting devices 10 of the first cluster 1a. In particular, as shown in FIGS. 4a and 4b, when a particular transporting device 10a is to be rearranged within the first cluster 1a or removed from the first cluster 1a entirely the first and second surfaces 21 and 22 cooperate with the transporting devices 10 to achieve the physical topology change. In the example shown in FIG. 4b, particular transporting device 10a has been moved one cell in the Y-direction relative to the first cluster 1a. To achieve this the transporting devices 10 of the first cluster 1a are held securely by the second surface 22. As with the first surface 21 the second surface 22 may be subdivided into cells, each of which may be individually controlled. For example, the second surface 22 may utilise magnetics to hold the transporting devices 10 against the second surface 22. However, other mechanisms may be employed.

However, the cell of the second surface 22 adjacent to the position of the particular transporting device 10a is not activated (or activated differently so as to allow the movement of transporting device 10a in a Y-direction) and hence the particular transporting device 10a is not held against the second surface 22. On the other hand, the cells of the second surface 22 adjacent to the transporting devices 10 (which are located in the first cluster 1a above the particular transporting device 10a) are activated to hold them against the second surface 22. Therefore, the particular transporting device 10a is free to move under action of the first surface 21 whilst the remaining transporting devices 10 of the first cluster 1a are held against the second surface 22. Therefore, the first surface 21 may active to move the particular transporting device 10a one cell in the Y-direction to the achieve the positioning shown in FIG. 4b. Although the above example relates to the Y-direction it will be appreciated that corresponding considerations apply to movement in X-direction or Z-directions.

However, other methods of achieving this movement may be utilised. For example, instead of using the first surface 21 to move the particular transporting device 10a, the second surface 22 may be utilised. For example, when the second surface 22 utilises magnets to effect movement of transporting devices 10 then operation similar to a linear motor may be employed to move transporting devices 10 across the second surface 22. In other words, the particular transporting device 10a is repelled from the cell directly underneath the first cluster 1a and attracted towards a cell in the Y-direction. Although this example has relied upon magnets, it will be appreciated that other mechanisms (such as mechanical mechanisms) may be used to effect the relocation.

In this way, individual transporting devices 10 can be selectively moved, one cell at a time, to reconfigure the physical topology of a cluster 1.

Transporting devices 10 need not move entire cells in one move, instead, partial moves may be made. For example, in the example of FIGS. 4a and 4b, partial moves may be required if the transporting devices 10 utilise the optional engagement unit 13 shown in FIGS. 2a and 2b. In particular, it may be necessary to disengage the engagement unit 13 from the item receiving space 12 before moving the particular transporting device 10a. To achieve this, the transporting devices 10 of the first cluster 1a may be temporarily moved in the Z-direction whilst leaving the particular transporting device 10a stationary. This movement may be just enough to disengage the engagement unit 13 and therefore need not be a full cell movement but rather a partial cell movement. In this way, the engagement unit 13 of the first cluster 1a is disengaged from the item receiving space 12 of the particular transporting device 10a.

Figure 5:
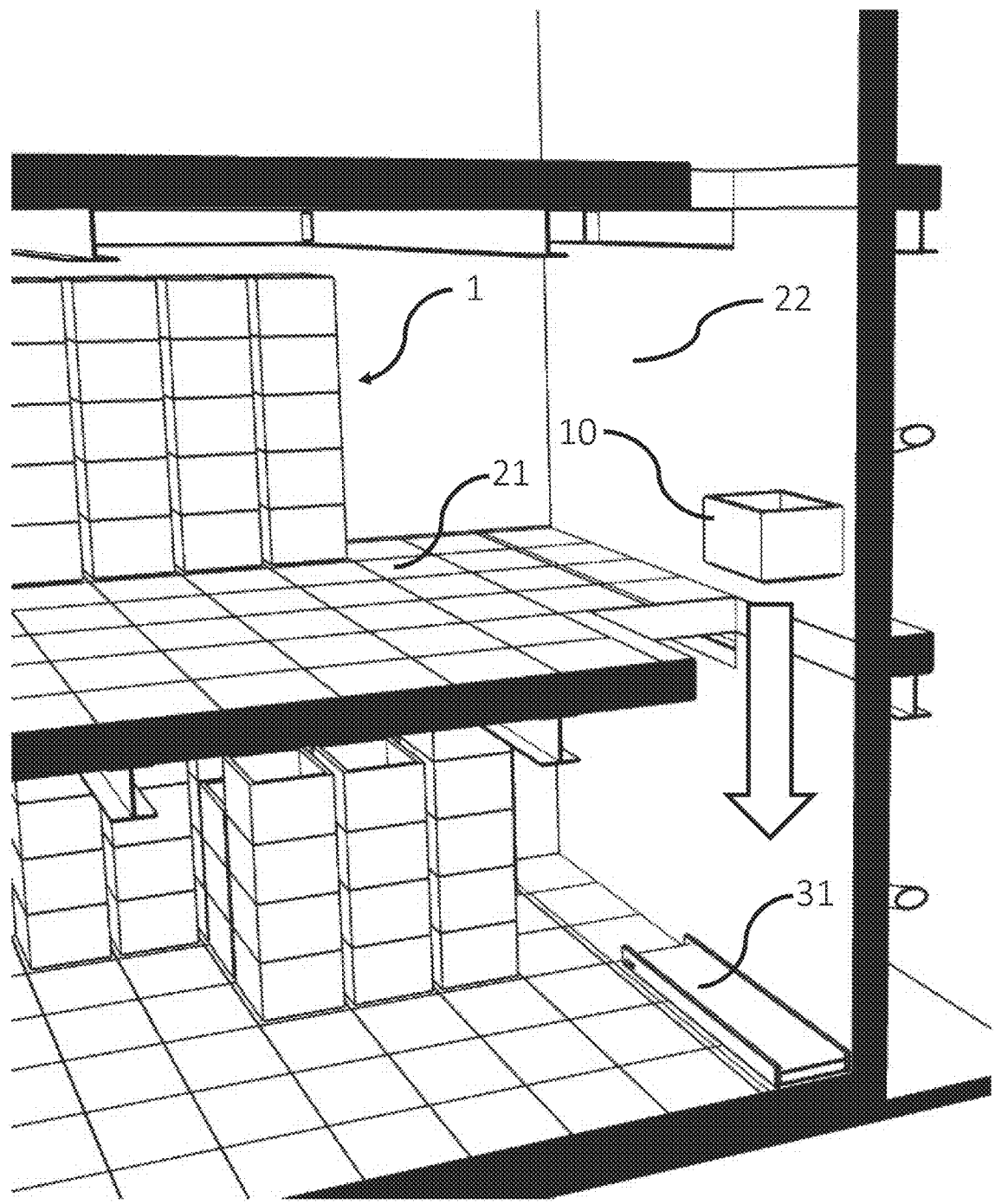
FIG. 5 shows more detail of a two level storage system where a transporting device is moved between levels by way of a surface of the storage system.

FIG. 5 shows an example of peripherals which may be used in conjunction with the storage system described in FIGS. 3, 4a and 4b. As previously described, the storage system comprises at least one level where each level of the storage system may comprise a cluster 1 of transporting devices 10 with a reconfigurable physical topology. In the example shown in FIG. 5, interchange of transporting devices 10 between levels of the storage system may be achieved. This may be useful if each level of the storage system is maintained at different temperatures e.g. groceries which require chilling (such as fresh produce) may be kept chilled and stored on the lower level of the storage system whilst groceries which do not require chilling (such as dry goods) may be kept at an ambient temperature on an upper level of the storage system. In this way, transfer of transporting devices 10 between the levels may need to be effected when an order is ready for dispatch to a customer. For example, a transporting device 10 comprising the ambient products of the customer may be transferred from the upper level to the lower level for dispatch whilst the transporting device 10 comprising the chilled products may be dispatched to the customer directly from the lower level.

To effect the transfer of products from the upper level to the lower level (or vice-versa) FIG. 5 shows an opening (which may be referred to as a via) between the levels to permit the passage of transporting devices 10. To achieve the transfer between the levels the second surface 22 must extend between the levels of the storage system so that control of the transporting devices 10 is maintained across the gap between the levels. Optionally, a level of the storage system may further comprise a conveyance mechanism 31, for example a conveyor belt, to rapidly remove a transporting device 10 from the storage system. Such a conveyance mechanism 31 may be advantageous for rapidly removing transporting devices 10 from the storage system for shipment to a customer.

It is envisaged that the opening between the levels may be used bidirectionally i.e. to move transporting devices 10 from a lower level to an upper level and from an upper level to a lower level. In this way, the effective transfer of items is achieved. For example, the transporting devices 10 may thereby be used to transfer people and/or goods (located in the transporting device 10) from one level of the storage system to another level of the storage system.

Figure 6A:
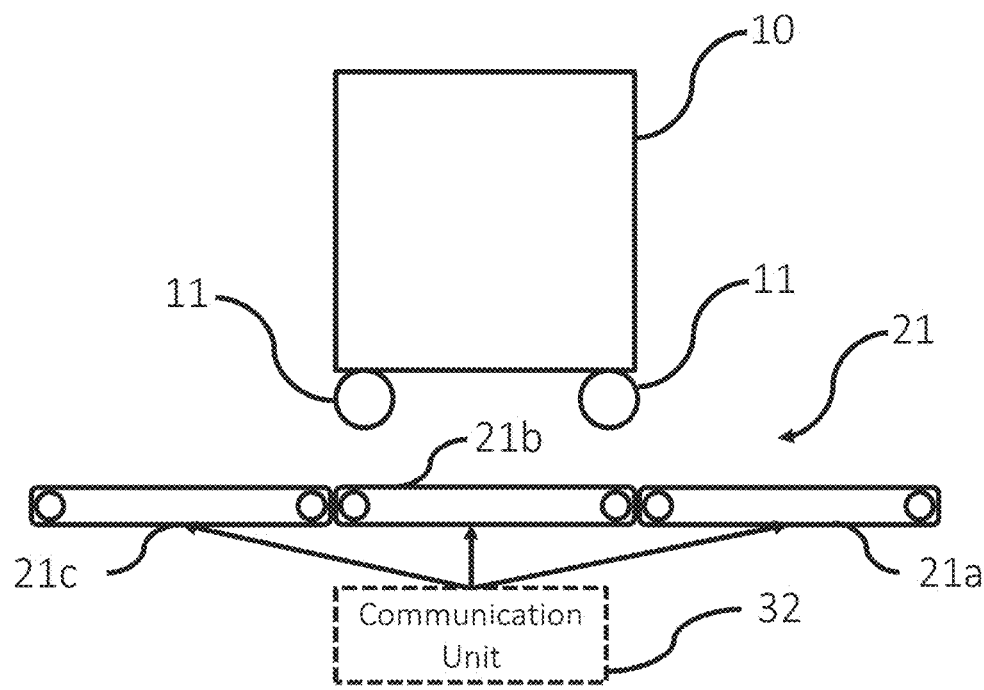
FIGS. 6a and 6b show different examples of implementing a relocating unit in a transporting device and different examples of implementing a surface of the storage system.
Figure 6B:
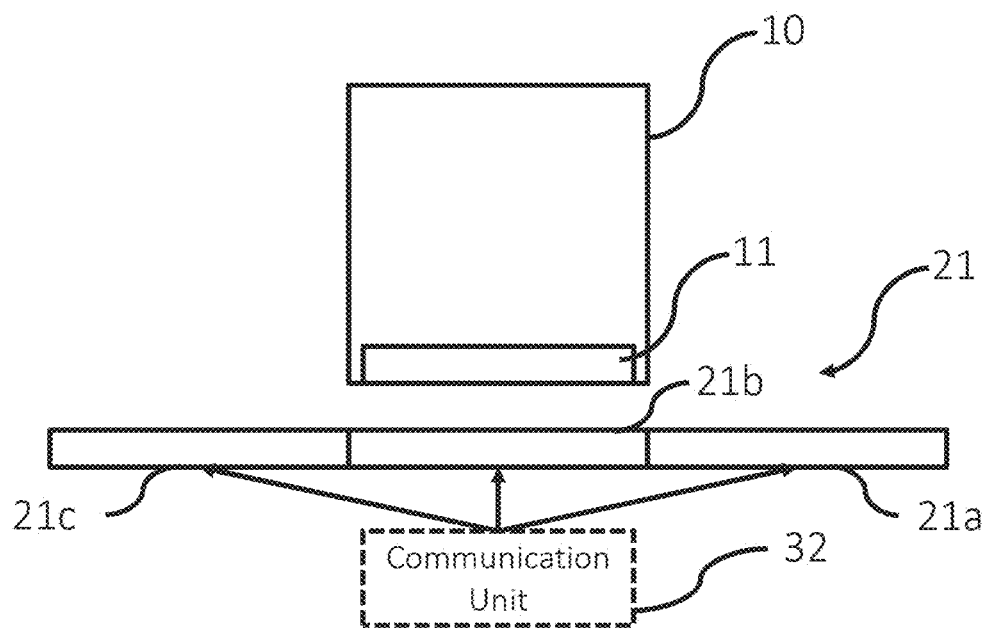

FIGS. 6a and 6b show particular examples for implementing the relocating unit 11, the first surface 21 and/or the second surface 22. In particular, FIG. 6a shows an example implementation of the relocating unit 11 by way of a mechanical mechanism, for example wheels. However, other mechanical mechanisms are envisaged such as cogs, sprockets rack and pinions or gears. The surface 21 is shown implemented by way of a mechanical conveyance mechanism similar to a conveyor belt. In this regard, the relocating unit 11 is envisaged to also include a bottom surface of a transporting device 10 (e.g. a flat bottom) which will be moved about by action of the surface 21 on the transporting device 10. Wheels, cogs, sprockets or gears may be mechanically advantageous and may reduce the friction experienced between the transporting device 10 and the surface 21. In one example, friction wheels may be used with rubberised wheels. In this example, magnets may be used to pull transporting devices together and increase the traction experienced by the friction wheels which may act to move a transporting device.

Although FIG. 6a shows the surface 21 being subdivided into three cells 21a, 21b and 21c such mechanism may equally apply to the second surface 22. Although the cells 21a-21c are shown arranged in one dimension it will be appreciated that the cells may be arranged in any arbitrary dimension to permit movement of a transporting device 10 in any direction. Moreover, although the cells 21a-21c are shown of a similar size, it is envisaged that each cell may be of any arbitrary size (e.g. arbitrary length and/or arbitrary width). As will be appreciated, if a surface (such as the second surface 22) is to be arranged in a vertical plane then the mechanism implemented will comprise a mechanism available to resist the force of gravity (where the second surface 22 is utilised in an environment in which gravity is applicable). For example, a cog mechanism may be more applicable in such a situation as the meshing of wheels/cogs may provide a useful mechanism for overcoming the force of gravity. Each cell 21a, 21b, 21c of the first surface 21 comprises an individually controllable mechanism which may be activated or de-activated independent of other cells on the surface 21. As shown in FIG. 6a each cell may comprise a wheel/ball mechanism arranged to move the surface of the cell against which the wheels 11 of the transporting device 10. However, this is one example of implementing the interface between the transporting device 10 and the surface 21. For example, the surface 21 may comprise cogs which mesh with corresponding cogs on the transporting device 10. In this way, the transporting device 10 may be moved in at least one direction (for example, the X-direction or the Y-direction) by way of action of the surface 21 on the transporting device 10. Preferably the mechanical mechanism in the surface 21 is an omnidirectional conveyance mechanism such as omnidirectional conveyor belts which may be arranged to move stacks of the cluster 1 in an X-direction or a Y-direction. The mechanical mechanism is envisaged to include rack and pinion mechanisms.

As will be appreciated, the mechanisms implemented in each of the first surface 21 and the second surface 22 (which is perpendicular to the first surface 21) need not be the same. For example, if the first surface 21 is implemented as a floor underneath the stacks of transporting devices 10 then resistance to the force of gravity need not be considered and hence simpler mechanical mechanisms may be implemented. On the other hand, if a second surface 22 must provide the additional function of resisting gravity then a different mechanism may be implemented such as mechanism locking means/latches in order to hold transporting devices 10 releasably engaged with the second surface 22. Additionally or alternatively, magnets and/or electromagnets may be used to hold transporting devices releasably against the second surface 22 and/or move transporting devices 10 across the second surface 22.

Moreover, the surface 21 may further comprise a communication unit 32 arranged to control each cell 21a, 21b, 21c of the surface 21. For example, each cell may comprise a communication unit 32 arranged to receive a signal from a controller indicating whether the cell is to be activated or de-activated. Moreover, the received signal may further indicate by how much and in which direction the cell is to activate. For example, whether the cell is to relocate the transporting device 10 in a particular direction but only by half a cell. Additionally, the communication unit 32 may transmit a signal to a controller indicating the status of operation i.e. whether the operation has completed, is about to begin, its progress, other information on the specific progress of the movement or other information. Moreover, the communication unit 32 may indicate technical faults with a cell of the surface 21 so that appropriate corrective actions may be taken.

Alternatively, a surface 21 may comprise a centralised communication unit 32 which controls a plurality of cells. Advantageously, this reduces the need to provide a communication unit 32 for each cell, reducing complexity and the number of parts required. However, it requires the connection of each cell to the centralised communication unit 32.

FIG. 6b shows another example of implementing the relocating unit 11 by way of magnets (such as permanent magnets and/or electromagnets). In this example, each cell 21a, 21b, 21c of the surface 21 comprises a corresponding magnet (such as permanent magnets and/or electromagnets) which are arranged to be controlled to move the magnet 11 of the transporting device 10 in a manner such that the transporting device 10 is moved from one cell to another cell (or a partial cell movement). Although the cells 21a-21c are shown arranged in one dimension it will be appreciated that the cells may be arranged in any arbitrary dimension to permit movement of a transporting device 10 in any direction. Moreover, although the cells 21a-21c are shown of a similar size, it is envisaged that each cell may be of any arbitrary size (e.g. arbitrary length and/or arbitrary width). Such a mechanism of moving the transporting device 10 may be advantageously implemented because the use of magnets may be easily implemented for the second surface 22 which may be arranged to counteract the force of gravity. Moreover, magnetic mechanisms may use fewer moving parts than mechanical mechanisms which increases the reliability of such a system. In one preferred example, the transporting device 10 may be arranged to levitate over the surface 21 by way of opposing magnets in the transporting device 10 and the surface 21. This provides the advantage of reduced wear on the surface 21 due to reduced friction. Generally such an advantage may be achieved by use of any suitable mechanism between the surface 21 and the transporting device 10 which permits movement of the transporting device 10 but which is non-contact, in this way a tolerance in level between cells may be overcome.

Although the use of magnets has been generally described further examples of arrangements of magnets which may be used will be described. In particular, the relocating unit 11 and/or the surface 21 may utilise a plurality of permanent magnets to achieve the magnetic mechanisms. Alternatively or additionally, a material of a predetermined magnetic permeability and/or an array of magnets may be used to achieve the movement of the transporting device 10.

As described previously, the surface 21 may comprise a communication unit arranged to receive a signal to control each cell of the surface 21 to perform an action such activate, de-activate, move transporting device 10 in a direction of movement, perform an amount of movement in a direction etc. In this way, the cells of the surface 21 can be coordinated to move at least one transporting device 10 to reconfigure the physical topology of a cluster. The surface 21 as a whole may comprise a single communication unit 32, alternatively, each cell 21a, 21b, 21c may comprises a communication unit 32.

Figure 7A:
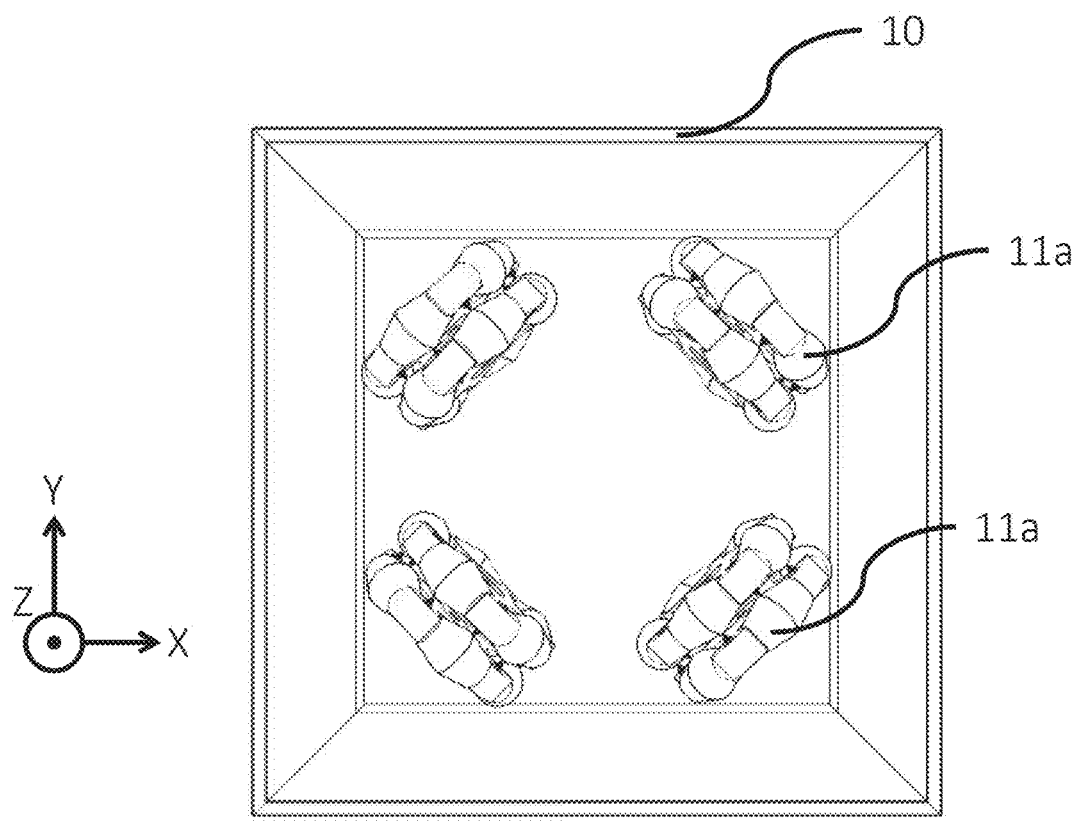
FIGS. 7a and 7b show different examples of implementing a mechanical mechanism as a relocating unit in a transporting device.
Figure 7B:
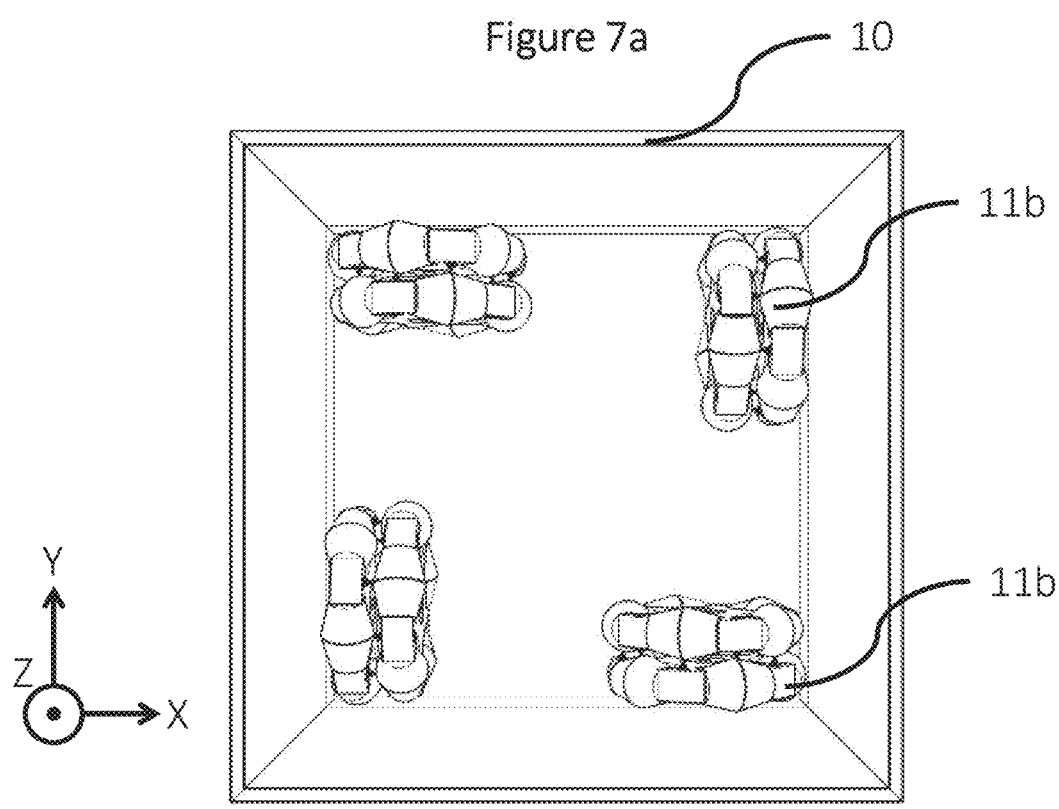

FIGS. 7a and 7b show example layouts of relocating units 11 in a transporting device 10. In this example, the relocating unit 11 is implemented as a mechanical mechanism, more specifically as omniwheels. Omniwheels are wheels with elements around their circumference which are arranged perpendicular to the turning direction of the wheel. The effect is that the omniwheels can be driven with full force, but will also slide laterally. Therefore, they are preferably used in transporting devices 10 because they permit relocation of the transporting device 10 in any direction without requiring the steering of wheels on the transporting device 10. In particular, FIG. 7a shows the omniwheels 11a arranged at 45 degrees to the edges of the transporting device 10. In other words, the omniwheels 11a are arranged angled to their direction of motion whether they are moving in an X-direction or a Y-direction or a Z-direction. Accordingly each of the four wheels depicted in FIG. 7a experience the same loading whether travelling in an X-direction or a Y-direction or a Z-direction.

FIG. 7b shows an alternative configuration of omniwheels 11b to those shown in FIG. 7a. In this configuration at least one wheel is parallel with each side of the transporting device 10. More specifically, two wheels are parallel with sides of the transporting device which extend in the X-direction and two other wheels are parallel with sides of the transporting device 10 which extend in the Y-direction. In this way, when the transporting device 10 is moved in, for example, the X-direction, two of the wheels are made to rotate in the normal manner of a wheel whilst the other two wheels are made to slide perpendicular to their turning direction. Accordingly, the wheels operate in pairs which changes the friction force experienced by pairs of wheels when the transporting device 10 is moved in different directions.

Figure 8A:
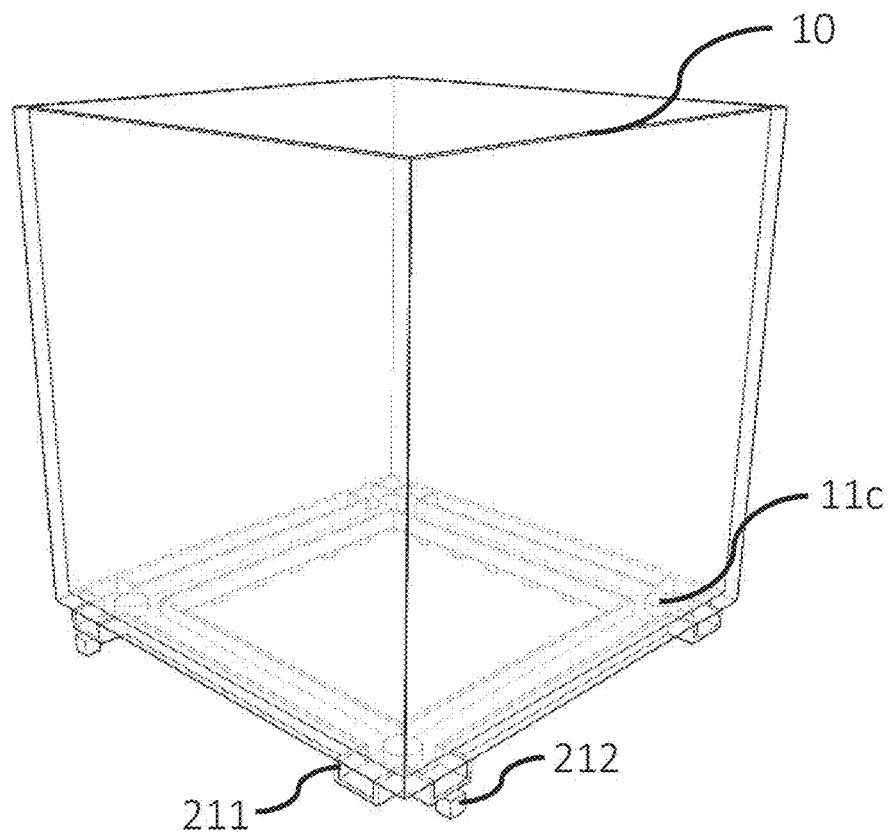
FIGS. 8a and 8b show different examples of implementing a magnetic mechanism as a relocating unit in a transporting device.
Figure 8B:
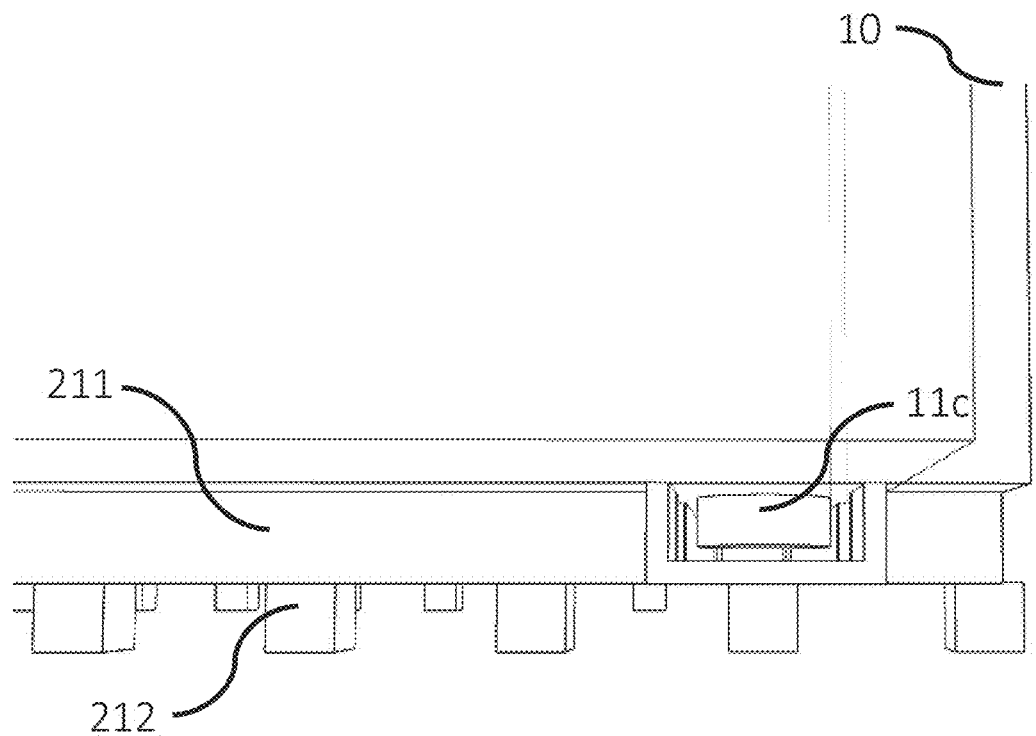

FIGS. 8a and 8b show one example of implementing the relocating unit 11 as a magnetic mechanism. In this example, the relocating unit 11 comprises a permanent magnet 11c. More specifically, a permanent magnet 11c is located at each corner of the transporting device 10. The permanent magnet 11c cooperates with the surface 21 which in this example comprises a track 211 arranged to contain the permanent magnet 11c but permit movement of the transporting device 10 in at least two directions. The surface 21 further comprises an array of permanent magnets 212 beneath the track. In this way the transporting device 10 is repelled by the array of permanent magnets 212 beneath the track 211. Movement of the transporting device 10 may be effected by movement of the array of permanent magnets 212. For example, the array of permanent magnets 212 may be motorised to move in at least one direction. In this way, by moving the array of permanent magnets (for example in a looped belt underneath the track 211) then the transporting device 10 can be made to move by way of magnetic attraction between the permanent magnet and the arrays of permanent magnets 212.

Figure 9A:
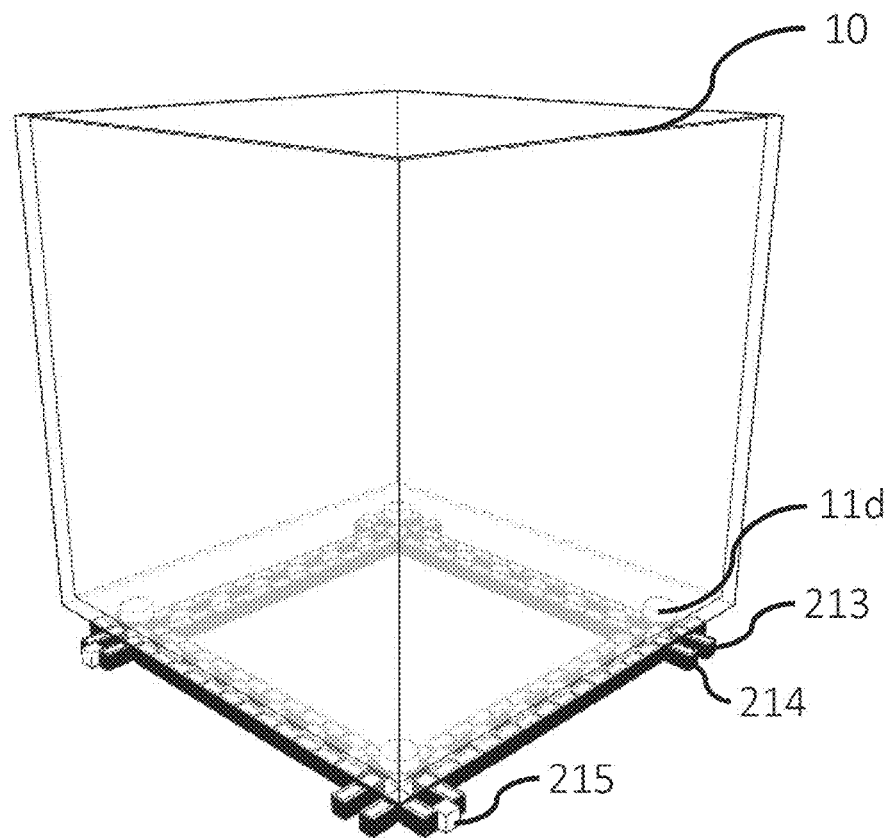
FIGS. 9a and 9b show different examples of implementing an electromagnetic mechanism as a relocating unit in a transporting device.
Figure 9B:
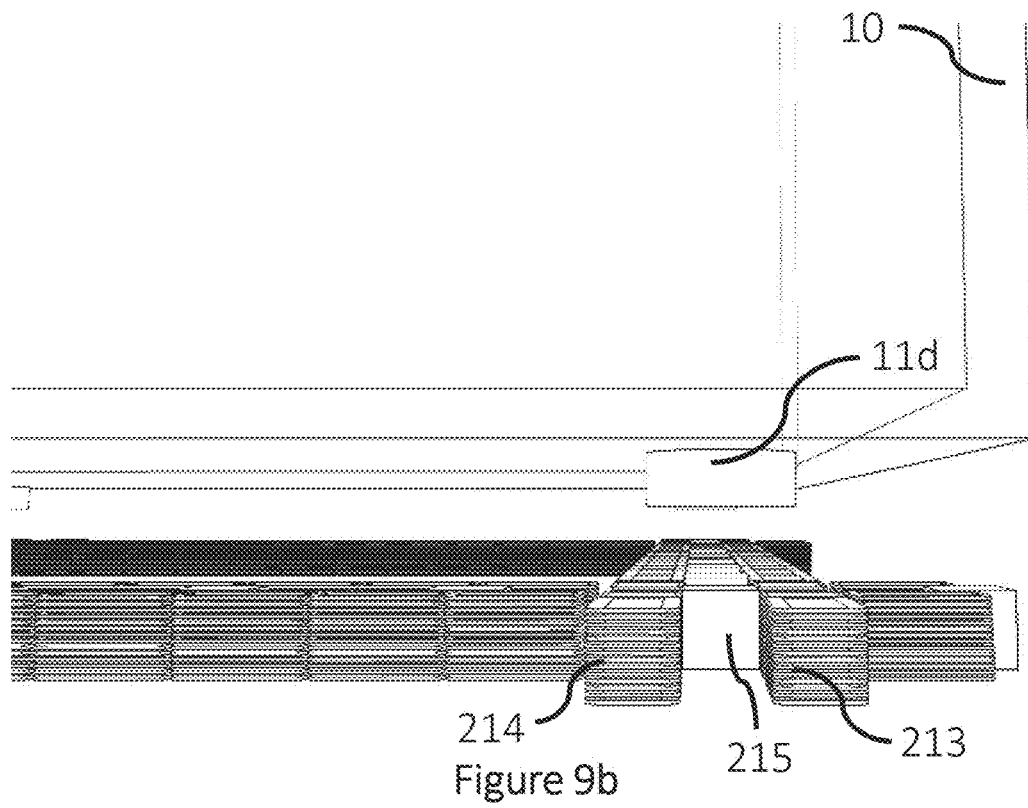

FIGS. 9a and 9b show another example of implementing the relocating unit 11 as a magnetic mechanism, more specifically, an electromagnetic mechanism. In this example, the relocating unit 11 comprises a permanent magnet 11d. As in FIGS. 8a and 8b, a permanent magnet 11d is located at each corner of the transporting device 10. The permanent magnet 11d cooperates with the surface 21. In this example, each cell of the surface 21 comprises a first electromagnet 213, a second electromagnet 214 and a permanent magnet 215. In this regard, the permanent magnet 215 is arranged to repel the permanent magnet 11d so that the transporting device 10 stays apart from the surface 21. Alternatively, in some situations (for example, when the surface 21 is arranged to resist the force of gravity) then the permanent magnet 215 may be arranged to attract the transporting device 10 so that it remains attached to the surface 21.

The electromagnets 213, 214 are arranged to control both the amount of attraction/repulsion between the permanent magnets 11d, 215 and arranged to move the transporting device 10 in an X, Y or Z direction. For example, by causing the first electromagnet 213 to attract the permanent magnet 11d and causing the second electromagnet 214 to repel the permanent magnet 11d then the transporting device 10 may be caused to move in the direction of the first electromagnet 213 and away from the second electromagnet 214. In this way, the transporting device 10 may be effectively moved across the surface by the action of the surface 21 on the transporting device 10.

Second Embodiment

The following describes a second embodiment of the present invention. The second embodiment, similar to the first embodiment, is concerned with a cluster of transporting devices which have a physical topology which may be reconfigured. In this way, the storage, retrieval and re-storage of items/products in a storage system may be more effectively accomplished. However, different to the first embodiment, the second embodiment does not rely on the interaction of a surface 21 with a transporting device 10 to permit relocation. Instead, interactions between at least two transporting devices 10 provide the necessary mechanism by which reconfiguration of the cluster is achieved. Generally, but not limited to such, the transporting devices 10 of the first embodiment are passive whilst the surface 21 takes the active role of moving each transporting device 10. On the other hand, generally but not limiting, the transporting devices of the second embodiment are active in some operations and passive in other operations. In other words, the transporting devices of the second embodiment may also include units to control and communicate with a controller and/or other transporting devices in order to manage the physical topology change of the cluster. In this way, some or all of the transporting devices are provided with drive mechanisms in order to self-propel or be propelled by other transporting devices. The movement of the transporting devices is therefore performed from within or by the cluster as opposed to by external robots. In this way, no external or peripheral framework is required to move transporting devices of the second embodiment. Moreover, no external load handling robots are required.

Figure 10:
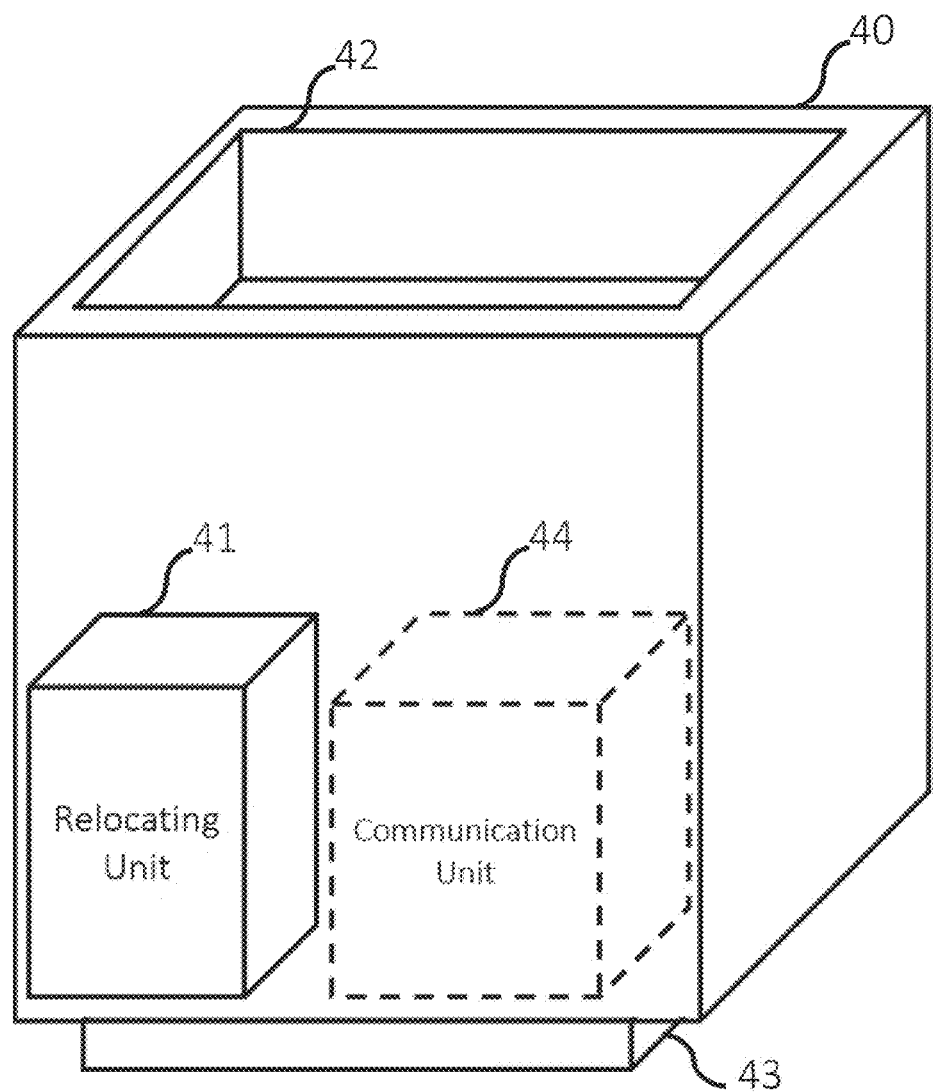
FIG. 10 is a schematic diagram of a transporting device according to a second embodiment of the present invention.

FIG. 10 shows a transporting device 40 according to a second embodiment of the present invention. The transporting device 40 comprises a relocating unit 41 and an item receiving space 42. Optionally, the transporting device 40 may comprise an engagement unit 43 and/or a communication unit 44.

As in the first embodiment, although the transporting device 40 is depicted as a cuboid it will be appreciated that any shape and/or size of transporting device 40 is envisaged. Preferably the transporting devices 40 tessellate so as to form a high density cluster when combined with other transporting devices 40. In this way storage density is maximised. Preferably, each transporting device 40 is individually addressable from within the cluster. Similar to the first embodiment, the addressability of each of the transporting devices 40 is distinct from physically addressing the transporting devices. Addressability is intended to refer to having an addressing scheme usable to send one or more instructions, for example motion control instructions, to individual transporting devices 40 or groups of transporting devices 40 in order to achieve translation of one or more transporting devices 40 so as to relocate the one or more transporting devices 40. In other words, the addressability of each transporting device 40 (for the purposes of communication therewith) is independent of the location of a transporting device 40 within the cluster 5.

In the second embodiment, unlike the first embodiment, the relocating unit 41 is arranged to permit the relocation of the position of the transporting device 40 relative to at least one other transporting device 40. The relocating unit 41 achieves this by way of interaction with at least one other transporting device 40. It is envisaged that the relocating unit 40 may be implemented in a number of ways involving mechanisms which are located inside the transporting device 40 and/or mechanisms which are located on a face of the transporting device 40. For example, the relocating unit 41 may be implemented using mechanical mechanisms such as wheels, cogs, gears etc. Additionally or alternatively, by way of magnetic mechanisms such as permanent magnets, materials of predetermined magnetic permeability, arrays of magnets etc. Additionally or alternatively by way of electromagnetic mechanisms, for example using planar motors and/or linear electric motors. Other mechanisms are envisaged such as non-contact mechanisms in which the transporting device 40 and other transporting devices 40 do not contact which thereby minimises the friction experienced by the transporting device 40.

In one example, friction wheels may be used with rubberised wheels. In this example, magnets may be used to pull transporting devices together and increase the traction experienced by the friction wheels which may act to move a transporting device.

The transporting device 40 further comprises an item receiving space 42. The item receiving space is envisaged to be a void in the transporting device 40 arranged to receive an item. For example, the item receiving space 42 may be a location of the transporting device 40 arranged to hold products until they are to be packed and shipped as part of an order placed by a customer. Alternatively, the item receiving space may be arranged to contain items for an inventory system.

Optionally, the transporting device 40 may further comprise an engagement unit 43. The engagement unit 43 may be arranged to engage the transporting device 40 with at least one other transporting device 40. In the example shown in FIG. 10 the engagement unit 43 comprises a protrusion of the transporting device 40 arrange to releasably engage with the item receiving space 42 of another transporting device 40. In this way, a cluster of transporting devices 40 may be stably stacked one on top of each other without risk of collapse of the stack. Although a protrusion is depicted in FIG. 10 other ways of implementing the engagement unit 43 such as spikes or other locating means to reliably located one transporting device 40 relative to another transporting device 40 are envisaged.

The transporting device 40 may, optionally, further comprise a communication unit 44 arranged to receive a signal to control each transporting device 40. For example, the communication unit 44 may receive a signal indicating at that the transporting device 40 is to activated or deactivate.

Additionally or alternatively, the signal may indicate a direction in the cluster in which the transporting device 40 is to move and/or a location in the cluster in which the transporting device 40 is relocate itself. Additionally or alternatively, the signal may indicate that movement of the transporting device 40 is to occur in a particular direction and by a certain distance, for example, a fraction of the height/width/depth of the transporting device or a multiple of the height/width/depth of the transporting device 40. Accordingly, the communication unit 44 may instruct the relocating unit 41 to move in the direction indicated by the signal and the relocating unit 41 may be further arranged to relocate the transporting device 40 based on the received signal. Additionally or alternatively, the communication unit 44 may instruct the relocating unit 41 to move a neighbouring transporting device 40 to assist with the movement thereof. In this way, individual transporting devices 40 may relocate themselves within the cluster based on a signal received from the communication unit 44. In this regard, each transporting device 40 may be individually addressable from within the cluster. Additionally or alternatively, the communication unit 44 may receive higher-level instructions which may be translated into zero or more actuations, movements, communications or any other actions, for example reset or self-test instructions.

Additionally or alternatively, the communication unit 44 may be further arranged to transmit a signal to a controller indicating the status of operation of a transporting device 40 i.e. whether the operation has completed, is about to begin, its progress, other information on the specific progress of the movement or other information. Moreover, the communication unit 44 may indicate technical faults with a transporting device 40 so that appropriate corrective actions may be taken.

Figure 11:
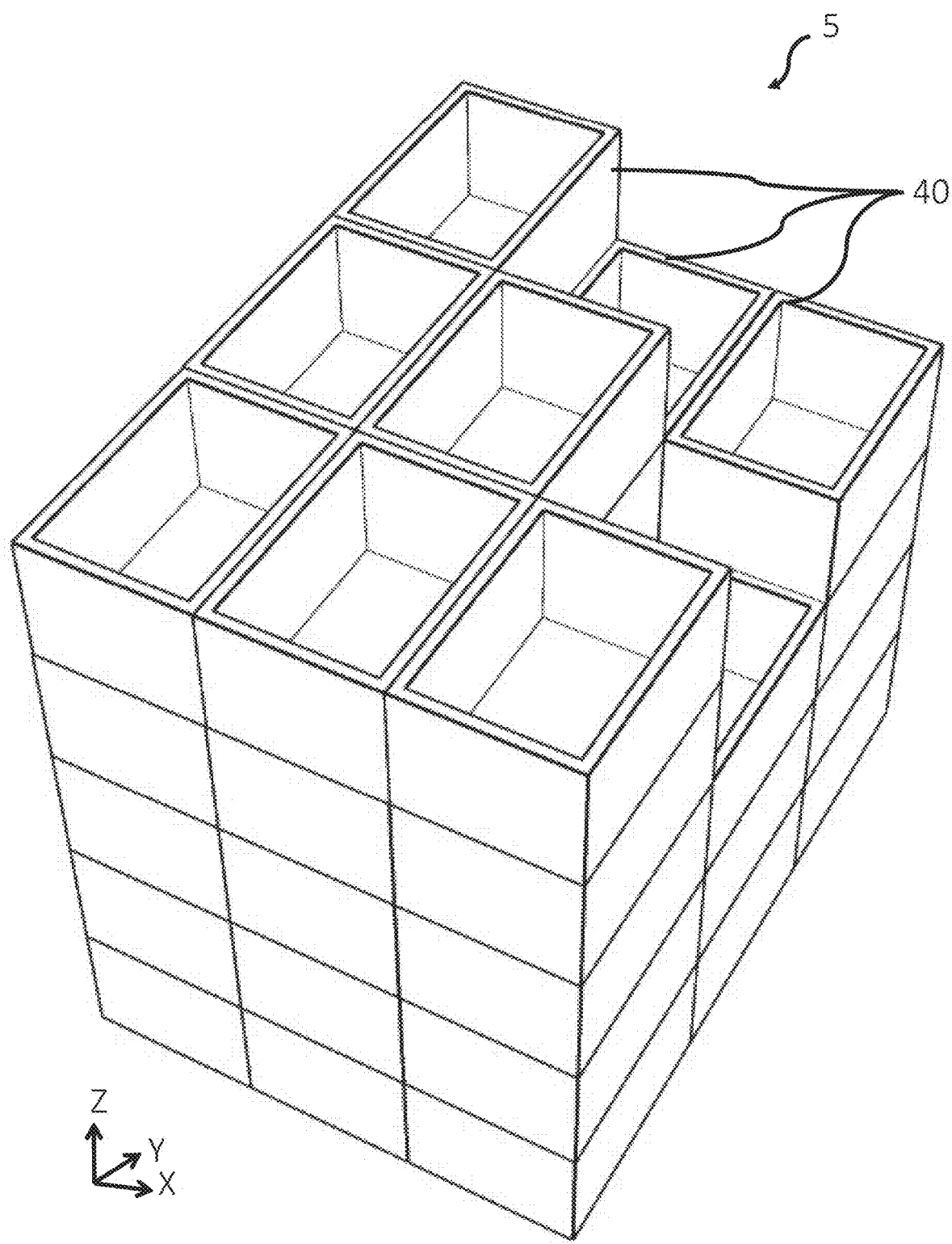
FIG. 11 is a schematic diagram of a storage system comprising a cluster, the cluster comprising a plurality of transporting devices according to the second embodiment of the present invention.

FIG. 11 shows a cluster 5 forming a storage system according to the second embodiment of the present invention. In particular, the cluster 5 comprises a plurality of transporting device 40 which may be arranged in a three-dimensional physical topology. In this regard, a cluster 5 is envisaged to be two or more transporting devices 40 cooperating together in a physical topology which may be rearranged by way of one transporting device 40 relocating itself/being relocated in the cluster 5. To this end, as shown in FIG. 11 the cluster comprises no support structure such as a grid, framework etc. Unlike the first embodiment the cluster 5 also does not comprise a surface which cooperates with a transporting device 40 to effect movement/relocation of a transporting device 40 in the cluster. Instead, advantageously, each transporting device 40 comprises a mechanism by which, through cooperation with other transporting devices 40, the transporting device 40 is able to relocate itself within the cluster 5. In this way, a three dimensional physical topology of the cluster 5 may be re-arranged. The cluster 5 may comprise a location which is empty of a transporting device 40. The empty location may be used during rearrangement of the cluster 5 to permit a location into which a transporting device 40 may be moved thereby causing the empty space to relocate to the location now vacated by the moved transporting device 40. However, such an empty location may not be required if the cluster 5 does not occupy the entire space in which the cluster 5 is operating. For example, as shown in FIG. 11 the cluster 5 comprises stacks of transporting devices 40. Each stack is located adjacent to another stack. The transporting devices 40 in each stack may cooperate with one another to effect the movement of particular transporting devices 40 in and around the cluster 5. As shown in FIG. 11, the stacks of transporting devices 40 are of a variable height and indeed the number of stacks and the number of transporting devices 40 in stack may be variable and not limited to a particular number. Moreover, the cluster 5 may extend by any number of stacks and/or transporting devices 40 in any of the X-direction, Y-direction and/or Z-direction. In the cluster 5 shown in FIG. 11 empty spaces are available in the cluster 5 for the movement of transporting devices 40. For example, if the cluster 5 was in a location which could hold a cluster with a maximum height of five transporting devices 40 then empty space is apparent because not every stack of transporting devices 40 comprises five transporting devices 40. In particular, two of the nine stacks comprise four transporting devices 40 which is fewer than the five transporting devices 40 possible. Moreover, one stack comprises three transporting devices 40. Therefore, a space is available for the movement of a transporting device 40.

It is envisaged that a cluster 5 with a reconfigurable physical topology may be of any size or shape and/or used in any type of environment. Moreover, each transporting device 40 forming the cluster 5 may be of a variety of sizes. Such sizes may (but not necessarily) include transporting devices 40 of differing widths, lengths and/or heights which are multiples of the width, lengths and/or heights (respectively) of the smallest transporting device 40 in the cluster 5. Such a configuration may permit, for example, the storage and/or transportation of items which otherwise be too large or heavy for a smaller transporting device or due to reasons of energy-efficiency or space-efficiency. Moreover, the cluster 5 may rest on a floor/surface which supports the cluster 5, such as supporting the weight of the cluster 5. The floor/surface may provide location information or communications information to the cluster 5 by way of radio frequency, electrical contacts or the like.

With regard to control of individual transporting devices 40 within the cluster 5, a transporting device 40 interacts/cooperates with at least one other transporting device 40 to effect the relocation of one or more transporting devices 10 to alternative locations within the cluster 5 or to locations outside of the cluster 5. Such control strategies are addressed in Ocado Innovation Limited UK Patent Application No. GB1716201.7 filed 4 Oct. 2017 (Ocado Innovation Limited Reference Number 000164 GB), the content of all of this application hereby being incorporated by reference. In this cross-referenced document, a transporting device 40 is referred to as a transporting vessel and it is envisaged that such terms may be used interchangeably.

Moreover, the features of the controller described with reference to the first embodiment may be equally employed with regards to the control of transporting devices 40 in the second embodiment.

In particular, the storage system may further comprise a controller (not shown) arranged to determine a path for a transporting device 40 from a starting location within/on/outside the cluster 5 to a destination location within/on/outside the cluster 5. The controller may be further arranged to transmit a signal to a communication unit to cause a transporting device 40 to move in accordance with the determined path. In this way, the controller may determine the path for a transporting device 40 and cause the transporting device 40 to move along the determined path. As will be appreciated, the controller is arranged to avoid collisions and enable cooperation of transporting devices 40. Additionally or alternatively, as in the first embodiment, the full path of a transporting device 40 from a start to a destination may not be determined in advance. Instead, only one or more manoeuvres may be determined at a start of a relocation, or that the path is recalculated once or more after the start of the relocation.

For example, the controller can be configured to evaluate how to improve work allocations, movements of product and placement of product. The controller can be configured to schedule when specific types of movements should happen and in what order they should occur, depending on, for example, the application of various business rules and/or priority. The controller can be configured to determine both inbound and outbound factors in making decisions relative to, for example, product placement. For example, the controller can estimate delivery location of product supply, and estimated outbound delivery of product. The controller can make decisions, and sends signals for execution by an automatic system, and/or can allocate tasks efficiently to humans (pickers, loaders etc.).

The controller can determine which of one or more transporting devices 40 should be involved in the fulfillment of an order or for any other purpose. The action of the one or more transporting devices 40 can typically require the transporting devices to traverse the cluster, and/or to conduct actions, such as support adjacent transporting devices and/or locomote a given transporting device 40. The controller can be configured to analyse various pathways in the cluster to determine one or more paths that are potentially preferential relative to other pathways, given a set of constraints and conditions. These preferential pathways can be provided, one-time, periodically and/or dynamically to the transporting devices 40 to control their movements throughout the cluster and/or roles they perform within the cluster 5.

A path can be preferential for a number of reasons, including, but not limited to: least distance traveled, greater expected average velocity of transporting devices 40, lower probability of encountering traffic (i.e. congestion), less total time required, lower probability of collision, less power used, ease of switching to alternate pathways, ability to avoid obstacles, for example a broken transporting device, a broken path, and/or a part of the path that is under repair.

The controller can use various algorithms to identify, design and/or control the movement of various transporting devices to which it is connected. The controller can be configured to optimise the movement of transporting devices through applying various algorithms to determine potentially advantageous routes from one location to another. The potential advantages can include shorter distance traveled, lower likelihood of encountering congestion, shorter time required, lower power consumption, co-ordination with movements of other transporting devices, routing around obstacles such as broken transporting devices or broken areas of surface, or co-ordination with various workstation operations. In some examples, the controller can be implemented using one or more servers, each containing one or more processors configured to perform one or more sets of instructions stored upon one or more non-transitory computer readable media. Potential advantages for computer implementation include, but are not limited to, scalability, ability to handle large amounts of processing and computational complexity, increased reaction speed, ability to make decisions quickly, ability to conduct complex statistical analysis, ability to conduct machine learning, among others.

The controller may be implemented in any number of ways, for example, the controller may be implemented as a distributed computing system. For example, some or all of the functions of the controller may be distributed to the transporting devices 40 themselves. For example, given respective destinations, transporting devices 40 may communicate with nearby transporting devices 40 in the cluster 5 to thereby coordinate/negotiate movements and collaboration in order for each of them to achieve their objective.

Similar to the first embodiment, peripherals may be used with the cluster 5 to facilitate the addition or removal of transporting devices 40 to the cluster 5. For example, as in the first embodiment a conveying mechanism may be used onto which transporting devices 40 may be located to be removed from the cluster 5 or added to the cluster 5. Moreover, clusters 5 may be located in different locations for particular functions. For example, a first cluster 5 could be located in an ambient environment whilst a second cluster 5 could be located in a chilled environment. In this way, the first cluster 5 may comprise transporting devices 40 storing groceries which do not require chilling (such as dry goods) whilst the second cluster 5 may comprise transporting devices 40 storing groceries which do require chilling (such as fresh produce). A customer's order could be fulfilled by extracting from the first and second clusters those transporting devices 40 comprising groceries which require chilling and groceries which do not require chilling which have been ordered by the customer. It will be appreciated, that this provided by way of example only and groceries which may be chilled or stored at ambient temperatures may equally be stored in either the first cluster or the second cluster.

Figure 12A:
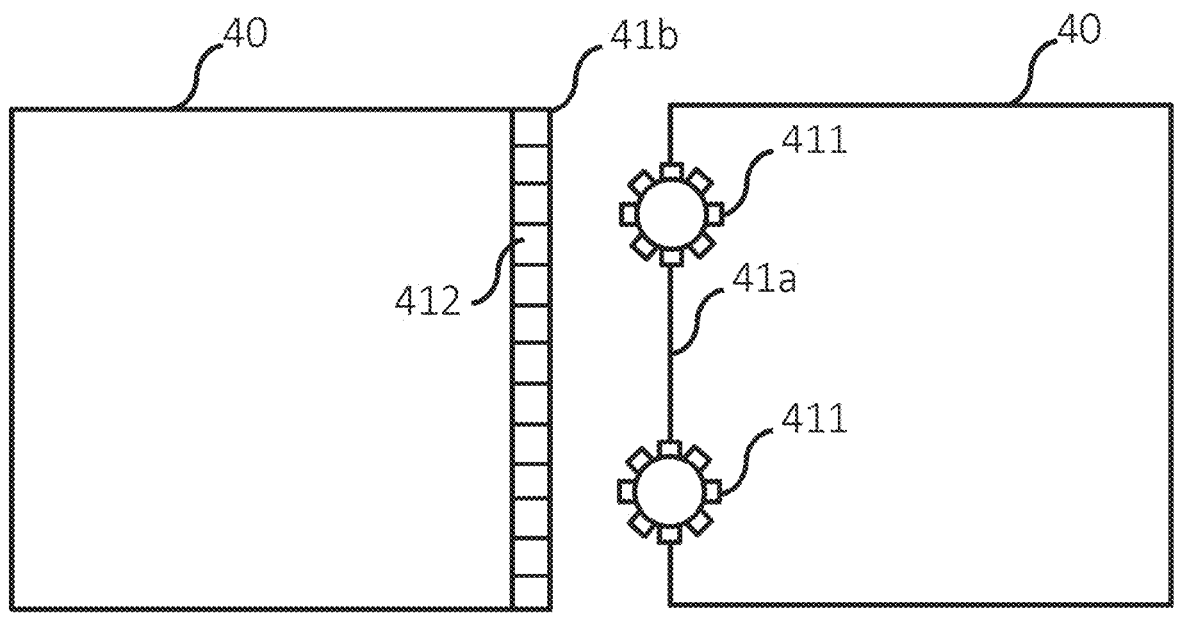
FIGS. 12a and 12b show different examples of implementing a relocating unit in a transporting device.
Figure 12B:
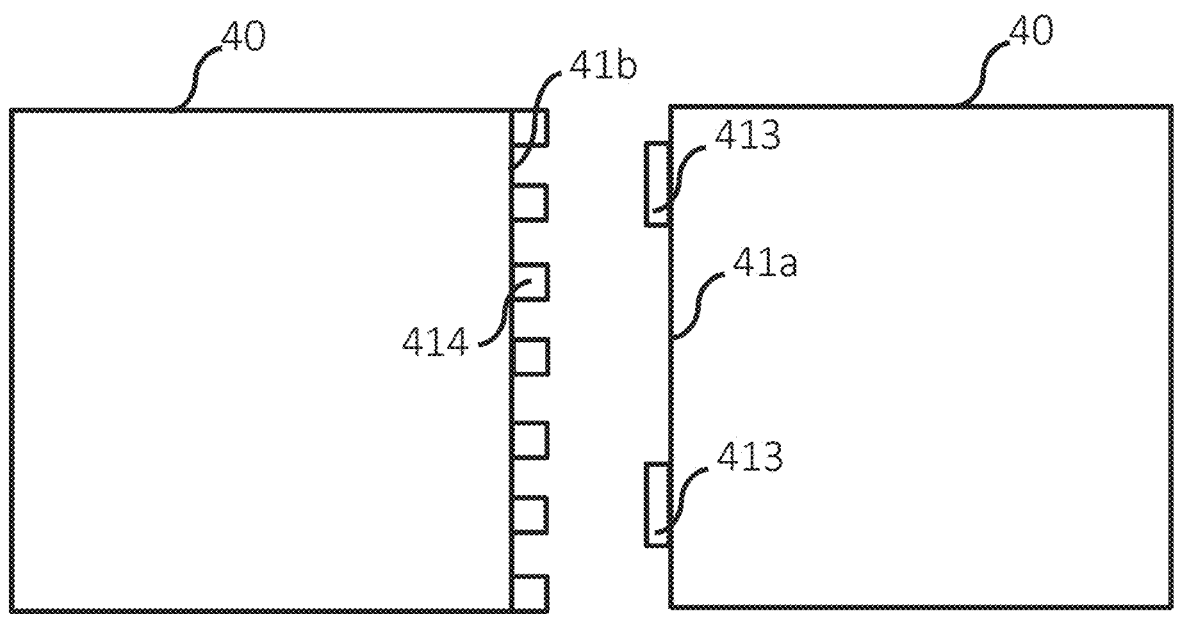

FIGS. 12*a* and 12*b* show examples of mechanisms which may be comprised within the relocating unit 41 of each transporting device 40. In particular, the above described functionality of each transporting device 40 to relocate itself within a cluster 5 such that the cluster 5 has a reconfigurable physical topology may be accomplished by way of a number of different technologies. More generally, the relocating unit 41 may be implemented using one or a combination of mechanical mechanisms, magnetic mechanisms, electromagnetic mechanisms and/or non-contact mechanisms between transporting devices 40.

For example, FIG. 12*a* shows two transporting devices 40 each comprising a relocating unit 41 comprising a mechanical mechanism to permit the relocation of each transporting device in the cluster by way of cooperation between the transporting devices 40 to effect a physical relocation of the transporting device within the cluster. In this example, each transporting device 40 comprises an active face 41*a* and a passive face 41*b*. The active face 41*a* of a first transporting device 40 may cooperate with the passive face 41*b* of another transporting device 40 in the cluster 5. The cooperation effects the movement of the first transporting device 40 relative to the second transporting device 40. For example, as shown in FIG. 12*a*, the active face 41*a* may comprise two cogs 411 arranged on the active face 41*a*. The passive face 41*b* may comprise a track 412 with spaces in which the teeth of each cog 411 may engage. In this example, each transporting device 40 has been described as comprising an active face 41*a* and a passive face 41*b*, however it is envisaged that any combination of active and passive faces on a transporting device 40 is envisaged such as faces which selectively engage in an active and/or passive manner with other transporting devices 40. Moreover, although two cogs 411 have been described any number of cogs is envisaged. Similarly, although cogs have been described other mechanical mechanisms are envisaged such as gears and/or sprockets. Generally, a mechanical mechanism is envisaged which permits the relocation of the transporting device 40 in the cluster 5.

In the example of FIG. 12*a*, the teeth of each cog 411 on the first transporting device 40 engage with the tracks 412 on the second transporting device 40. Accordingly, rotation of the cogs 411 results in the motion of the first transporting device 40 along the track. In this way, the first transporting device 40 may be moved by way of interaction with the second transporting device 40. As will be appreciated, the cogs 411 and track 412 may be arranged to permit the motion of the first transporting device 40 in any of an X-direction, Y-direction and/or Z-direction. In this way, relocation of each transporting device 40 may be effected by a mechanical mechanism which performs the relocation of a first transporting device 40 by way of interaction between the first transporting device 40 and a second transporting device 40.

FIG. 12*b* shows a second example utilising magnetic and/or electromagnetics to effect the movement of transporting devices 40. In this example, the relocating unit 41 comprises magnets and/or electromagnets. In this example, the active face 41*a* of the first transporting device 40 comprises electromagnets 413. As explained previously, each transporting device 40 may comprise an active face 41*a* and a passive face 41*b* however other face combinations are envisaged such as a transporting device 40 with only active faces 41*a*. The second transporting device 40 comprises a passive face 41*b* upon which are arranged permanent magnets 414 arranged in a track-like progression. In this example, by selectively energising the electromagnets 413 movement of the first transporting device 40 may be effected by causing the electromagnets 413 to be selectively attracted and repelled from the permanent magnets 414 to thereby cause the first transporting device 40 to follow the track-like progression of permanent magnets 414 on the second transporting device 40. In this way, the interaction between the first transporting device 40 and the second transporting device 40 causes the motion of the first transporting device 40 within the cluster and thereby permits its relocation.

Figure 13:
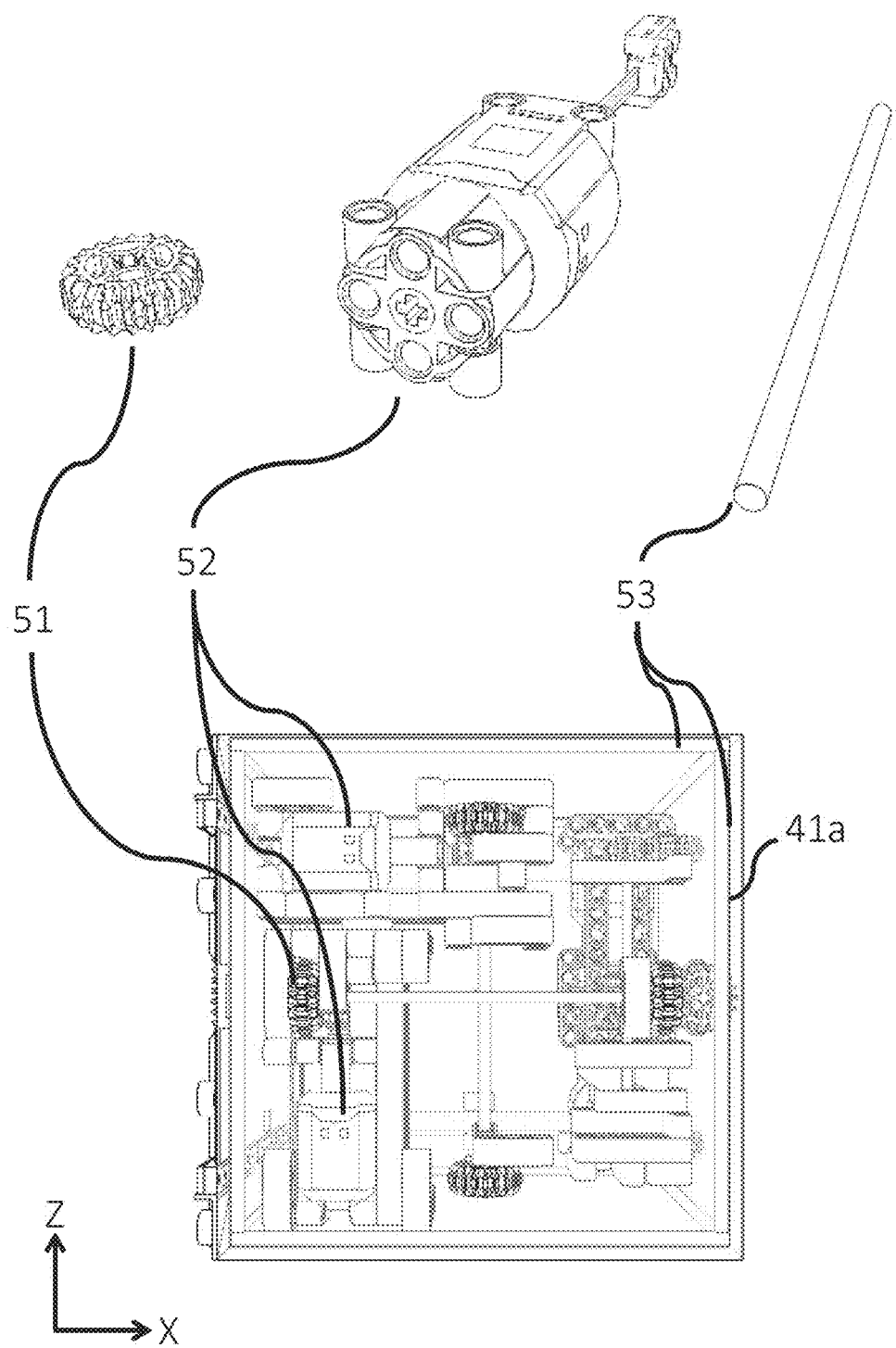
FIG. 13 shows components comprised in implementing a mechanical mechanism as a relocating unit in a transporting device.

FIG. 13 shows a transporting device 40 in which the relocating unit 41 comprises a mechanical mechanism. More specifically, the example shown in FIG. 13 relates to example components which may be utilised in implementing an active face 41*a* of a transporting device 40. It is envisaged that other components may be used such as cogs, wheels, or gears. In this example, the active face 41*a* comprises a cog 51, motor 52, and support 53. The cog 51 and corresponding track on a passive face 41*b* is envisaged to include rack and pinions. In this example the motor 52 and support 53 are located inside the transporting device 40 whilst the cog 51 extends from the inside of the transporting device 40, through the wall thereof, to the outside of the transporting device 40. In this example, the active face 41*a* comprises two motors each driving a cog 51 to provide two-dimensional movement on that face. Accordingly, the transporting device 40 is powered. The support 53 is an optional feature which may be used to maintain a close separation between track and cogs. In particular, the support 53 may be magnetised and arranged to be attracted to a corresponding magnetised support on a passive face 41*b* of a neighbouring transporting device 40. In this way traction of the cog 51 on a corresponding track is improved. Moreover, the output of each motor 52 may be geared such that an unpowered motor holds the position of the transporting device 40 against the force of gravity. In this example, driving a motor 52 drives a corresponding cog 51. Preferably each cog 51 is driven independently of other cogs 51 so that twists in a cog 51 can be easily corrected. The cog 51 engages with a corresponding track on a neighbouring transporting device 40 to facilitate the movements of the transporting device 40. Although the cog 51 has been shown as a circular profile it is envisaged that a cog with an asymmetric profile would have particular advantages. For example, a cog 51 comprising a location of a chord across the profile of the cog 51 would result in a cog 51 which is predominately circular in profile but flattened on one portion of the cog 51 resulting in a cog 51 which disengages from the track for a portion of its rotation. Such a cog 51 would be useful when a cog 51 is required to move perpendicular to its usual direction of turning by disengaging with the track.

Figure 14:
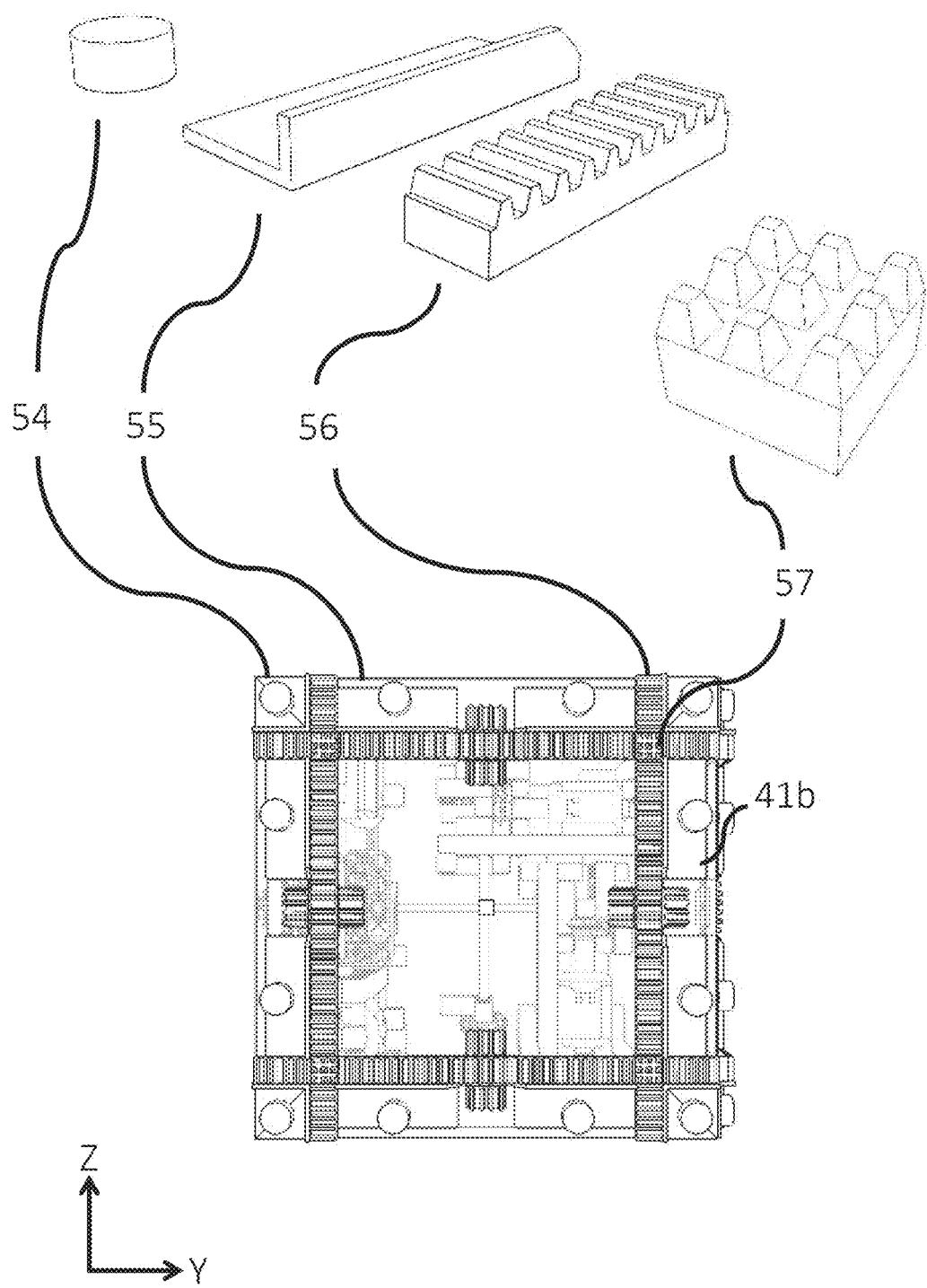
FIG. 14 shows components further comprised in implementing a mechanical mechanism as a relocating unit in a transporting device.

FIG. 14 shows a passive face 41*b* of a transporting device 40 in which the relocating unit 41 comprises a mechanical mechanism. In this example, the components shown are examples of those which may be implemented on a passive face 41*b* of the transporting device 40. As with the active face 41*a*, these components are given as examples only and it is envisaged that other components may be used to facilitate the movement of each transporting device 40. In particular, the passive face 41*b* comprises a track 56, a cross-over track 57 and a guide 55. Optionally, the passive face 41*b* may comprise a permanent magnet 54 arranged to be attracted to the support 53. However, magnets are not necessary for such a holding structure (which may be arranged to resist the force of gravity experienced by the transporting device 40). Instead, or additionally, mechanical latches may be used to hold a transporting device 40 in a fixed position. It is envisaged that the components of the passive face 41*b* are located on the outside of the face of the transporting device 40. The guide 55 may be employed alongside the track to avoid a cog 51 slipping off the track 56 thereby maintaining alignment between the cog 51 and the track 56. In particular, the cog 51 is arranged to engage with the track 56 to permit the movement of one transporting device 40 relative to another. In other words, the track 56 permits a cog 51 to bear on a surface thereof to effect movement in the direction of turning of the cog 51. Moreover, the cog 51 may slide across the track in a lateral direction i.e. in a direction perpendicular to the direction of turning of the cog 51. However, to permit two dimensional movement of a transporting device a cross-over track 57 is provided along with gaps in the guide 55 at locations are which a transporting device 40 is expected to move in one of two directions. The cross-over track 57 permits the lateral sliding of a cog 51 is two directions. The gaps in guide 55 may be provided to be smaller than the diameter of the cog 51 to prevent twisting. Moreover, the track 56 extends sideways through gaps between transporting devices 40 to allow a cog 51 to reengage with a track with minimised twisting or untwisted lateral movement. In other words, additional track (in a sideways direction) is provided at the midpoint of each track 56 along a face so that the cog 51 easily reengages with the track when transporting devices 40 are moved across the passive face 41*b* of each transporting device 40. Preferably the additional track is provided with a ramped profile so that reengagement of a cog with a track occurs gradually. In this way, when reengagement of all four cogs on an active face are engaged on the passive face of a neighbouring transporting device 40 then the track 57 prevents the cogs 51 from twisting. Precision position of each transporting device 40 may be achieved in a number of ways. For example, in a first example by placing a magnet at the centre of each passive face 41*b* to be detected by a Hall Effect sensor or similar on each active face 41*a*. In a second example, by placing a magnet at the centre of each passive face 41*b* and a magnet of the opposite polarity at the centre of each active face 41*a* to thereby cause attraction resulting in effective alignment. In a third example, by placing a light sensor (such as a photodiode) at the centre of each passive face 41*b* with a corresponding light emitter (such as an LED) at the centre of each active face 41*a*. As will be appreciated, these are provided by way of example only and other methods of precision positioning are envisaged, such as the features described as being located on the active face 41*a* instead being located on the passive face 41*b* and vice-versa.

Figure 15:
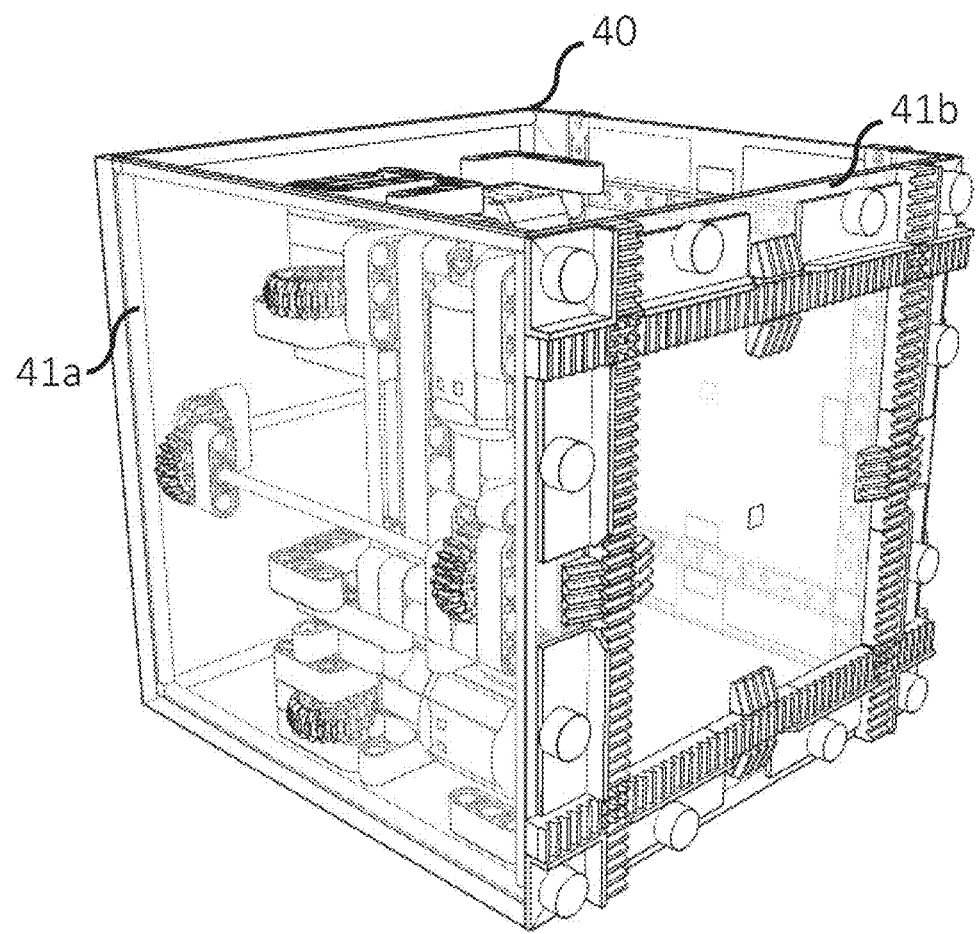
FIG. 15 shows a transporting device according to a second embodiment of the present invention wherein a relocating unit comprises a mechanical mechanism.
Figure 15:
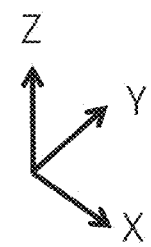

FIG. 15 shows an example transporting device 40 from a viewing angle so that it is possible to see the active face 41*a* and the passive face 41*b* being arranged on perpendicular faces of the transporting device 40. It is envisaged that a transporting device 40 comprises two actives face 41*a* (arranged on adjacent sides) and two passive faces 41*b* (arranged on adjacent sides). In this way, each transporting device 40 may be driven to move in any of three dimensions whilst also permitting adjacent transporting devices 40 to move across the transporting device 40.

Figure 16:
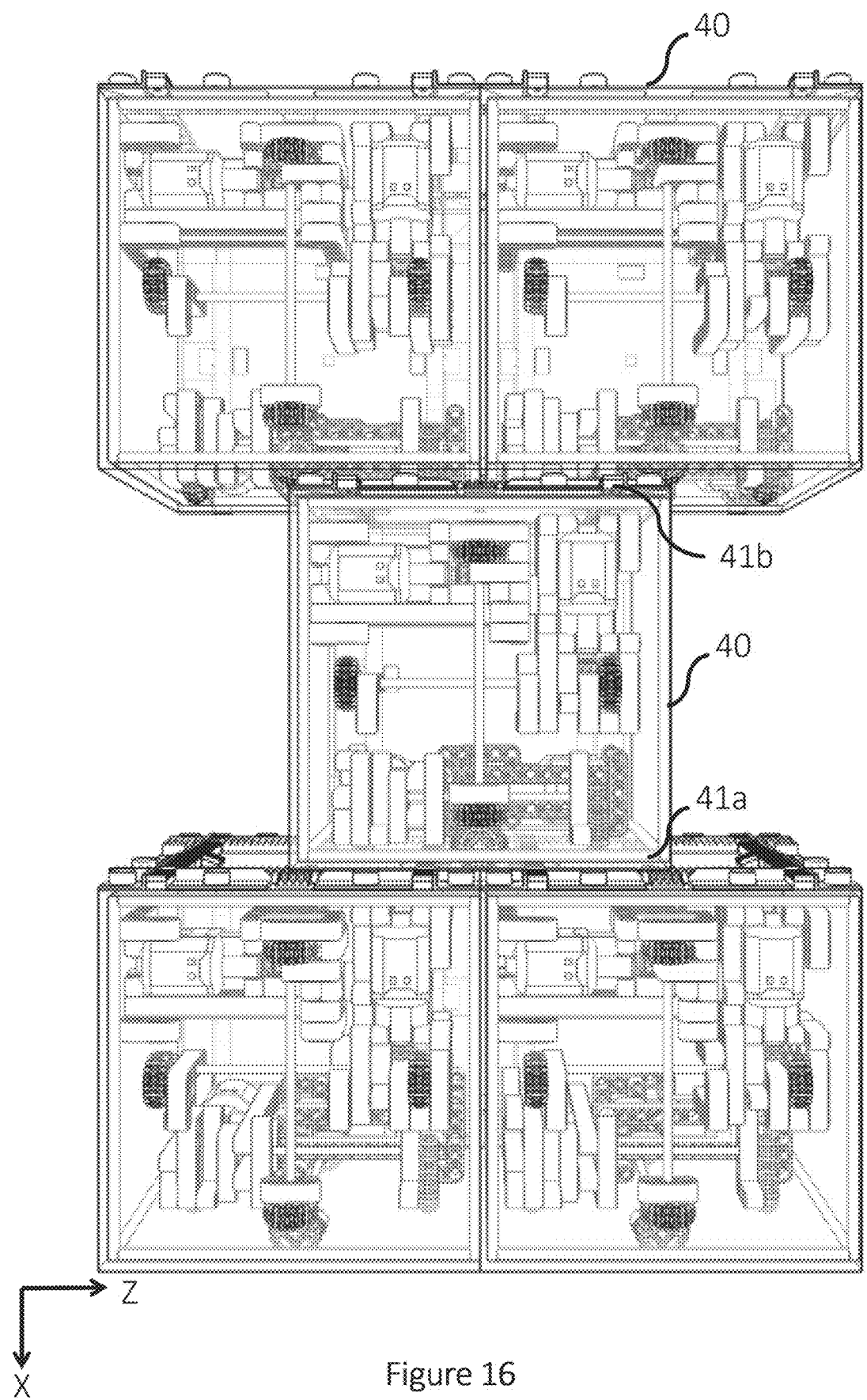
FIG. 16 shows a cluster of transporting devices according to the second embodiment of the present invention wherein the relocating unit comprises a mechanical mechanism.

FIG. 16 shows an example of a transporting device 40 moving within a cluster. In this example, a central transporting device 40 is being moved through action of cogs on its own active face interacting with tracks on corresponding passive faces 41*b*. Additionally, it is being pushed/pulled by the action of other stationary transporting devices 40 utilising their own cogs to push/pull the passive face 41*b* of the central transporting device 40. In this way, any number of transporting devices 40 may be controlled and relocated within the cluster.

Figure 17:
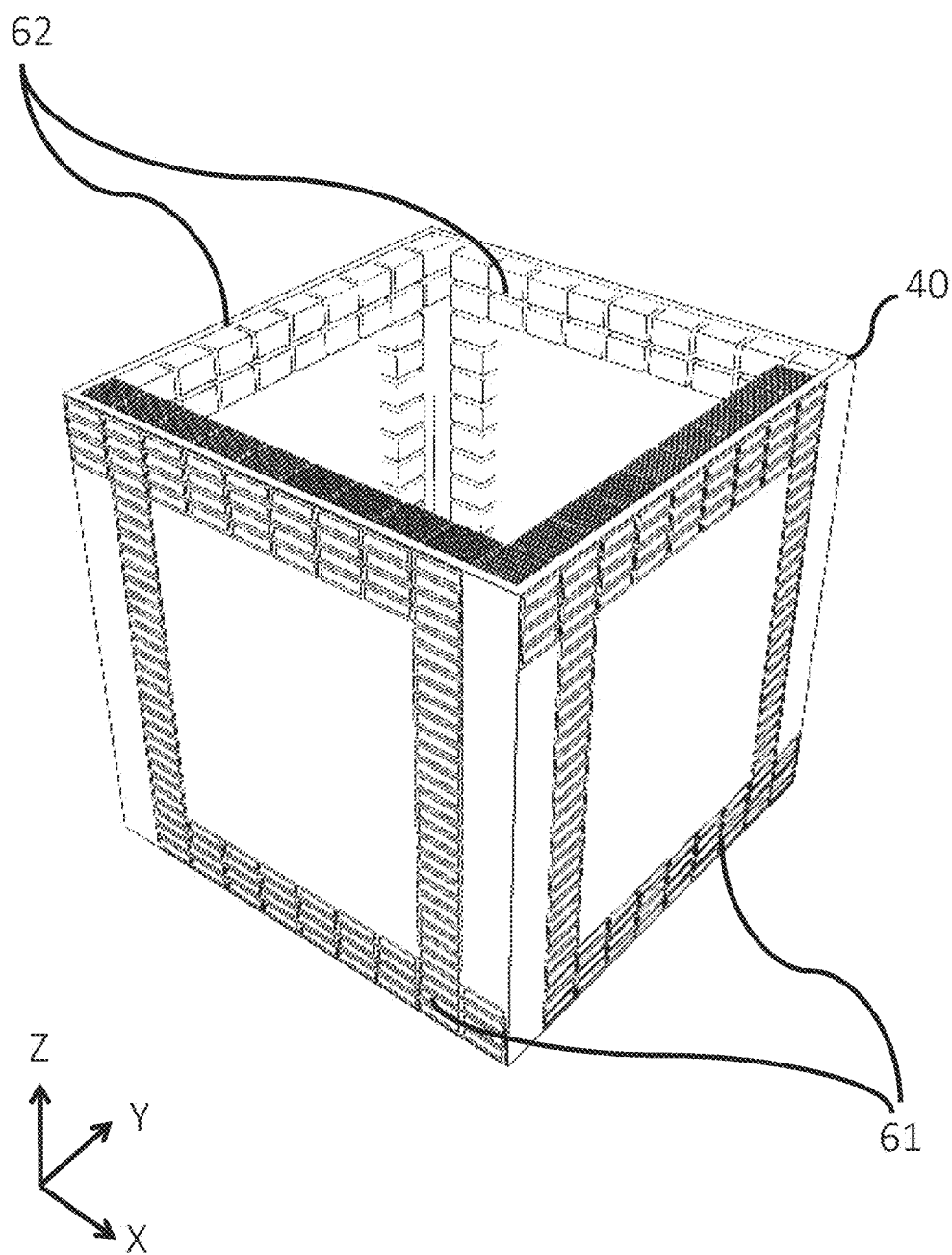
FIG. 17 shows a transporting device according to a second embodiment of the present invention, with a first example of a relocating unit comprising a magnetic/electromagnetic mechanism.

FIG. 17 shows a first example of a relocating unit 41 comprising magnets and/or electromagnets. This principle is based on interactions between electromagnets and/or permanent magnets. By actively controlling the current in electromagnets or moving the permanent magnets, three dimensional movements of the transporting device 40, as well as levitation, can be achieved. Advantageously, combining permanent magnets with electromagnets leads to a number of advantages. For example, permanent magnet to permanent magnet interaction between transporting devices is avoided because the force experienced is difficult to overcome, instead a permanent magnet interacts with an electromagnet. Moreover, an electromagnet interacting with an electromagnet may not generate enough force to lift a transporting device 40. Therefore, it was found that electromagnets interacting with permanent magnets are preferred to generate propulsion force to move a transporting device 40 in any direction. In this way, controlled switching of the electromagnet state gives rise to controllable movement of a transporting device 40. The sides of each transporting device 40 control the vertical and horizontal movement of each transporting device 40 by way of interaction with the sides of other transporting devices 40 which neighbour a side of the transporting device 40 to be moved.

In FIG. 17 no electromagnets or permanent magnets are placed on the top or bottom of the transporting device 40, only on the sides of the transporting device 40. Two adjacent faces of the transporting device 40 comprise electromagnets 61 whilst the other two adjacent faces of the transporting device 40 comprise permanent magnets 62. A neighbouring transporting device 40 comprising a similar arrangement of permanent magnets and electromagnets interacts therewith to generate the propulsion force. As shown in FIG. 17, each of the permanent magnets 62 and the electromagnets 61 are arranged in a profile resembling a hysteresis loop.

Figure 18:
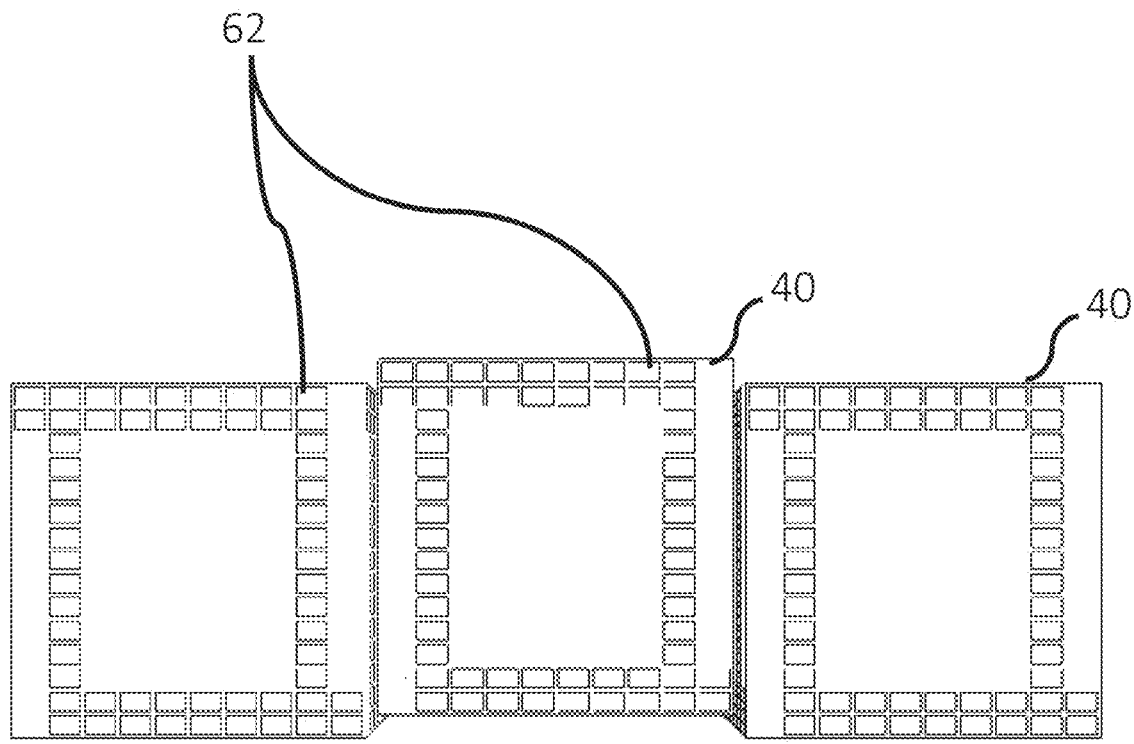
FIG. 18 shows a cluster of transporting devices according to the second embodiment of the present invention, with a first example of a relocating unit comprising a magnetic/electromagnetic mechanism.
Figure 18:
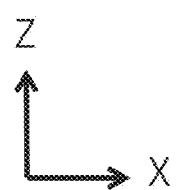

FIG. 18 shows an example of a levitated movement of a transporting device 40 in a cluster. In FIG. 18 the sides of the transporting devices 40 comprising permanent magnets 62 arranged in a hysteresis loop are shown. As can be seen in this Figure, a central transporting device 40 is being moved between two neighbouring transporting devices 40. In this example, one side of the transporting devices 40 comprises permanent magnets 62 and cooperates with corresponding electromagnets 61 on a neighbouring transporting device 40.

The other side of the central transporting device 40 comprises electromagnets 61 which cooperates with corresponding permanent magnets 62 on a neighbouring transporting device 40. In this way, transporting devices 40 tessellate with permanent magnet sides of transporting devices 40 interacting with corresponding electromagnet sides of neighbouring transporting device 40.

Figure 19:
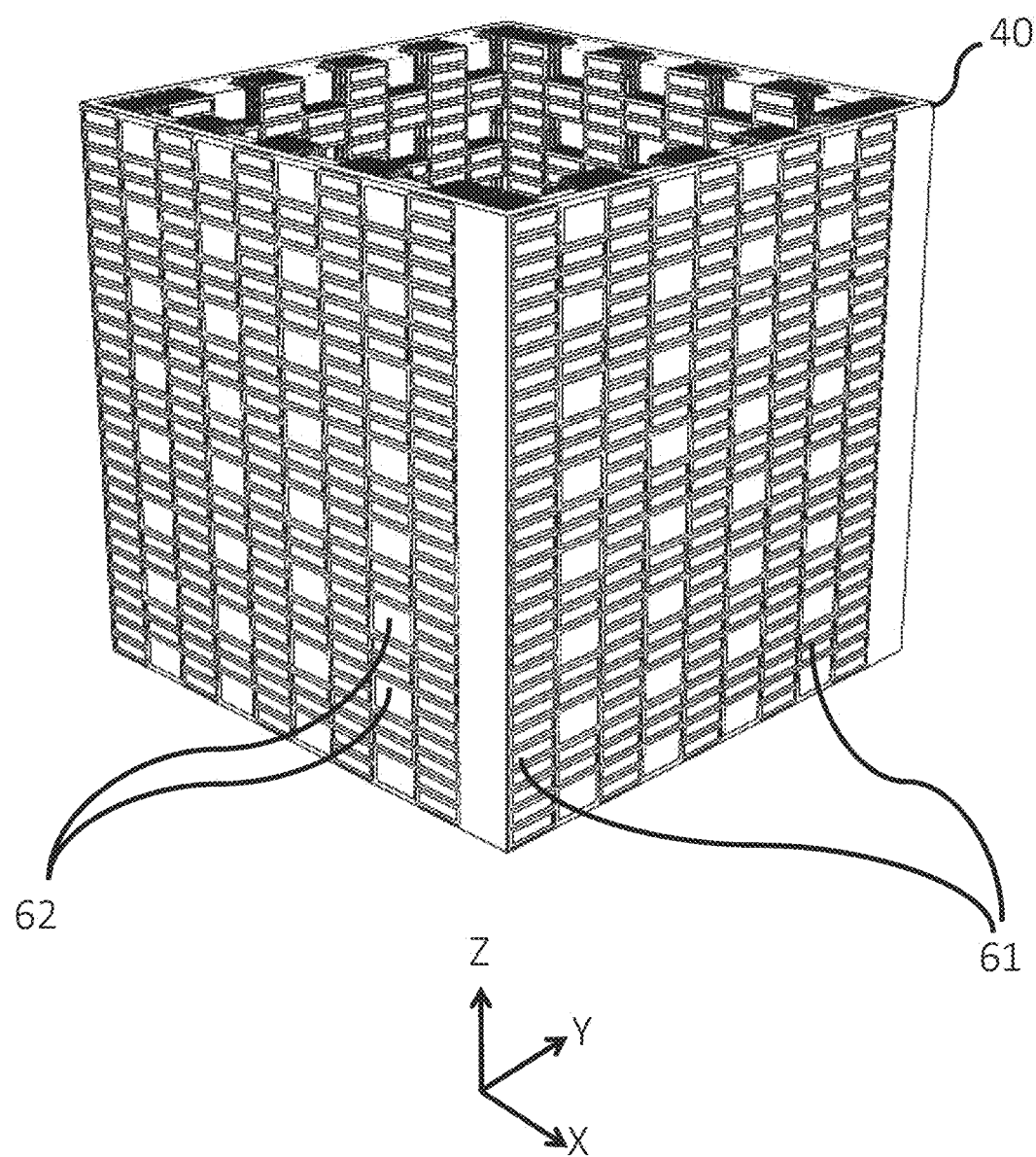
FIG. 19 shows a transporting device according to a second embodiment of the present invention, with a second example of a relocating unit comprising a magnetic/electromagnetic mechanism.

FIG. 19 shows a second example of a transporting device 40 comprising a relocating unit 41 comprising a permanent magnet/electromagnet. In this example, no magnets are located on the top or bottom of the transporting device 40. In the second example, each face of the transporting device 40 comprises features which are identical to other faces of the transporting device 40. This is unlike the first example described above in which faces were not identical, in particular with one face comprising permanent magnets whilst another face would comprise electromagnets. In this second example, all four faces are identical with rotational symmetry. Each face of the transporting device 40 comprises electromagnets 61 and permanent magnets 62 arranged in an alternating pattern on each face of the transporting device 40. In particular, each face is substantially filled with strips. A first strip comprises only electromagnets whilst a second strip arranged adjacent to the first strip comprises permanent magnets 62 and electromagnets 61. The second strip is then arranged next to another first strip and so the pattern continues. As shown in FIG. 19 each face comprises five of the first strips with second strips sandwiched between the first strips and thereby each face comprises four second strips. However, this provided by way of example only and a number of different patterns are envisaged. The sides of each transporting device 40 control the vertical and horizontal movement of the transporting device 40.

Advantageously, each face of the transporting device 40 is responsible for both propelling and lifting each transporting device 40.

Figure 20:
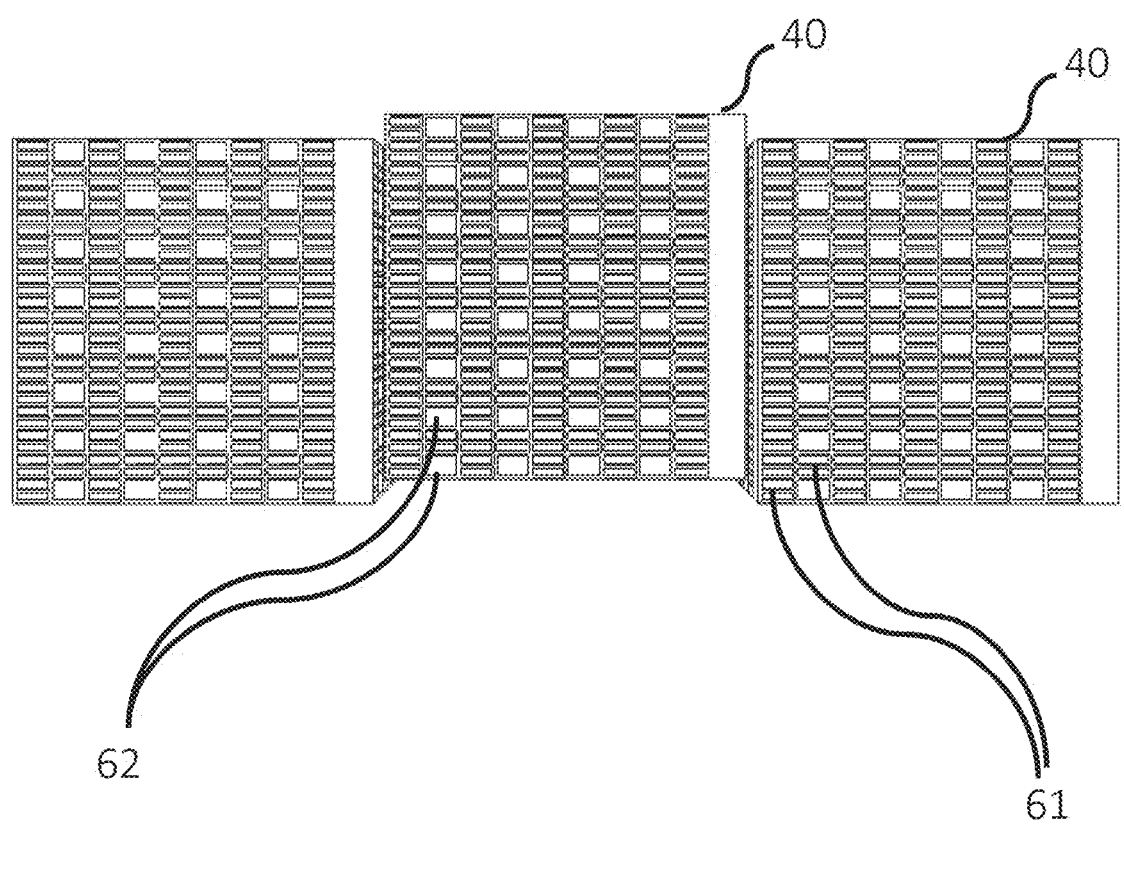
FIG. 20 shows a cluster of transporting devices according to the second embodiment of the present invention, with a second example of a relocating unit comprising a magnetic/electromagnetic mechanism.

FIG. 20 shows an example of a central transporting device 40 being moved between two neighbouring transporting devices 40. As a result of the particular arrangement of magnets result described previously, advantageously, the transporting device 40 being moved does not require power to be moved. Instead, only the neighbouring transporting devices 40 moving the central transporting device 40 require power to propel the central transporting device 40.

One optimisation which may be made to the transporting device 40 shown in the second example would be to remove/omit permanent magnets 62 and electromagnets 61 from a central portion of each face of the transporting device 40. In this way, less resistance would be experienced when moving a transporting device 40.

Figure 21:
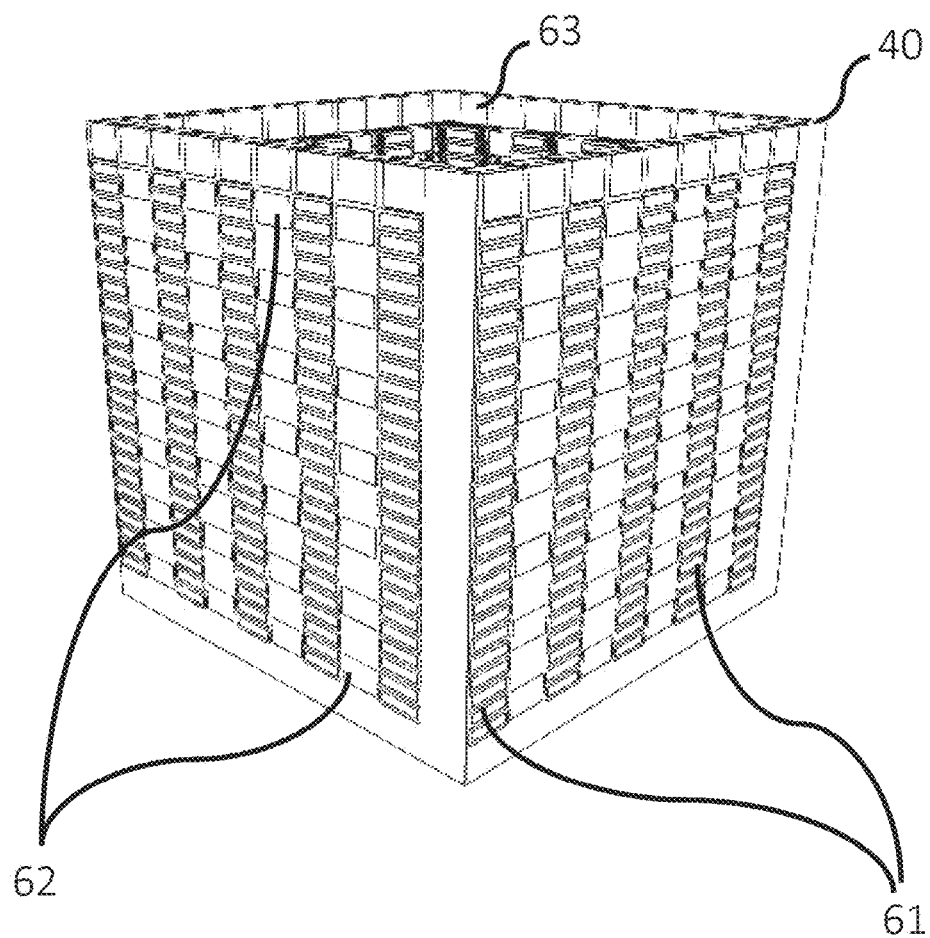
FIG. 21 shows a transporting device according to a second embodiment of the present invention, with a third example of a relocating unit comprising a magnetic/electromagnetic mechanism.
Figure 21:
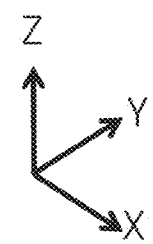
Figure 22:
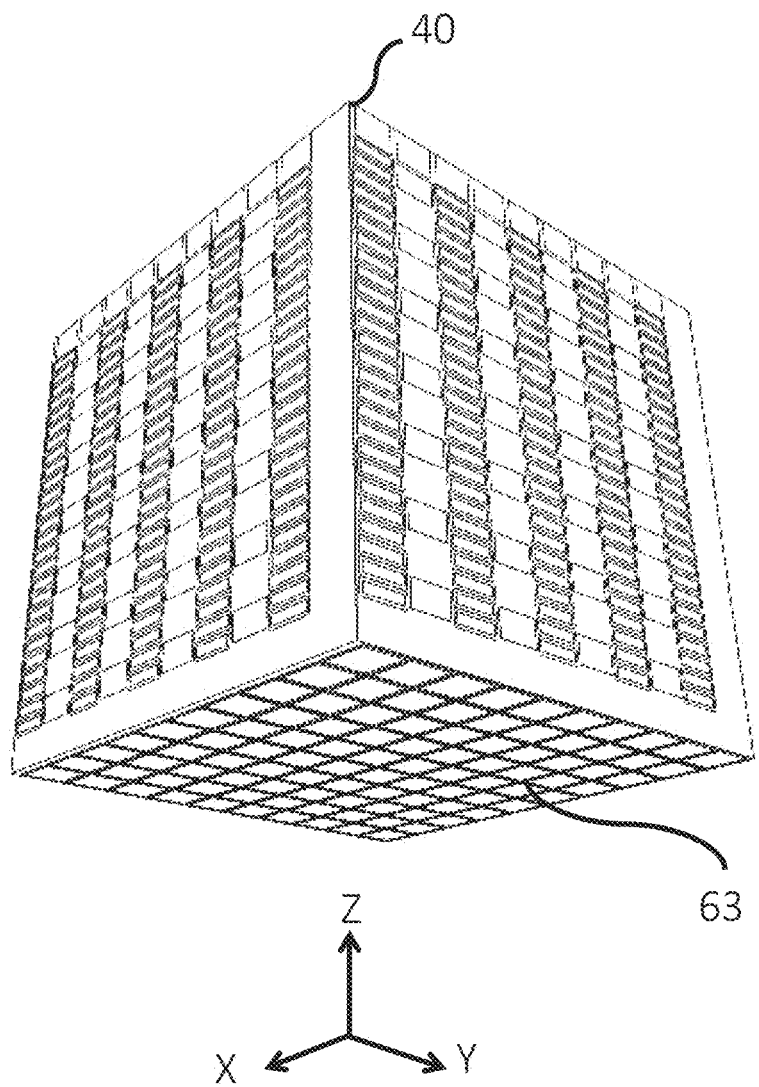
FIG. 22 shows a transporting device according to a second embodiment of the present invention, with a third example of a relocating unit comprising a magnetic/electromagnetic mechanism.

FIGS. 21 and 22 show a third example of a relocating unit 41 comprising magnets. In particular, similar to the second example of a magnetic mechanism described previously, all four faces of the transporting device 40 are arranged identically with strips comprising permanent magnets 62 and electromagnets 61. Similar to the second example, strips of electromagnets 61 are sandwiched (on each face) by strips of permanent magnets 62. As shown, by way of example only, in FIG. 21 each face comprises five strips of electromagnets 61. Between the strips of electromagnets 61 are located strips of permanent magnets 61, in particular four strips on each face. However, unlike the second example, a top edge of the transporting device 40 comprises magnets 63. The magnets 63 may comprise permanent magnets and/or electromagnets.

Moreover, a bottom surface of the transporting device 40 comprises magnets 63. In this way, the sides of the transporting device 40 are responsible for vertical movement in a Z-direction whilst the bottom and top of each transporting device 40 are responsible for levitation and lateral movements in an X-direction and/or Y-direction. Advantageously, this arrangement results in a transporting device 40 that is not required to be powered to be moved. Instead, only neighbouring transporting devices 40 acting on the transporting device 40 to be moved require power.

In this example, some elements of the first embodiment may be incorporated with the second embodiment described herein. In particular, for transporting devices 40 on the bottom of a cluster action of the bottom of the transporting device 40 with a floor comprising magnets may be useful in providing levitation of the transporting device 40.

One optimisation which may be made to the transporting device 40 shown in the third example would be to remove/omit permanent magnets 62 and electromagnets 61 from a central portion of each face of the transporting device 40. In this way, less resistance would be experienced when moving a transporting device 40.

Aside from the examples of relocating units 41 described above, other examples are envisaged. For example, those examples relating to the first embodiment shown in FIGS. 7a, 7b, 8a, 8b, 9a and 9b might equally be applied to the second embodiment of the present embodiment described herein. For example, regarding FIGS. 7a and 7b the transporting device 40 of the second embodiment may comprise omniwheels 11 which may be driven to move the transporting devices 40 within the cluster without reliance on the features of active floor/wall/surface utilised in the first embodiment. Instead, the omniwheels may operate on tops, bottoms or sides of the neighbouring transporting devices 40 within the cluster. In this way, the transporting devices 40 may move in at least two dimensions without requiring the steering/lifting of wheels.

Moreover, the examples shown in FIGS. 8a, 8b, 9a and 9b may also be employed with the relocating unit 41 of the transporting device 40 of the second embodiment. In this example, the track formed of at least one of various magnetic and static components 211, 212, 213, 214, 215 may be comprised in the relocating unit 41 of the transporting device 40 of the second embodiment instead of on a surface as in the first embodiment. More specifically, with reference to FIGS. 8a and 8b the track 211 and magnets 212 may be installed on a top edge of a transporting device 40 such that a neighbouring transporting device 40 comprising the permanent magnets 11. In this way, the permanent magnets 11 are constrained within a physical track 11 permitting the levitation of the transporting device 40. Thereby the transporting device 40 may move in at least two dimensions without requiring the physical lifting of the transporting device 40. Moreover, by attaching the track 211 to the top of the neighbouring transporting device 40 then movement of the transporting device 40 may be effected without the use of an external framework to support the transporting devices 40.

Similarly, the track formed of magnets 213, 214 and 215 shown in FIGS. 9a and 9b may similarly be comprised in the top edge of a transporting device 40 of the second embodiment. In this way, each permanent magnet 215 is surrounded by four electromagnets which act to levitate the transporting device 40 with control of the levitation and smooth movement of each transporting device 40 being controlled by varying the current in each electromagnet 213 and 215. In this way, a transporting device 40 may cooperate with neighbouring transporting devices 40 by way of interaction between the permanent magnet on the bottom of the transporting device 11 and the top of the neighbouring transporting device 40 comprising magnets 213, 214, 215.

FIGS. 23a, 23b, 24a, 24b, 25a, 25b, 26a, 26b show an example of a transporting device 40 comprising a relocating unit 40 which comprises a magneto-mechanical mechanism to achieve relocation of a transporting device 40 within a cluster according to a first example. In particular, each transporting device 40 comprises at least one magnetic wheel which interacts with permanent magnets arranged in a track-like structure (in other words, permanent magnets arranged linearly) on a neighbouring transporting device 40.

Figure 23A:
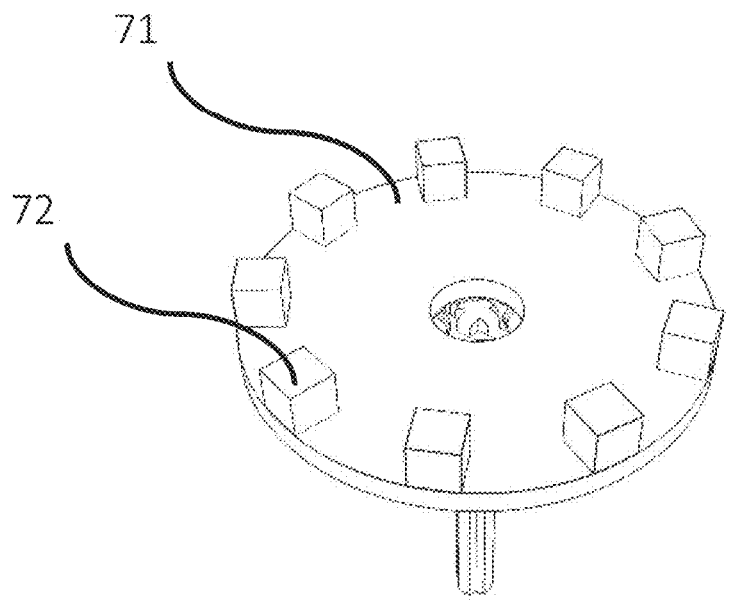
FIGS. 23a and 23b show components of a relocating unit comprising a first example of a magneto-mechanical mechanism.

FIG. 23a shows detail of an example magnetic wheel 71 arranged to be driven by a motor. The wheel comprises an axle and a circular disc. Moreover, the magnetic wheel 71 comprises permanent magnets 72 arranged on a periphery of the magnetic wheel 71. It is envisaged that the permanent magnets 72 could be replaced with electromagnets. In a preferred example, the permanent magnets 72 are arranged in a pattern of alternating polarities with a corresponding alternating polarity on the track-like structure. However, without such a pattern an effective design may still be realised.

Figure 23B:
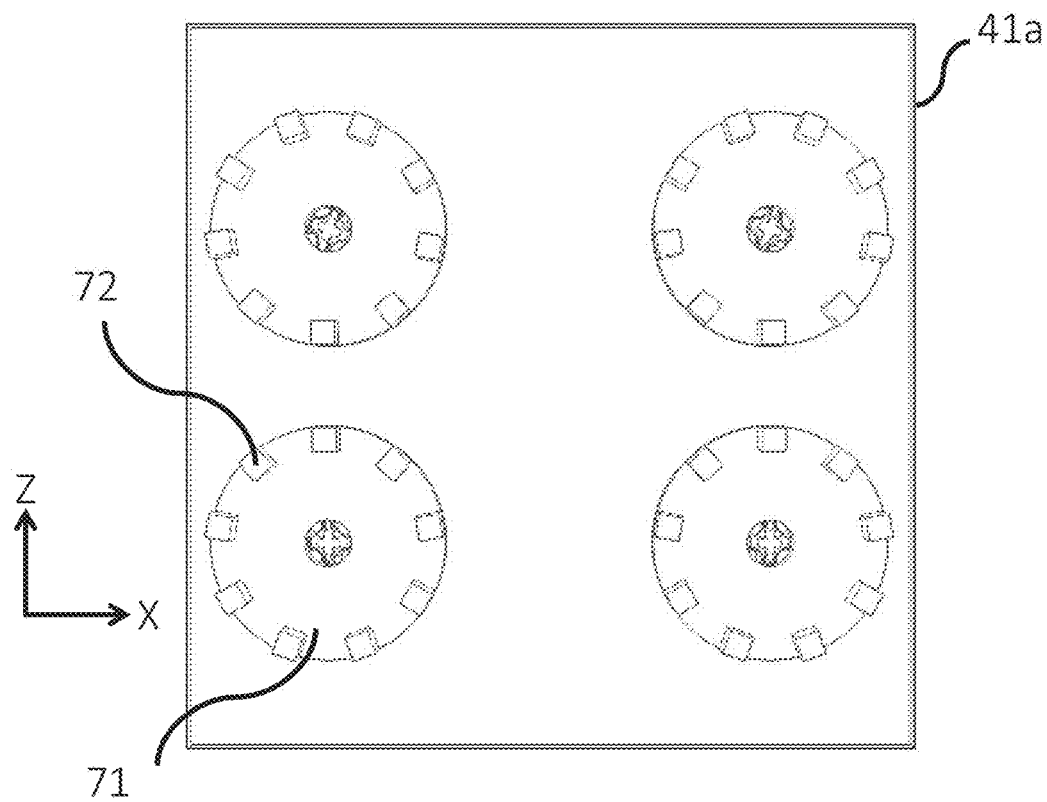

FIG. 23b shows an example arrangement of magnetic wheels 71 on an active face 41a of transporting device 40. In this example, four magnetic wheels 71 are arranged in pattern on the active face 41a. As will be appreciated, other patterns are possible.

Figure 24A:
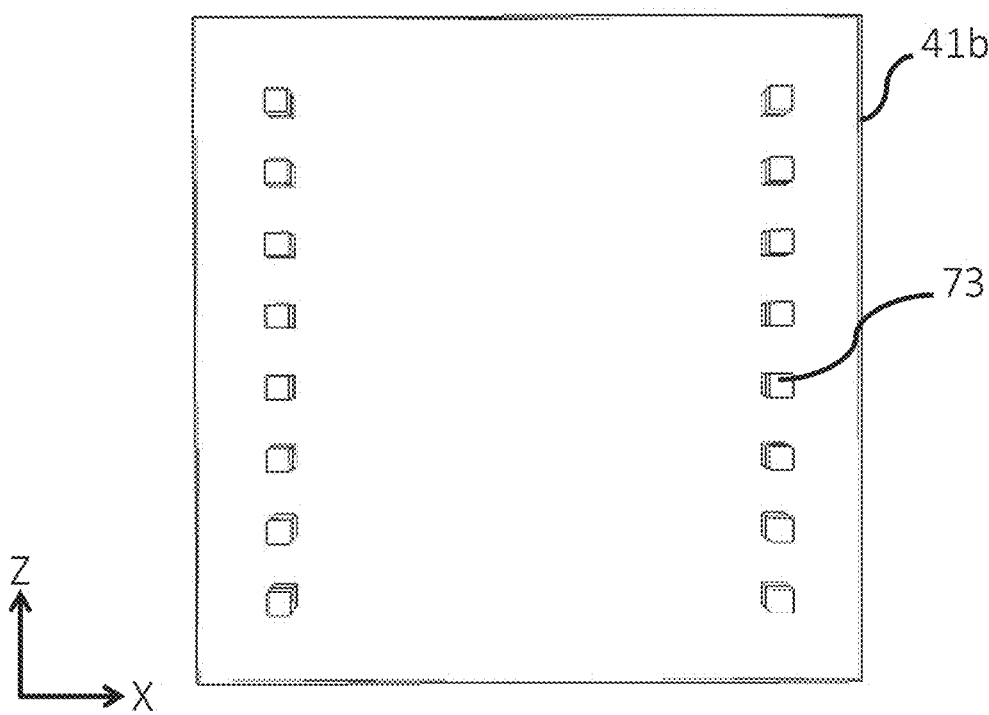
FIGS. 24a and 24b show further components of a relocating unit comprising a first example of a magneto-mechanical mechanism.

FIG. 24a shows an example arrangement of permanent magnets 73 on a passive face 41b of a transporting device 40. It is envisaged that the permanent magnets 73 may be replaced with electromagnets. In this example, the permanent magnets 73 are arranged in a linear, track-like manner to provide an arrangement to which the permanent magnets 71 are attracted to move the transporting device 40 in a linear fashion. It is envisaged that the permanent magnets 73 are arranged inside the transporting device 73, behind the passive face 41b. In this way the exterior faces of the transporting device, both the active and passive faces, are smooth. Although the permanent magnets 73 have been shown running in one direction, it is envisaged that each passive face 41b may comprise more than one track of permanent magnets 73 arranged in different directions such that the transporting device 40 may move in more than one direction.

It is envisaged that each transporting device 40 comprises two active faces 41a arranged on adjacent perpendicular sides of the transporting device 40 and two passive faces 41b arranged on adjacent perpendicular sides of the transporting device 40. In this way, in an X-direction one face is active whilst the second face is passive. Similarly, in a Y-direction direction one face is active whilst the second face is passive.

Figure 24B:
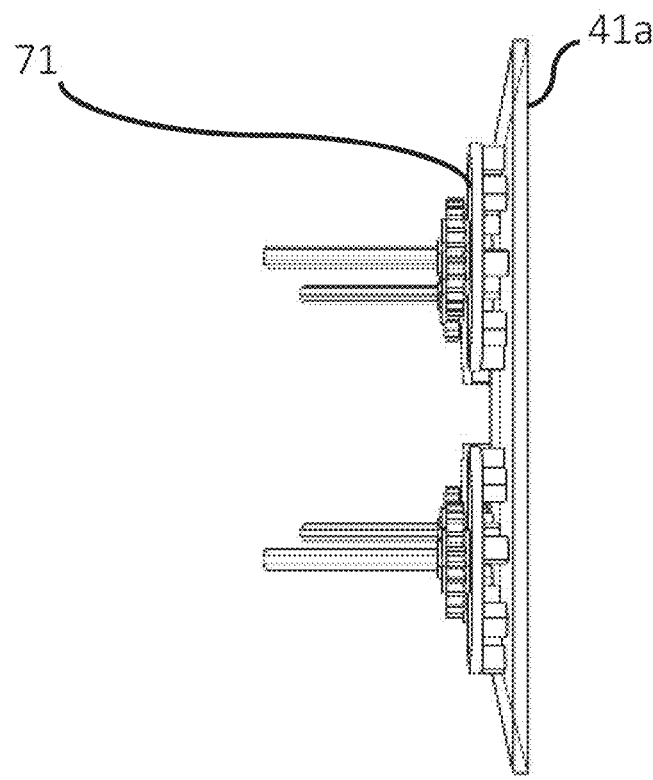

FIG. 24b shows the active face 41a from another viewing angle showing that the magnetic wheels 71 are arranged inside the transporting device 40 i.e. behind the active face 41a. In this way, magnetic field transfers through the active face 41a to interact with the passive face 41b of a neighbouring transporting device 40. In this way, the magnets 72 on the magnetic wheel 71 interact with the magnets 73 arranged linearly on the neighbouring transporting device's passive face to cause movement of the transporting device 40. The magnetic wheels 71 may be moved by way of a motor. By arranging the magnetic wheels 71 inside the transporting device 40 the outer surface of the transporting device 40 is smooth, which may be mechanically advantageous. Moreover, each transporting device 40 is self-contained with no hardware protruding to outside of the transporting device 40. Additionally, magnet to magnet attractions are sufficiently strong to raise a transporting device 40. By causing rotation of the magnetic wheel 71, by way of a motor, lateral and vertical motion of the transporting device 40 can be achieved.

Figure 25A:
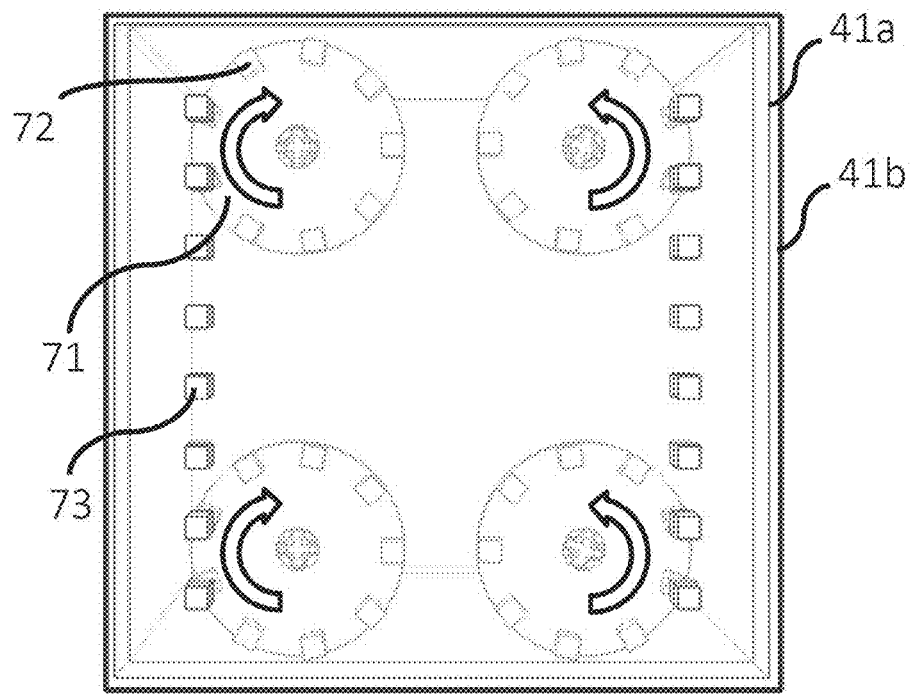
FIGS. 25a and 25b shows the interaction between two transporting devices according to the second embodiment of the present invention, wherein the relocating unit of a transporting device comprises a first example of a magneto-mechanical mechanism.
Figure 25B:
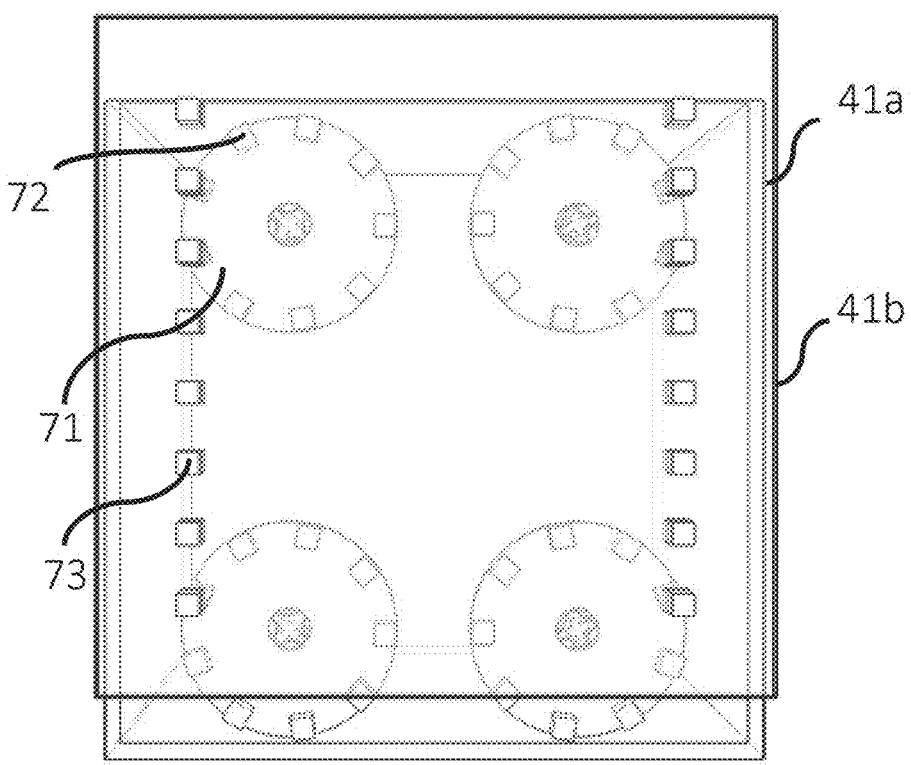

In particular, as shown in FIGS. 25a and 25b motion of a transporting device 40 is depicted. The view shown is a view from inside a transporting device 40 viewing the passive face 41b and beyond that the active face 41a of a neighbouring transporting device 40 together with the magnetic wheels 71 of the neighbouring transporting device 40. In FIG. 25a the magnetic wheels 71 are shown to rotate inside the neighbouring transporting device 40. In this way, interaction between the permanent magnets 72 of the magnetic wheel 71 and the permanent magnets 73 results in the movement of the transporting device 40. As shown, to achieve the motion of the transporting device 40 two of the magnetic wheels 71 rotate in an anticlockwise direction whilst two other magnetic wheels rotate in a clockwise direction. Accordingly, the passive face 41b with the track-like structure of permanent magnets moves tangentially to the rotation of the magnetic wheels 72 in an upward direction thereby relocating the transporting device 40 upwards. As will be appreciated, the view shown in FIG. 25a is the view from only one side of the transporting device 40. Not shown is actions performed by a face of the transporting device 40 which is parallel to the face shown in FIG. 25a which may comprise an active face 41a. In this example, the magnetic wheels 40 the active face 41a of the transporting device 40 which is being relocated may move in a similar manner to the magnetic wheels 71 of the neighbouring transporting device 40 thereby supporting the transporting device 40 from two faces by way of interaction between a passive face 41b and an active face 41a. In this way, by the use of symmetrical operation of active face 41a to passive face 41b interactions across faces of the transporting device 40 then relocation of the transporting device 40 may be achieved. Moreover, with the arrangement of the track-like structure of permanent magnets being arranged in particular X, Y or Z-directions then relocation of the transporting device 40 in three dimensions is achieved.

FIG. 25b shows the result of the operation shown in FIG. 25a. In particular, the transporting device 40 comprising the passive face 41b has been moved upwards relative to the transporting device 40 comprising the active face 41a. As will be appreciated, the direction of upwards is by way of example only, by arranging the track-like structure of permanent magnets in a different direction then movement of the magnetic wheels 71 would cause the relocation of the transporting device 40 in a different direction.

Figure 26A:
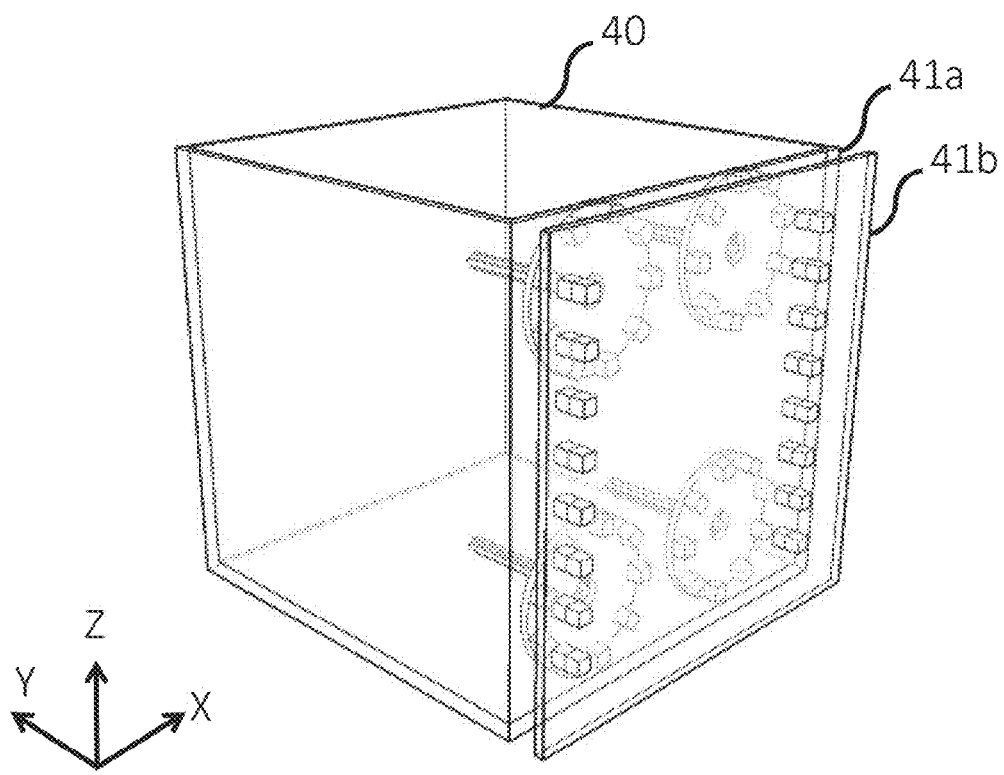
FIGS. 26a and 26b shows the interaction between two transporting devices according to the second embodiment of the present invention, wherein the relocating unit of a transporting device comprises a first example of a magneto-mechanical mechanism.
Figure 26B:
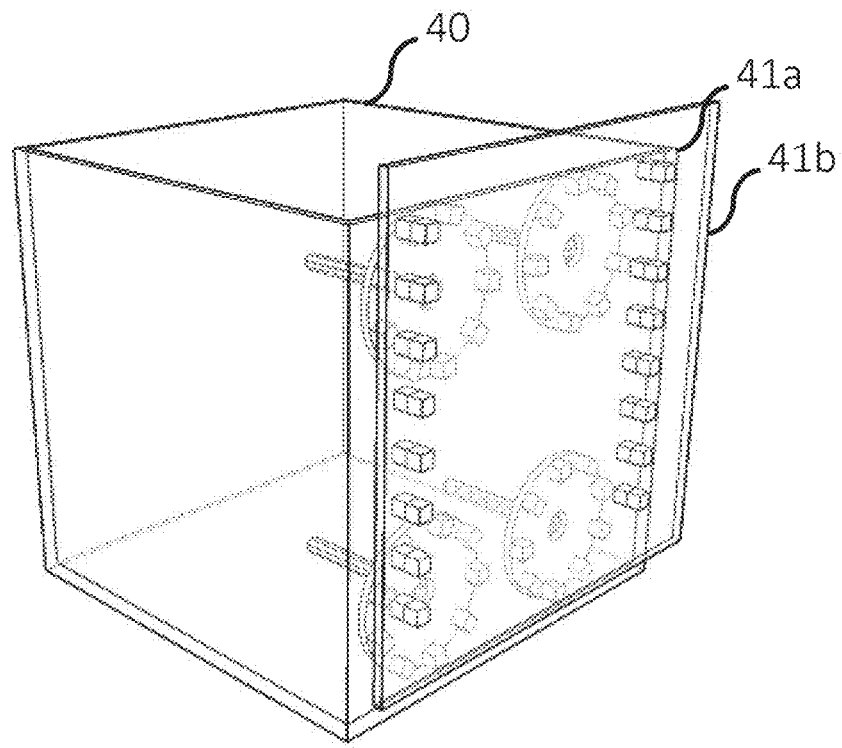

FIGS. 26a and 26b are perspective viewing angles of a neighbouring transporting device 40 comprising an active face 41a together with detail of a passive face 41b of a transporting device 40 being relocated by way of action of the neighbouring transporting device 40. As was previously described with reference to FIGS. 25a and 25b, each transporting device 40 may comprise an active face 41a and a passive face 41b. In FIG. 26a the magnetic wheels 71 of the neighbouring transporting device 40 are made to turn in a manner to cause the track-like structure of permanent magnets on the transporting device 40 to move upwards. The interaction of the moving permanent magnets 72 mounted to the magnetic wheels 71 with the permanent magnets 73 of the track-like structure causes the upwards movement of the transporting device 40. In FIG. 26b the position of the passive face 41b indicates the position of the transporting device 40 after the operation started in FIG. 26a has been completed. As shown, the transporting device 40 has been moved upwards by the interaction with the magnetic wheels 71 in the neighbouring transporting device 40.

Figure 27:
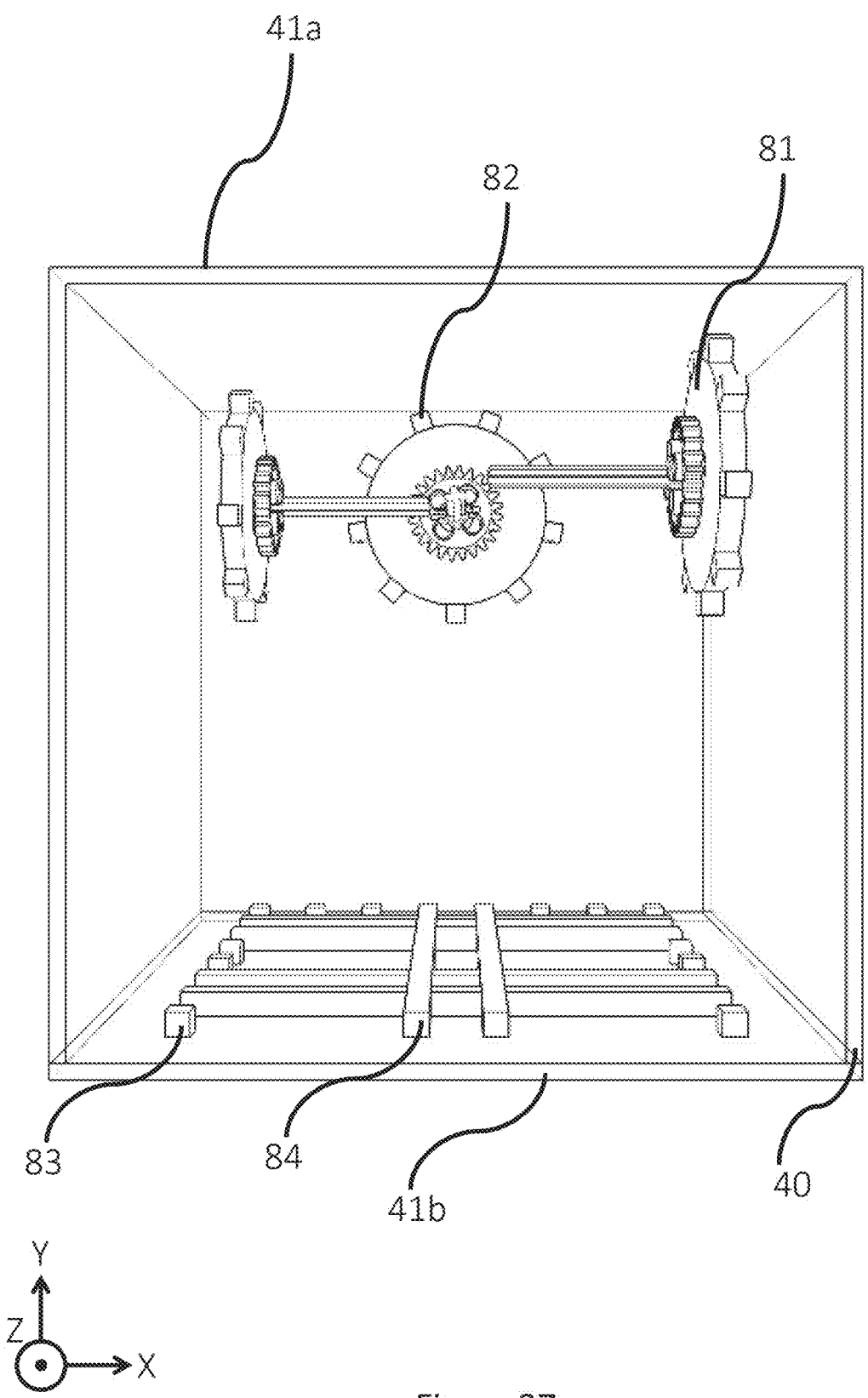
FIG. 27 shows a transporting device according to a second embodiment of the present invention, wherein the relocating unit of a transporting device comprises a second example of a magneto-mechanical mechanism.

FIG. 27 shows a top view of a transporting device 40 comprising a relocating unit 41 wherein the relocating unit 41 comprises a magneto-mechanical mechanism according to a second example. In particular, the relocating unit 41 comprises at least one magnetic wheel 81. The magnetic wheel 81 comprising a plurality of permanent magnets 82 arranged around the periphery thereof. It is envisaged that other magnets could be used for this purpose, for example, electromagnets. In this particular example, the action of the permanent magnets 82 is perpendicular to the axle of the magnetic wheel 81. In particular, the poles of the permanent magnets 82 are arranged perpendicularly to the magnetic wheel 81. Advantageously, this saves space. The axle of the magnetic wheel 81 is arranged to be driven by a motor. Similar to the transporting device 40 described above utilising a first example of a magneto-mechanical mechanism with reference to FIGS. 23a and 23b, by way of action of the magnetic wheels 81, through an active face 41a to interact with magnets arranged in/on a passive face 41b of a neighbouring transporting device 40.

Figure 28A:
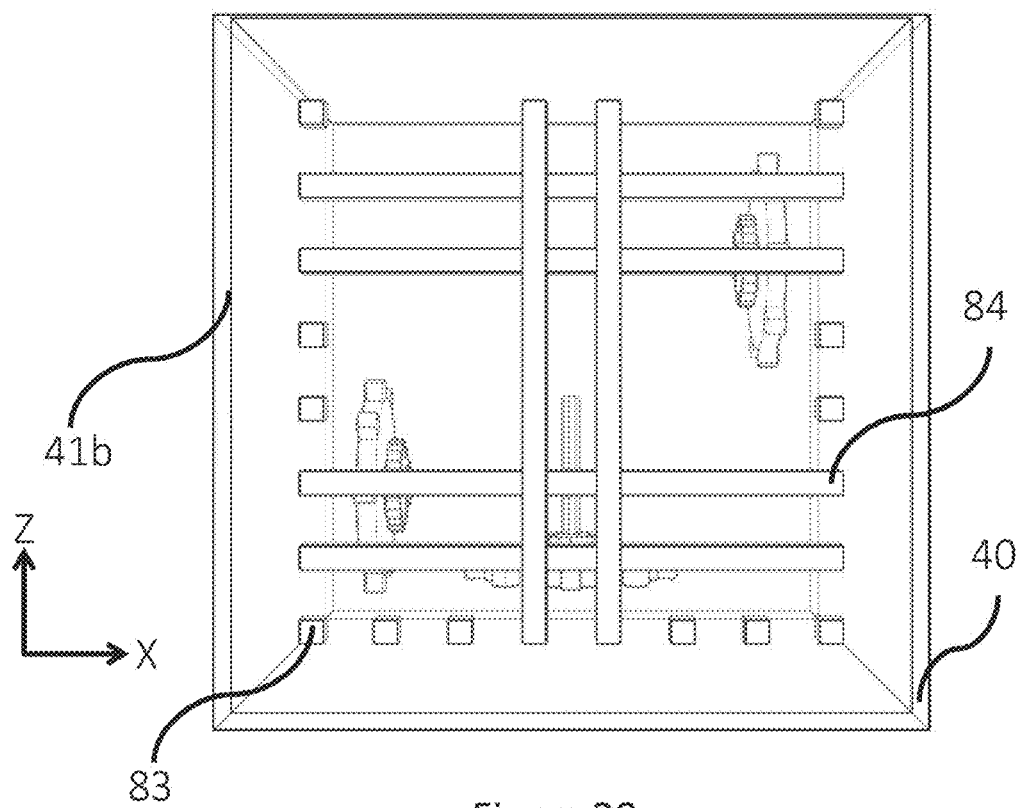
FIGS. 28a and 28b show further detail of a transporting device according to a second embodiment of the present invention, wherein the relocating unit of a transporting device comprises the second example of a magneto-mechanical mechanism.

FIG. 28a shows a front view of a transporting device 40 with more detail of the passive face 41b of the transporting device 40. In other words, a view of a passive face 41b of the transporting device 40 is shown. The passive face 41b comprise singular permanent magnets 83 and elongated permanent magnets 84. It is envisaged that electromagnets could be used instead of permanent magnets. The particular arrangement of a singular permanent magnets 83 around the passive face 41b provide a track-like structure against which the permanent magnets 82 mounted to the magnetic wheel 81 are able to interact with. Moreover, the addition of elongated permanent magnets 83 may be used as a supporting structure to attract neighbouring transporting devices 40 together to thereby form a holding force between transporting devices 40.

Figure 28B:
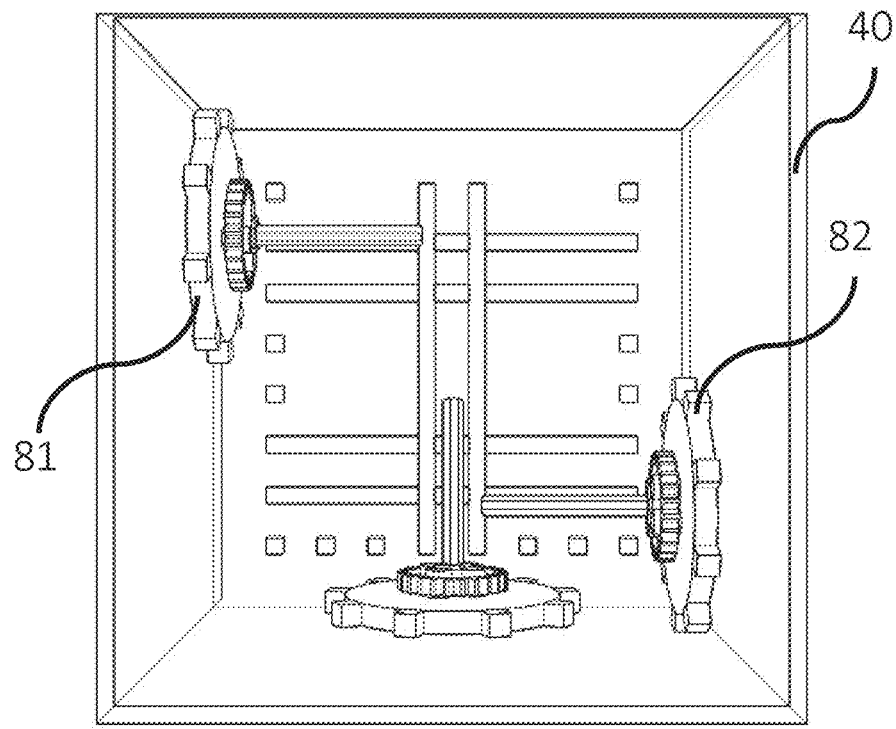

FIG. 28b shows a back view of a transporting device 40 with more detail of the active face 41a of the transporting device 40. In other words, a view of an active face 41a of the transporting device 40 is shown. As described previously, the active face 41a comprises a magnetic wheel 81 and permanent magnets 82 mounted thereon. It is envisaged that the magnetic wheels 81 may be arranged behind an outer surface of the transporting device 40 so that the magnetic field passes through the outer surface of the transporting device 40 permitting magnetic action on a neighbouring transporting device 40 whilst ensuring that an outer surface of the transporting device is smooth. The same may be applied to the passive face 41b of the transporting device 40.

FIG. 28b shows one example of a layout of magnetic wheels 81 arranged on an active face 41a of a transporting device 40. In particular, two magnetic wheels 81 are arranged to rotate in a vertical orientation whilst one wheel is arranged to rotate in a horizontal direction. In this way, by way of cooperation with other transporting devices 40 in a cluster, the transporting device 40 may move in a first direction and/or a second direction. Corresponding mechanisms on two adjacent faces of the transporting device 40 thereby permit the transporting device 40 to move in any of three directions. In particular, by way of each magnetic wheel 82 rotating about its axle interaction between the permanent magnets 82 on the magnetic wheel 81 and permanent magnets 83 and 84 on a neighbouring transporting device 40 permit the relocation of the transporting device 40. It is envisaged that other layouts of the magnetic wheels 81 in the transporting device 40 are equally applicable for the relocation of a transporting device 40 within a cluster.

FIGS. 29 to 37 show a third example of a relocating unit 41 of a transporting device 40 comprising a magneto-mechanical mechanism. This example differs from the first and second example in that each side face of the transporting device 40 comprises an active section and a passive section therefore no side face is entirely passive or active, unlike previous examples.

Figure 29:
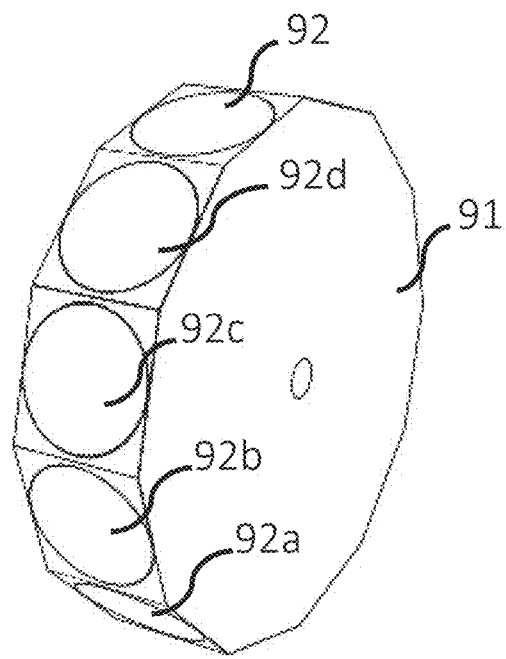
FIG. 29 shows an example of a magnetic wheel for use with a transporting device according to a second embodiment of the present invention, wherein the relocating unit of a transporting device comprises a third example of a magneto-mechanical mechanism.

FIG. 29 shows an example of a magnetic wheel 91 for use with the third example. The magnetic wheel comprises permanent magnets 92 arranged around a periphery thereof. It is envisaged that the permanent magnets 92 or magnetic wheel 91 and permanent magnets 92 could be replaced with electromagnets. The magnetic wheel 91 is arranged to be rotated by way of a motor wherein the magnetic wheel 91 is arranged to fit onto an axle of the motor so as be connected directly or indirectly to a motor. As shown in FIG. 29, the circumference of the magnetic wheels 91 has embedded therein the permanent magnets 92. It has been found that by using conically shaped magnets advantageously increases the field strength at the circumference of the magnetic wheel 91. However, other arrangements and/or shapes of permanent magnets 92 are envisaged for example the use of multiple magnets to create greater strengths combined such as combining a cylindrical magnet with a cube shaped magnet may approximate the strength of a conical magnet. In the magnetic wheel 91, advantageously, the magnetic poles of the permanent magnets 92 are arranged to alternate around the circumference of the magnetic wheel 91. For example, the particular permanent magnet 92a may be arranged with a north pole of the magnet facing outwards from the centre of the magnetic wheel 91. Accordingly, the permanent magnet 92b may be installed with a south pole of the magnet facing outwards from the centre of the magnetic wheel 91. Therefore, the permanent magnet 92c may be installed with a north pole facing outwards whilst permanent magnet 92d with a south pole facing outwards. In this way, the magnetic poles alternate around the circumference of the magnetic wheel 91. Therefore, advantageously, the circumference of the magnetic wheel 91 comprises an even number of permanent magnets 91.

Optionally, the magnetic wheel 91 may be sprung in the transporting device 40 by way of a spring or the like. In this way a resting position of the magnetic wheel 91 may be inside the transporting device 40 and the magnetic wheel 91 attains its engaged position, outside of the transporting device, using a magnet of a neighbouring transporting device 40 to attract the wheel, against the spring force, to a position outside of the transporting device 40.

Figure 30A:
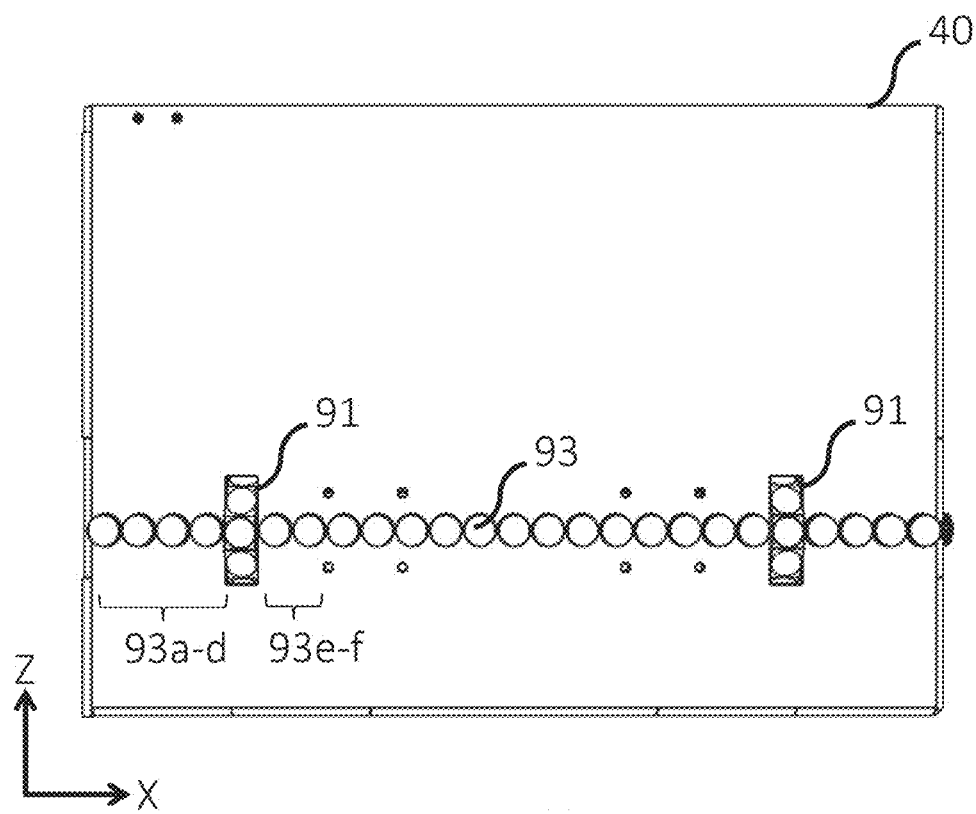
FIGS. 30a and 30b show an example of a transporting device according to a second embodiment of the present invention, wherein the relocating unit of a transporting device comprises the third example of a magneto-mechanical mechanism.
Figure 30B:
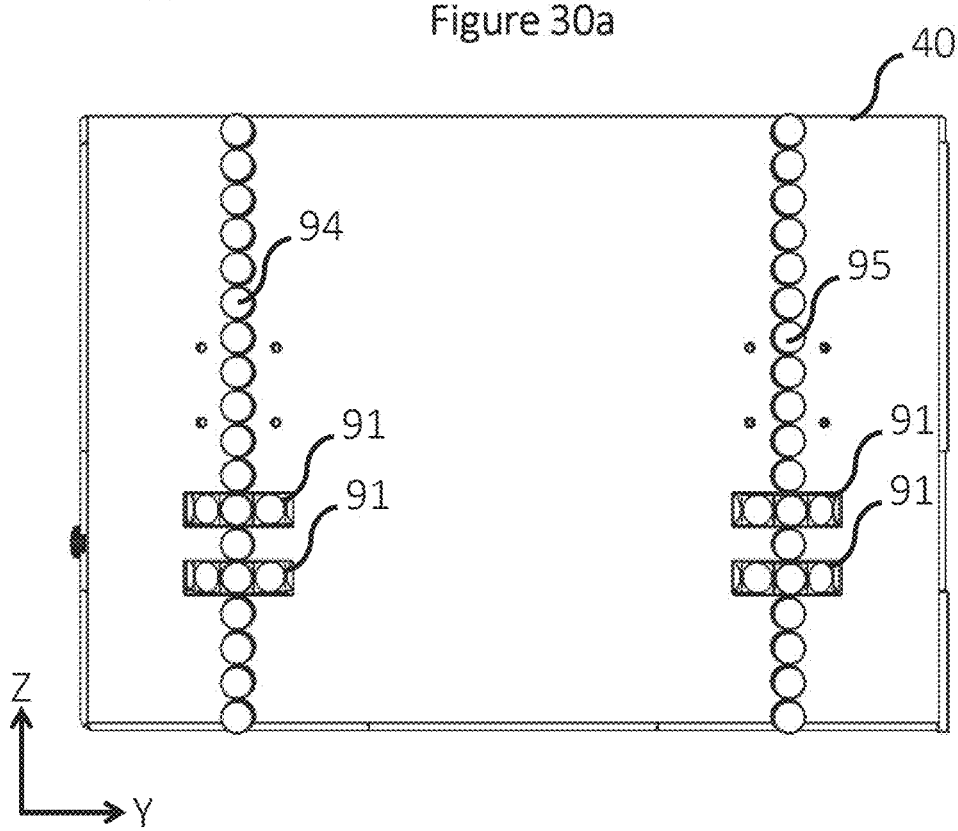

FIGS. 30a and 30b show examples of faces of the transporting device 40. For simplicity, the face shown in FIG. 30a may be referred to as an A-face whilst the face in FIG. 30b may be referred to as a B-face. In this example of a transporting device comprising four faces, the transporting device 40 is arranged to comprise two A-faces and two B-faces. The two A-faces are arranged perpendicular to one another and the two B-faces are arranged perpendicular to one another. Therefore, at two corners of the transporting device 40 the face type changes from an A-face to a B-face.

FIG. 30a shows an example of an A-face. In this example, the A-face is shown extending in an X-direction and Z-direction, although as will be appreciated the A-face may extend in any direction. The A-face comprises at least one magnetic wheel 91, in this example, the A-face comprises two magnetic wheels 91 arranged along an X-direction on opposite sides of the A-face. The A-face also comprises a first magnet track 93 comprising individual permanent magnets. As will be appreciated, there may be one or more magnetic tracks 93 on the A-face. The individual permanent magnets in this example are arranged linearly along an X-direction. Although, it is envisaged that the permanent magnets may be formed of electromagnets and may extend in any direction. The magnetic wheels 91 are arranged mounted to a motor which is arranged inside the transporting device 40. The magnetic wheels 91 are arranged to extend through openings in the transporting device 40. Moreover the mounting of the magnetic wheels 91 is such that the face of the magnetic wheel co-planar with the A-face has a distance from the A-face the same as the permanent faces of the first magnetic track 93. In other words, the first magnetic track 93 comprises two locations in which no magnet is installed and correspond with openings in the A-face through which the magnetic wheel 91 can protrude. However, when the magnetic wheel 91 is installed these missing locations in the first magnetic track 93 are filled by the magnets of the magnetic wheel 91 with minimal gap between the first magnetic track 93 and the magnetic wheel 91. Moreover, the magnetic wheel 91 is installed such that the surface of the first magnetic track 93 and the circumference of the magnetic wheel 91 are aligned thereby forming a continuous, relatively flat surface of magnets. Additionally, the magnetic wheel is installed so as to rotate in a direction perpendicular to the direction of the magnetic track 93.

The first magnetic track 93 is formed of permanent magnets whose magnetic poles alternate from one magnet to the next. For example, a section of the first magnetic track 93 comprising six permanent magnets installed in the A-face is identified as 93*a-d* and 93*e-f*. In this regard, the permanent magnets of the magnetic wheel 91 is not regarded to be part of the first magnetic track 93 even though when installed the combination of magnetic wheel 91 and first magnetic track 93 forms an extent of permanent magnets along the A-track. However, for this example, a differentiation will be drawn between those magnets permanently affixed to the A-face and those which rotate as part of the magnetic wheel.

In this regard, the first magnet 93*a* in the X-direction may be installed to be a north pole, the second magnet 93*b* to be a south pole, the third magnet 93*c* to be a north pole, fourth magnet 93*d* to be a south pole. Therefore, the magnetic poles alternate across the A-face. The next location is the gap in the first magnetic track 93 for the installation of the magnetic wheel 91, it is assumed as if a magnet is installed in that location is of an alternate magnetic pole. Therefore, the next location, the fifth magnet 93*e* installed on the opposing side of the gap has the same pole as the fourth magnet 93*d*, namely a south pole. The sixth magnet 93*f* is therefore a north pole and so on across the A-face.

In this way, the first magnetic track 93 forms a track of alternating magnetic poles across the A-face. In at least one location on the A-face is formed a gap in the first magnetic track 93 which allows for a variable magnetic pole (of the magnetic wheel 91) to be rotated into position on the magnetic wheel to either continue the alternating pattern of poles on the first magnetic track 93 or to install a pole of magnet identical to the two magnets on either side of magnetic wheel 91. For example, if the fourth magnet 93*d* and fifth magnet 93*e* are installed to be a south pole, then magnetic wheel 91 may rotate to locate a north pole magnet in the gap thereby continuing the alternating magnetic track. Alternatively, the magnetic wheel 91 may be rotated to locate a south pole breaking the alternating pattern resulting in three south poles next to each other.

FIG. 30*b* shows an example of a B-face. The B-face is similar to the A-face in that it comprises at least one magnetic wheel 91 and at least one magnetic track. However, in this specific example, the B-face differs in that it comprises a total of four magnetic wheels 91 and two magnetic tracks 94 and 95. More specifically, each magnetic track 94 is used in conjunction with two magnetic wheels 91, where each of the two magnetic wheels 91 are installed to rotate in a direction perpendicular to the direction of the magnetic track 94. Moreover, when comparing the A-face with the B-face, the magnetic tracks 94 and 95 of the B-face are installed in a direction perpendicular to the direction of the magnetic track 93 of the A-face. More specifically, the magnetic track 93 is installed in an X-direction whilst the magnetic tracks 94 and 95 are installed in a Y-direction. In other respects, the magnetic wheels 91 and magnetic tracks 94 and 95 are installed in a manner similar to the A-face. In particular, each of the magnetic tracks 94 and 94 comprise permanent magnets (although electromagnets may be substituted or used in addition) arranged with alternating poles along the length of each magnetic track 94 and 95. Moreover, the magnetic tracks 94 and 95 on the B-face are of opposing poles, although other arrangements may alternatively or additionally be employed. For example, if at first magnet of a first magnetic track 94 is a north pole then the first magnet of the second magnetic track 95 is a south pole. The gaps in each magnetic track 94 and 95 are handled in the same manner as for the A-face in that the magnetic pole of the permanent magnets on either side of the gap are the same thereby continuing the alternating magnetic pole pattern across the B-face. As a result of this, it may be important to install each magnetic wheel 91 carefully to ensure that the magnetic wheels 91 relating to each magnetic track 94 are in the correct position. For example, for the first magnetic track 94 when a first magnetic wheel 91 (i.e. the lower magnetic wheel 91) for that track is installed with initially a north pole magnet facing outwards of the transporting device 40 then the corresponding second magnetic wheel 91 (i.e. the upper magnetic wheel 91) should also be installed in the same orientation with a north pole magnet facing outwards, although other arrangements may alternatively or additionally be employed.

Although the previously described A-face and B-face are constructed with the magnetic tracks 93, 94 and 95 on the outside of the transporting device 40 together with magnetic wheels 91 being located in gaps in the A-face and B-face so as to match up with the level of each of the magnetic tracks, it will be appreciated that the magnetic tracks and the magnetic wheels 91 may be installed behind (or flush with) the outer surface of the A-face and the B-face, in other words, mounted on the inside of the transporting device 40. In this way, the outer surface of the transporting device 40 is smooth, which may be mechanically advantageous.

FIGS. 31*a*, 31*b*, 32*a* and 32*b* show views around each of the corners of the transporting device 40 showing the arrangement of A-faces and B-faces on a four sided transporting device 40. These Figures are provided by way of example and other arrangements of transporting devices 40 are envisaged. For example, transporting devices 40 with more or fewer sides. Preferably, the transporting devices 40 tessellate to maximise the storage of the cluster and also to ensure that each side of the transporting device 40 is engaged and arranged to interact with the side of a neighbouring transporting device 40.

Figure 31A:
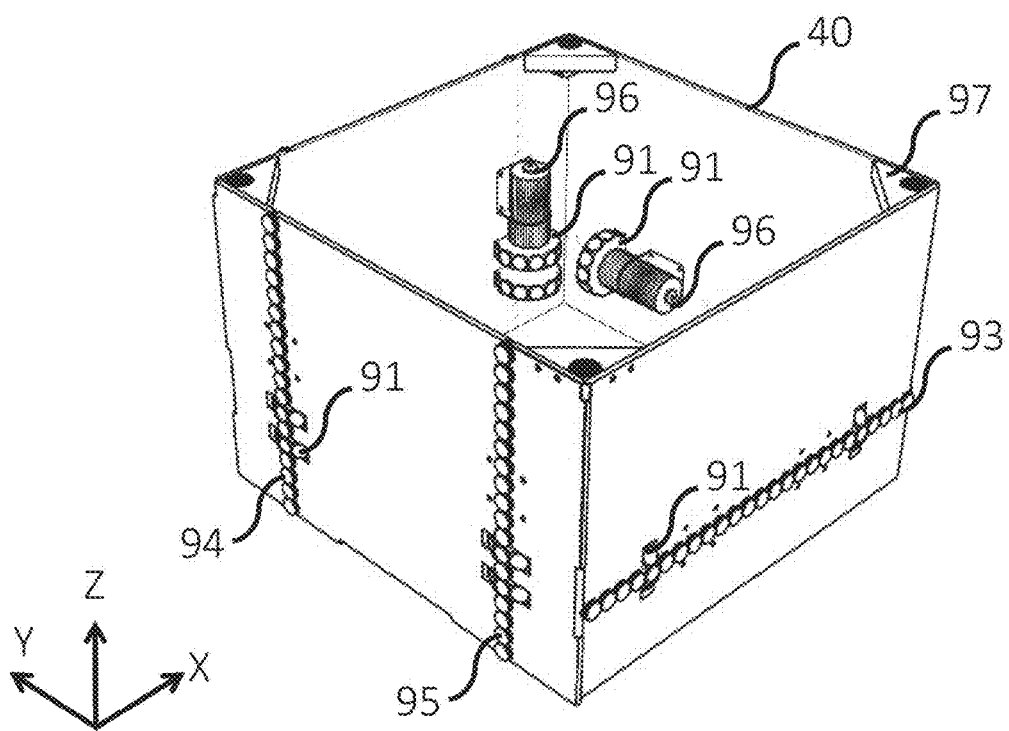
FIGS. 31a and 31b show further views of an example of a transporting device according to a second embodiment of the present invention, wherein the relocating unit of a transporting device comprises the third example of a magneto-mechanical mechanism.

FIG. 31a shows a first corner of the transporting device 40 at which a B-face perpendicularly attaches to an A-face. As can be seen, the magnetic tracks 94 and 95 and magnetic wheels 91 of the B-face are arranged perpendicularly with the magnetic track 93 and magnetic wheels 91 of the A-face.

The particular arrangement of A-faces and B-faces around the transporting device 40 ensures that when the transporting devices 40 are arranged in a cluster then the A-faces of a transporting devices 40 interacts with the B-face of neighbouring transporting devices 40 in both an X-direction and in a Y-direction. Moreover, the B-faces of a transporting device 40 interact with the A-faces of neighbouring transporting devices 40 in an X-direction and in a Y-direction. Such interactions ensure that each transporting device 40 can be relocated in an X, Y and/or Z-direction by way of coordinated movement of magnetic wheels 91 on the transporting device 40 to be relocated together with at least one magnetic wheel 91 on at least one neighbouring transporting device 40, in this way the power and hardware requirement in each transporting device is reduced.

More generally, the particular arrangement of an A-face and a B-face provides a movement in a Z-direction and a movement in an X-direction or a Y-direction. Therefore, the combination of two faces provides the ability for movement in at least two dimensions.

FIG. 31a also shows a motor 96 arranged to rotate a magnetic wheel 91. The motor may be any motor such as a direct current motor or an alternating current motor. In some situations it may be preferable to use a stepper motor to permit accurate turning of the motor to ensure the correct magnet pole to exposed on the side of the transporting device 40. Alternatively, other types of motors may be used, such as BrushLess Direct Current motors. Appropriate sensors, such as Hall Effect sensors, may be employed at a location next to the magnetic wheel 91 to appropriately sense the current rotation state of the magnetic wheel 91. As will be appreciated, other sensor units may be employed to detect the rotation state, including, using Back EMF measurements or other measures of motor current and/or voltage to determine the rotation state of the magnetic wheel 91 and/or relative position of other faces. Optical sensors are also envisaged. Each set of magnetic wheels 91 is shown driven by an individual motor 96, however, other alternatives are envisaged such as using a single motor to drive all magnetic wheels 91 and using a clutch mechanism to transfer rotational power to appropriate magnetic wheels 91.

Moreover, as shown in this Figure two magnetic wheels 91 on the B-face are shown driven by a single motor 96 on a common axle. However, alternatives are envisaged such as individually driving each magnetic wheel 91 on the B-face. Stiffening element 97 is shown at each top corner of the transporting device 40. Such stiffening elements 97 are optionally employed to increase the rigidity to the transporting device 40. In particular, by use of stiffening elements 97 then reduced stiffness walls may be used for the transporting device thereby permitting the employment of thinner walls. This has the advantage of reducing the weight of the transporting device 40 allowing the use of weaker magnets. Moreover, the stiffening elements 97 may be used as the engagement unit 43. In particular, the bottom of a transporting device 40 may comprise spikes in the corners thereof arranged to located in the stiffening element 97 arranged to operate as an engagement unit 43. This permits the accurate location of each transporting device 40 when forming a stack. Moreover, the stiffening elements 97 may further comprise a power transfer means such as electrical contacts arranged to transfer electrical power between transporting devices 40 and/or between an electrical power source and a transporting device 40. For example, the bottom of a neighbouring transporting device 40 may comprise electrical contacts arranged to contact corresponding electrical contacts comprised in the stiffening elements 97. In such a manner, electrical power may be transferred to/from a transporting device 40. Alternatively, inductive power transfer/communications may be used.

Figure 31B:
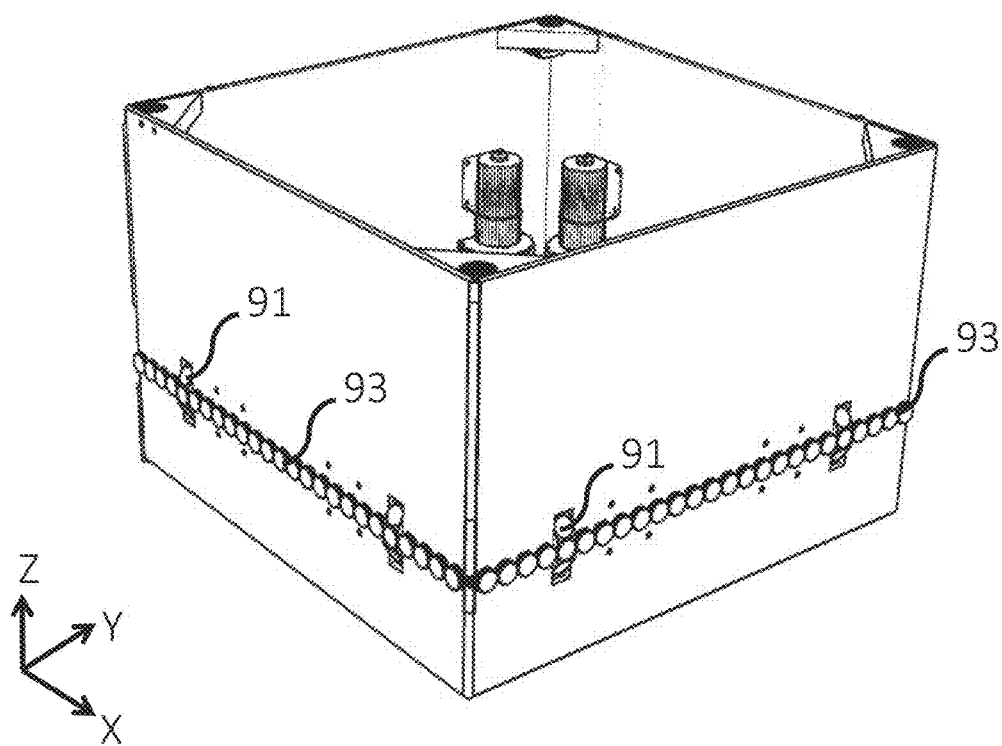

FIG. 31b shows a view of a transporting device 40 from a second corner thereof. In particular, relative to the view of FIG. 31a, the view of the transporting device 40 has rotated by 90 degrees anticlockwise relative to a centre of the transporting device 40. In this view, the two A-faces of the transporting device 40 are shown, arranged perpendicular to each other. In this way, the transporting device 40 comprises an A-face in an X-direction, an A-face in a Y-direction, a B-face in an X-direction and a B-face in a Y-direction. In this way, for example, the A-face in the X-direction interacts with a corresponding B-face in an X-direction on a neighbouring transporting device 40 whilst the B-face in the X-direction interacts with a corresponding A-face in an X-direction on another neighbouring transporting device 40. Similarly, the Y-direction is arranged in a like manner.

Figure 32A:
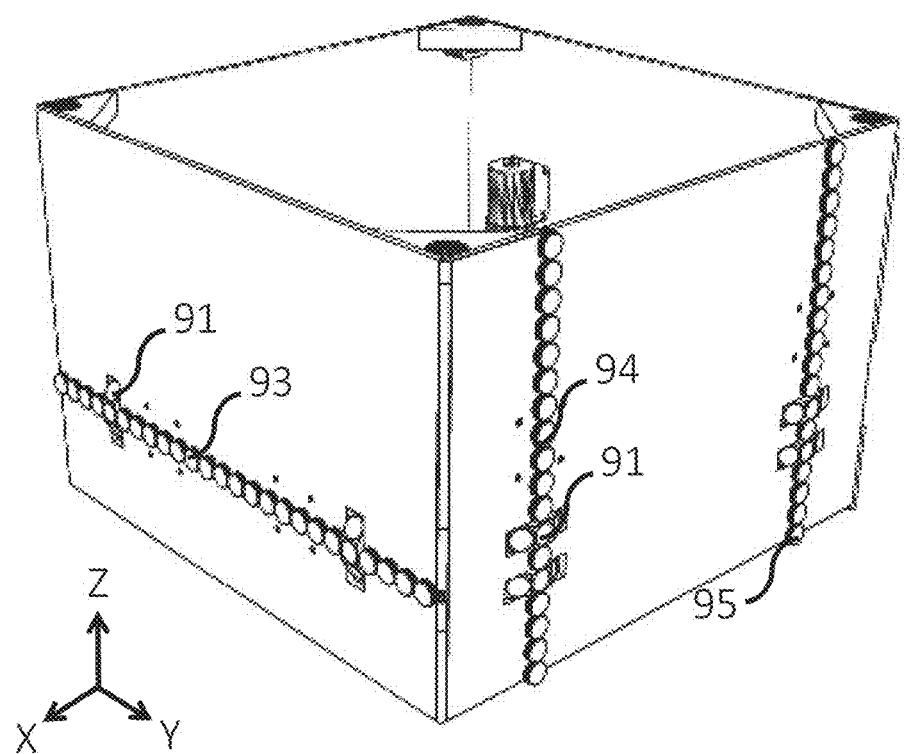
FIGS. 32a and 32b show further views of an example of a transporting device according to a second embodiment of the present invention, wherein the relocating unit of a transporting device comprises the third example of a magneto-mechanical mechanism.

FIG. 32a shows yet another view of the transporting device 40 from a third corner thereof. The third corner is where an A-face meets a B-face. The view of FIG. 31b has been rotated 90 degrees anticlockwise to form the view of FIG. 32a.

Figure 32B:
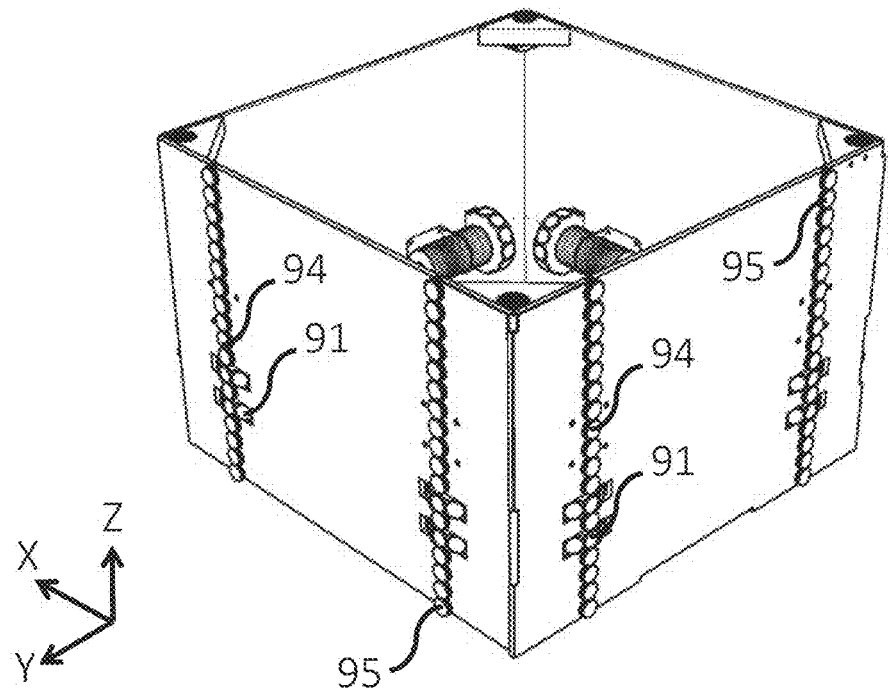

FIG. 32b shows the view of a fourth corner of the transporting device 40. The fourth corner is where a B-face is arranged perpendicular to another B-face. The view of FIG. 32a has been rotated 90 degrees anticlockwise to form the view of FIG. 32b.

Figure 33:
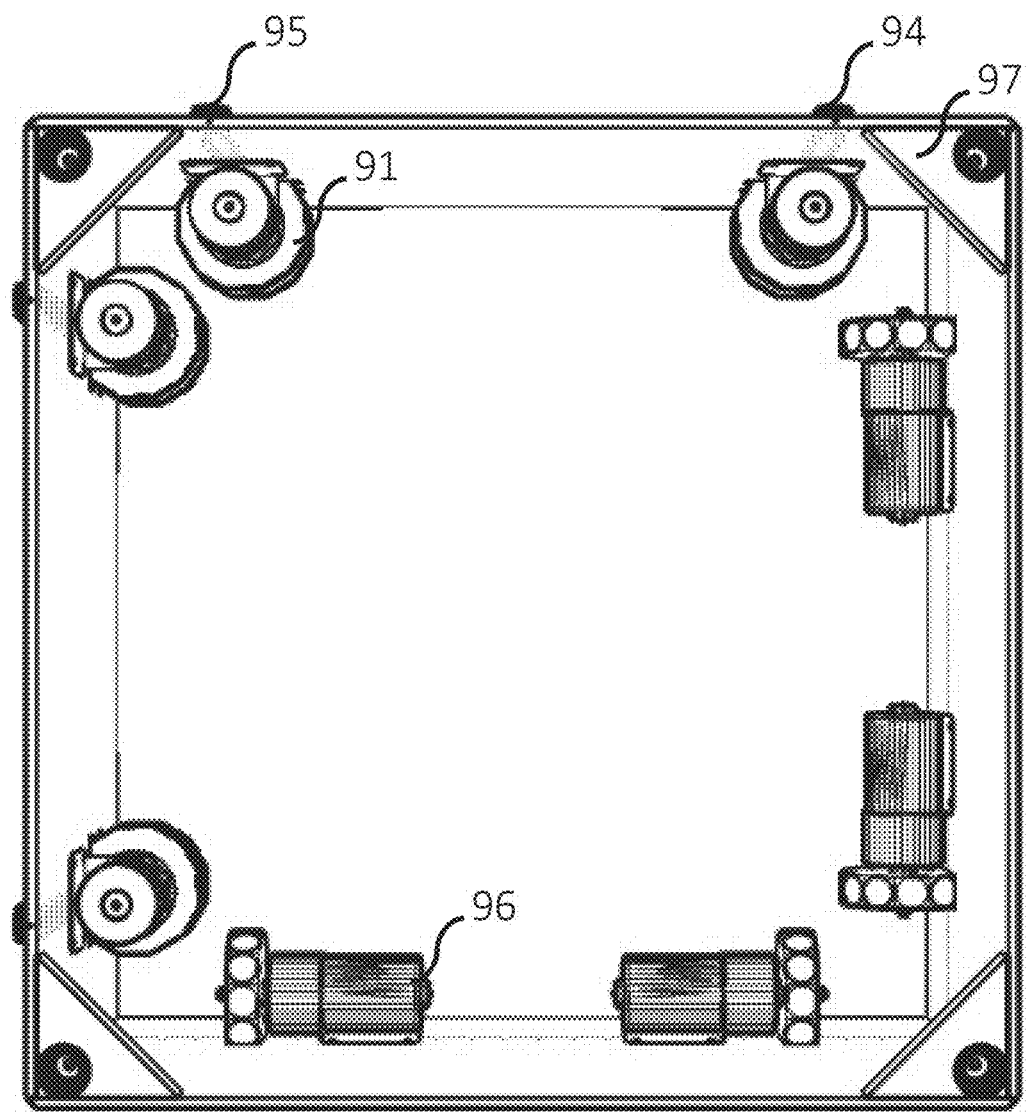
FIG. 33 shows a top-down view of an example of a transporting device according to a second embodiment of the present invention, wherein the relocating unit of a transporting device comprises the third example of a magneto-mechanical mechanism.
Figure 33:
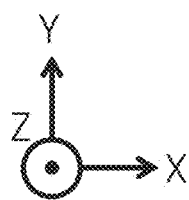

FIG. 33 is a view of a top of the transporting device 40 looking into the interior of the transporting device 40. As will be appreciated, the empty space in the transporting device 40 constitutes the item-receiving space 42 arranged to receive an item. It may be advantageous to form a barrier between each of the motors 96 and the item-receiving space 42 to prevent stored items from interfering with the operation of the motors 96. The motors 96, magnetic wheels 91 and magnetic tracks 93, 94 and 95 are comprised in the relocating unit 41. The transporting device 40 may further comprise a communication unit 44 arranged to receive a signal to control the relocation of the transporting device 40 and/or a control unit arranged to control the relocation of the transporting device 40. Moreover, the transporting device 40 may further comprise a power source such as a battery arranged to store charge for operating the motors 96 and any optional features (such as communication unit and/or control unit).

Although a view of the underside (also referred to as the bottom) of the transporting device 40 is not shown, in this example of the underside of the transporting device 40 is a smooth surface with no features. However, as has been previously mentioned, a number of optional features may be provided on the underside such as an engagement unit 43 and/or a power transfer means. Moreover, other magnetic mechanisms may be provided on the underside to aid in the relocation of transporting devices 40 where appropriate.

Figure 34:
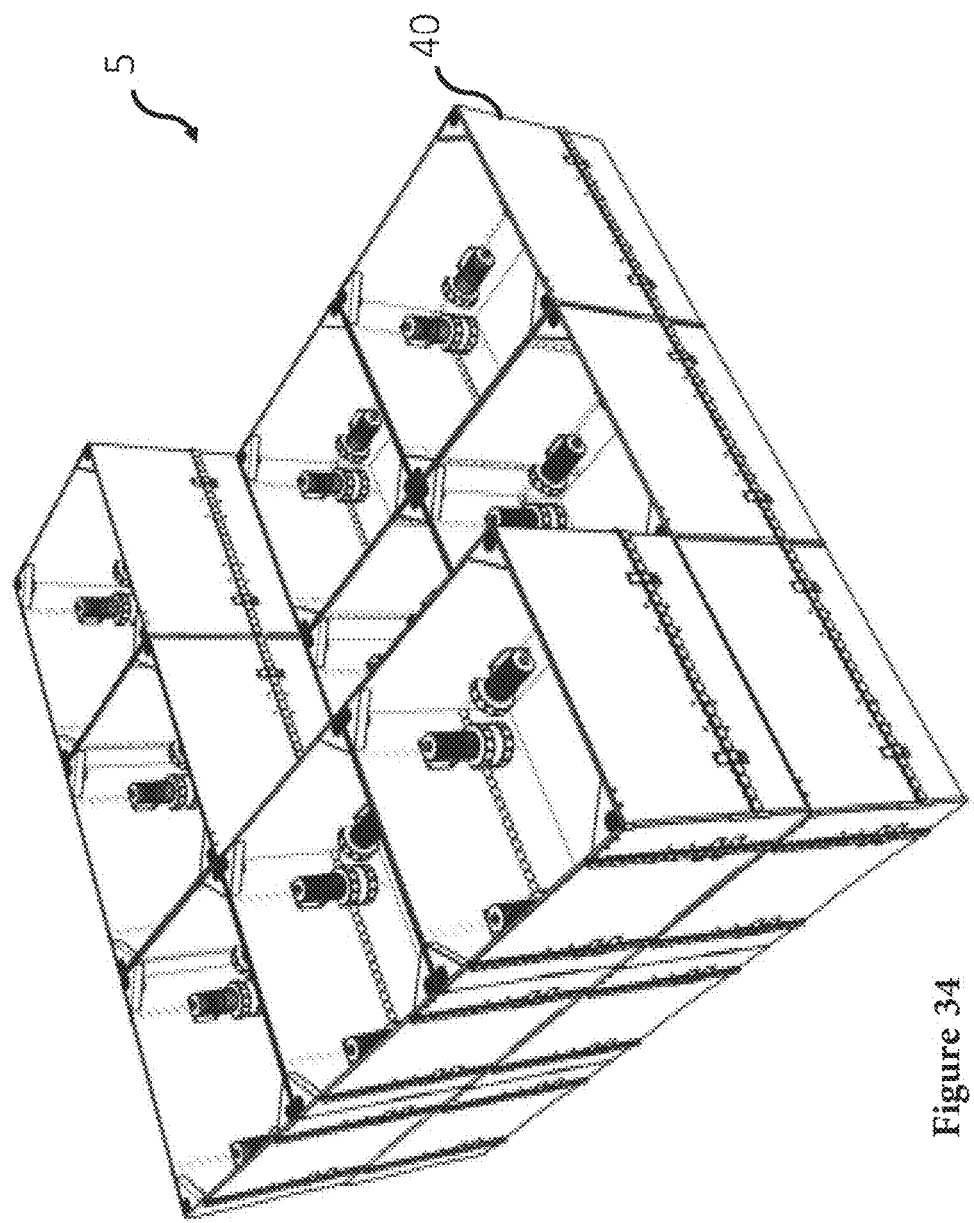
FIG. 34 shows a view of a cluster comprising a plurality of transporting devices according to a second embodiment of the present invention, wherein the relocating unit of a transporting device comprises the third example of a magneto-mechanical mechanism.

FIG. 34 shows a first view of a cluster 5 comprising a plurality of transporting devices 40. In this context a cluster 5 is a collection of at least two transporting devices 40. However, providing more than two transporting devices 40 provides advantages with regards to the ease of movement of transporting device 40 because each transporting device 40 will experience more support from neighbouring transporting devices 40 due to the interactions between faces of the transporting devices 40. As can be seen in FIG. 34, the view shows the corner of the transporting devices at which the A-face meets another A-face perpendicularly. In this regard, it is expected that, advantageously, for correct movement of the transporting devices 40 then all of the transporting devices 40 are arranged in the same orientation. In other words, the orientation of an individual transporting device 40 with regard to the orientation of the A-faces and B-faces is the same for all transporting devices 40 across the cluster 5. In this way, A-faces arranged in a positive X-direction interact with B-faces arranged in a negative X-direction to face the A-faces. Moreover, A-faces arranged in a positive X-direction interact with B-faces arranged in a negative X-direction to face the A-faces. As will be appreciated, for other configurations of A-face and B-faces then this arrangement may differ so as to provide faces of a transporting device 40 which cooperate with one another to permit the relocation of any one transporting device within the cluster 5. Moreover, where a transporting device 40 is configured with different types of faces then the arrangement of the orientation of each transporting device 40 within the cluster 5 may vary to provide a plurality of transporting devices 40 which interact to permit relocation of transporting devices 40 within the cluster 5.

Figure 35:
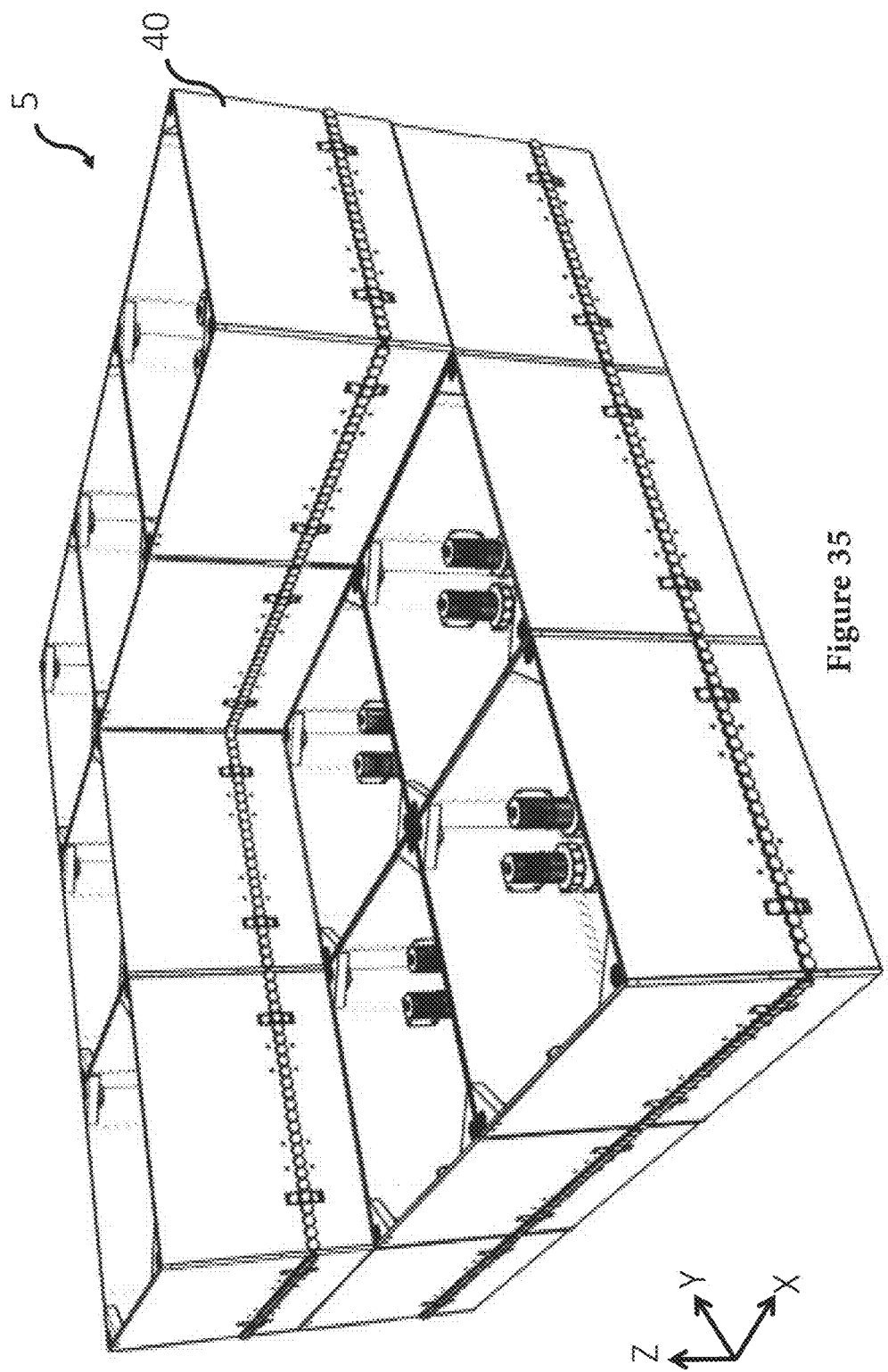
FIG. 35 shows another view of a cluster comprising a plurality of transporting devices according to a second embodiment of the present invention, wherein the relocating unit of a transporting device comprises the third example of a magneto-mechanical mechanism.

FIG. 35 shows a second view of the cluster 5 from a second corner of the cluster 5. Relative to the first view in FIG. 34, the second view is shown by rotating the view 90 degrees anticlockwise about the centre of the cluster 5. Although the cluster 5 is shown comprising a particular number of transporting devices (In particular, three transporting devices 40 in an X-direction, three transporting devices 40 in a Y-direction, and two transporting device 40 in a Z-direction) it will be appreciated that the cluster 5 may comprise any number of transporting devices 40 in any particular direction as long as there is space for such a cluster 5 in a working space. In the second view, the second corner is a location at which a first A-face of a transporting device 40 meets, perpendicularly, a second A-face of the transporting device 40.

Figure 36:
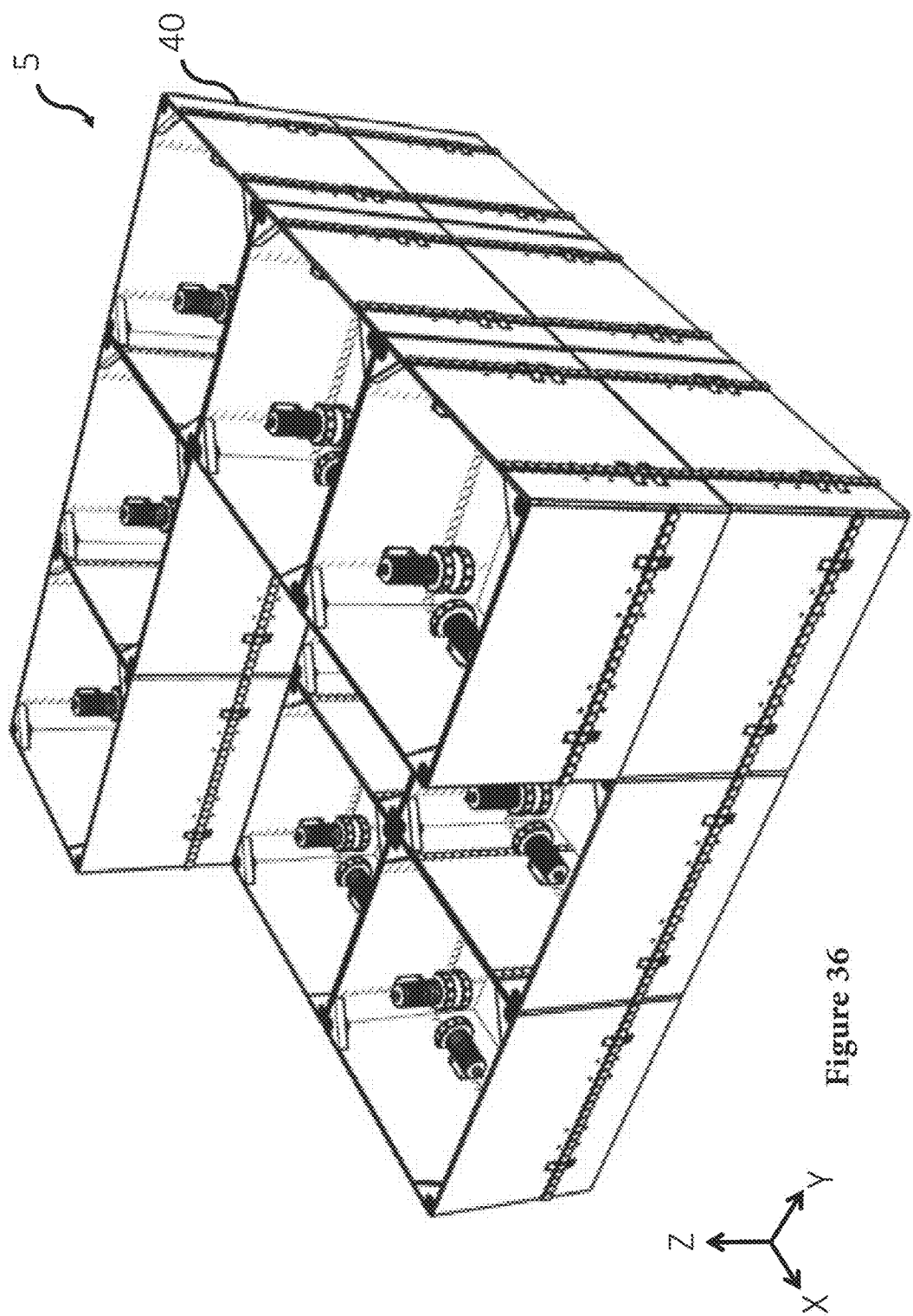
FIG. 36 shows yet another view of a cluster comprising a plurality of transporting devices according to a second embodiment of the present invention, wherein the relocating unit of a transporting device comprises the third example of a magneto-mechanical mechanism.

FIG. 36 shows a third view of the cluster 5 from a third corner of the cluster 5. Relative to the first view of the cluster 5, the third view comprises a 180 degree rotation about the centre of the cluster 5 about a Z-axis. At this location, each transporting device 40 comprises an A-face meeting a B-face perpendicular thereto.

Figure 37:
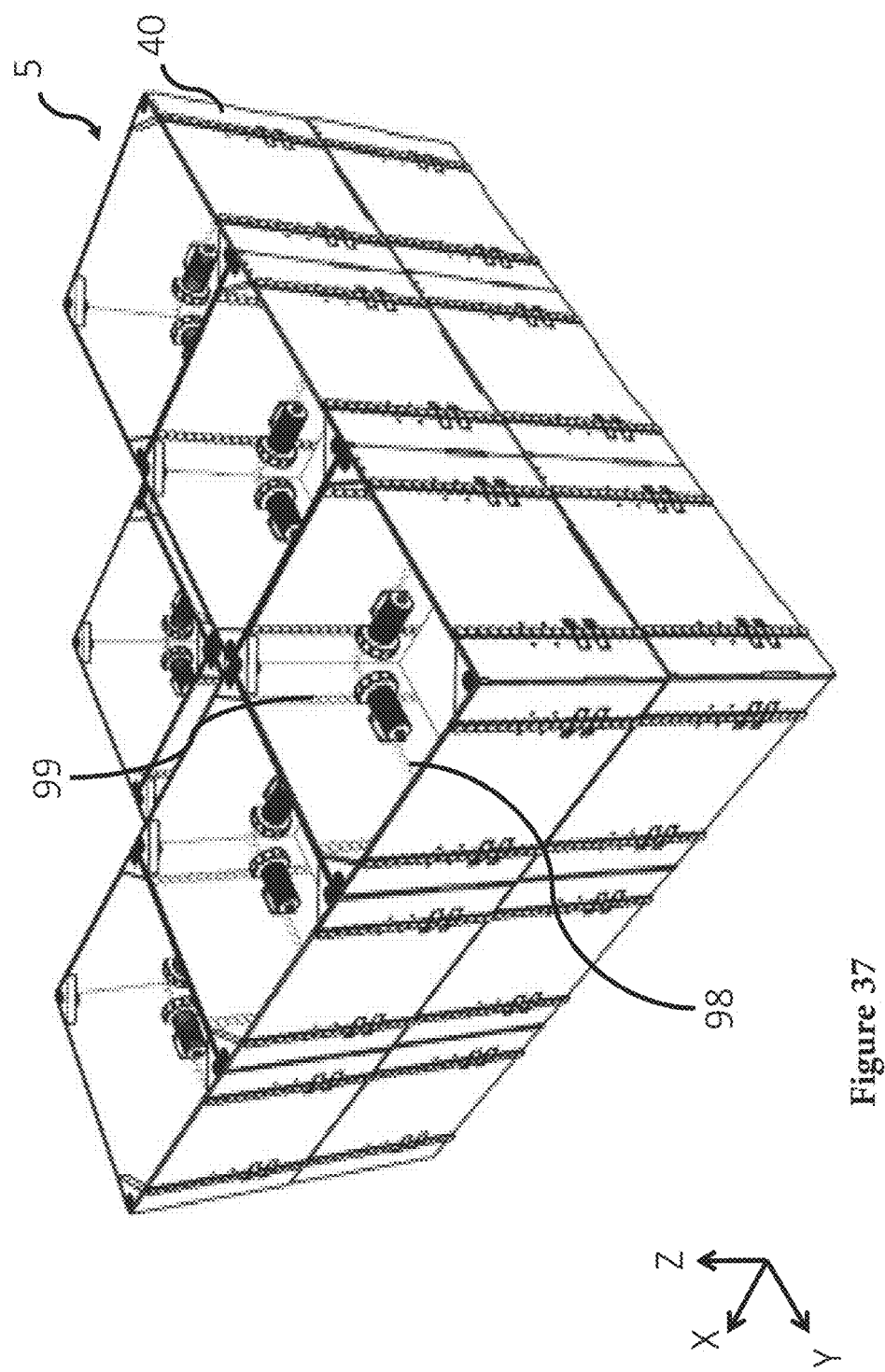
FIG. 37 shows an additional view of a cluster comprising a plurality of transporting devices according to a second embodiment of the present invention, wherein the relocating unit of a transporting device comprises the third example of a magneto-mechanical mechanism.

FIG. 37 shows a fourth view of the cluster 5 from a fourth corner of the cluster 5. At this location a first B-face of each transporting device 40 meets a second B-face of the transporting device 40 arranged perpendicular thereto. Relative to the first view, this view comprises a 270 degree rotation about the Z-axis.

A storage system may comprise the cluster 5. In this regard, the cluster 5 may store at least one item. The storage system may further comprise a controller arranged to determine a path for a transporting device from a starting location within/on/outside the cluster 5 to a destination location within/on/outside the cluster 5. The controller may be further arranged to transmit a signal to a communication unit to cause a transporting device to move in accordance with the determined path. In this way, the controller may determine the path for a transporting device and cause the transporting device to move along the determined path. Additionally or alternatively, the control system may be arranged to signal other devices to assist and/or effect the move. Additionally or alternatively the control system may be arranged to determine only the initial part of the path, reviewing & extending it as individual manoeuvres are executed or terminated. Additionally or alternatively some or all of the functions of the controller may be distributed among the devices themselves and/or other data processing and/or communication elements.

As is clear, from the above FIGS. 34 to 37, a cluster 5 comprises a plurality of transporting devices 40. Each transporting device 40 is arranged to interact with at least one neighbouring transporting device 40 in an X-direction and/or a Y-direction. In this example, a face of a transporting device 40 faces another transporting device 40 and interacts therewith. As has been described, each face interacts with a corresponding face. For example, a transporting device 40 with an A-face in one direction interacts with a B-face of a neighbouring transporting device 40 opposing the A-face. Similarly, a transporting device 40 with a B-face in one direction interacts with an A-face of a neighbouring transporting device 40 opposing the B-face. One example of this arrangement may be seen in FIG. 37 by an outline of a first magnetic track 98 on a transporting device 40 which interacts with an outline of a second magnetic track 99 on a neighbouring transporting device 40. By way of operation of a magnetic wheel 91 relocation of a transporting device 40 may be achieved.

The above describes the sides of the transporting devices 40 and therefore movement of transporting devices 40 in any direction. Accordingly, in this configuration there is no specific need for means on the top or bottom of transporting devices 40 to facilitate such movement although an engagement unit 43 and the like has been described to aid in the relocation of transporting devices 40. Therefore, the transporting devices 40 shown in the cluster 5 may be simply stacked on top of one another with no form of engagement between them other than, for example, the force of gravity holding a top-most transporting device 40 on top of the transporting device 40 below it (although such engagement need not be via gravity but rather, mechanical, magnetic, electromagnetic or the like). In this way, the bottom of a transporting device 40 simply rests on the top edge of the transporting device 40 directly below it. Individual transporting devices 40 may be moved within the stack or across stacks and between locations in the cluster 5. Alternatively, entire stacks of transporting devices 40 may be relocated by coordinated action of multiple magnetic wheels 91. Although there is described herein no direct engagement between the tops and bottoms of transporting devices 40, in some situations (for example, low gravity environments) engagement may be advantageous and may be provided by an engagement unit 43 or the like which may comprise magnets (such as permanent magnets and/or electromagnets) to releasably engage a top surface of the transporting device 40 from a transporting device 40 above it and/or releasably engage a bottom surface of the transporting device 40 from a transporting device 40 below it.

Figure 38:
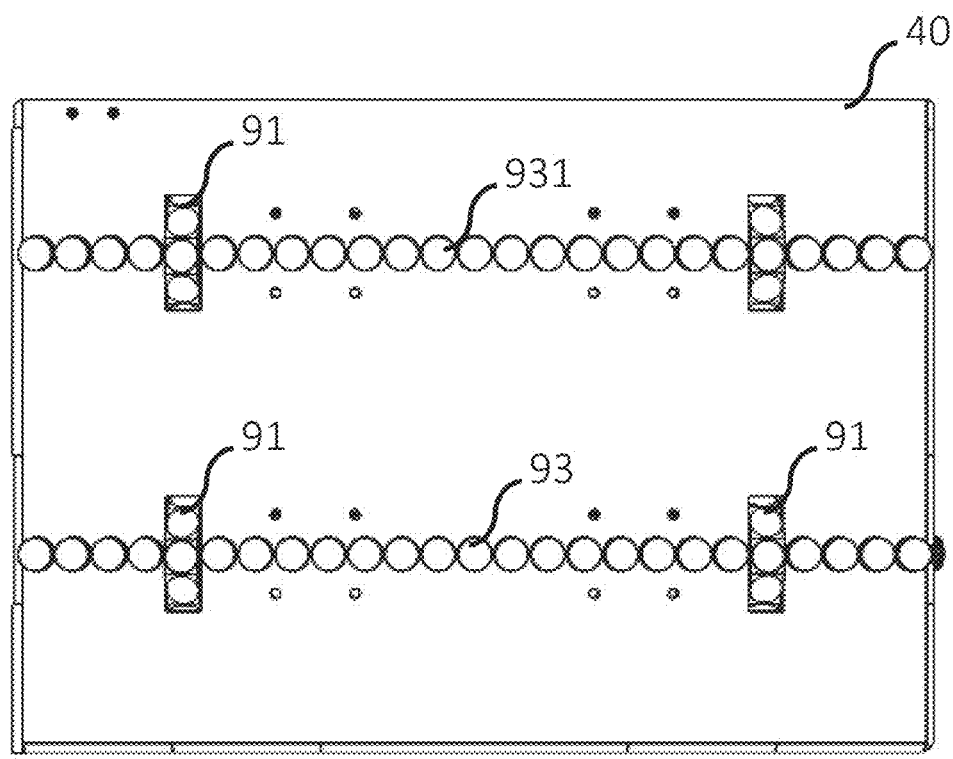
FIG. 38 shows a view of a face of a modified transporting device similar to the one shown in FIG. 30a where a relocating unit of a transporting device comprises a third example of a magneto-mechanical mechanism.

FIG. 38 shows an example of a modified transporting device 40 of the above-described third example of a relocating unit comprising a magnetic/electromagnetic mechanism. In this modification, the A-face is modified to include a second magnetic track 931 arranged vertically above the first magnetic track 93. Moreover, the addition of the second magnetic track 931 includes additional magnetic wheels 93 to operate in the second magnetic track 931. In other respects, the A-face of the modified example functions the same as the previously described A-face. By providing an additional magnetic track 931 and corresponding magnetic wheels 93, a more stable arrangement is achieved which is less likely to skew when moving. In particular, transporting devices 40 of the third example sometimes catch on the top of neighbouring transporting devices 40 as the transporting device 40 was being moved. By providing the second magnetic track 931 then this is avoided. In this regard, the modified A-face is similar to a B-face but rotated 90 degrees.

With regard to control of individual transporting devices 40 within the cluster 5, a transporting device 40 interacts/cooperates with at least one other transporting device 40 to effect the relocation of one or more transporting devices 40 to alternative locations within the cluster 5 or to locations outside of the cluster 5. Such control strategies are addressed in Ocado Innovation Limited UK Patent Application No. GB1716201.7 filed 4 Oct. 2017 (Ocado Innovation Limited Reference Number 000164 GB), the content of all of this application hereby being incorporated by reference. In this cross-referenced document, a transporting device 40 is referred to as a transporting vessel and it is envisaged that such terms may be used interchangeably.

Moreover, the features described previously of the controller described in the first and second embodiments may be equally employed with regards to the control of transporting devices 40 in this example.

A brief description will be provided herein with regards to the relocation of transporting devices 40 according to the third example of a relocating unit 41 comprising a magneto-mechanical mechanism as shown in FIGS. 29 to 37. The following also applies to the modified third example shown in FIG. 38 with additional control to account for the addition of magnetic wheels 91 on the A-face shown in FIG. 38.

Figure 39:
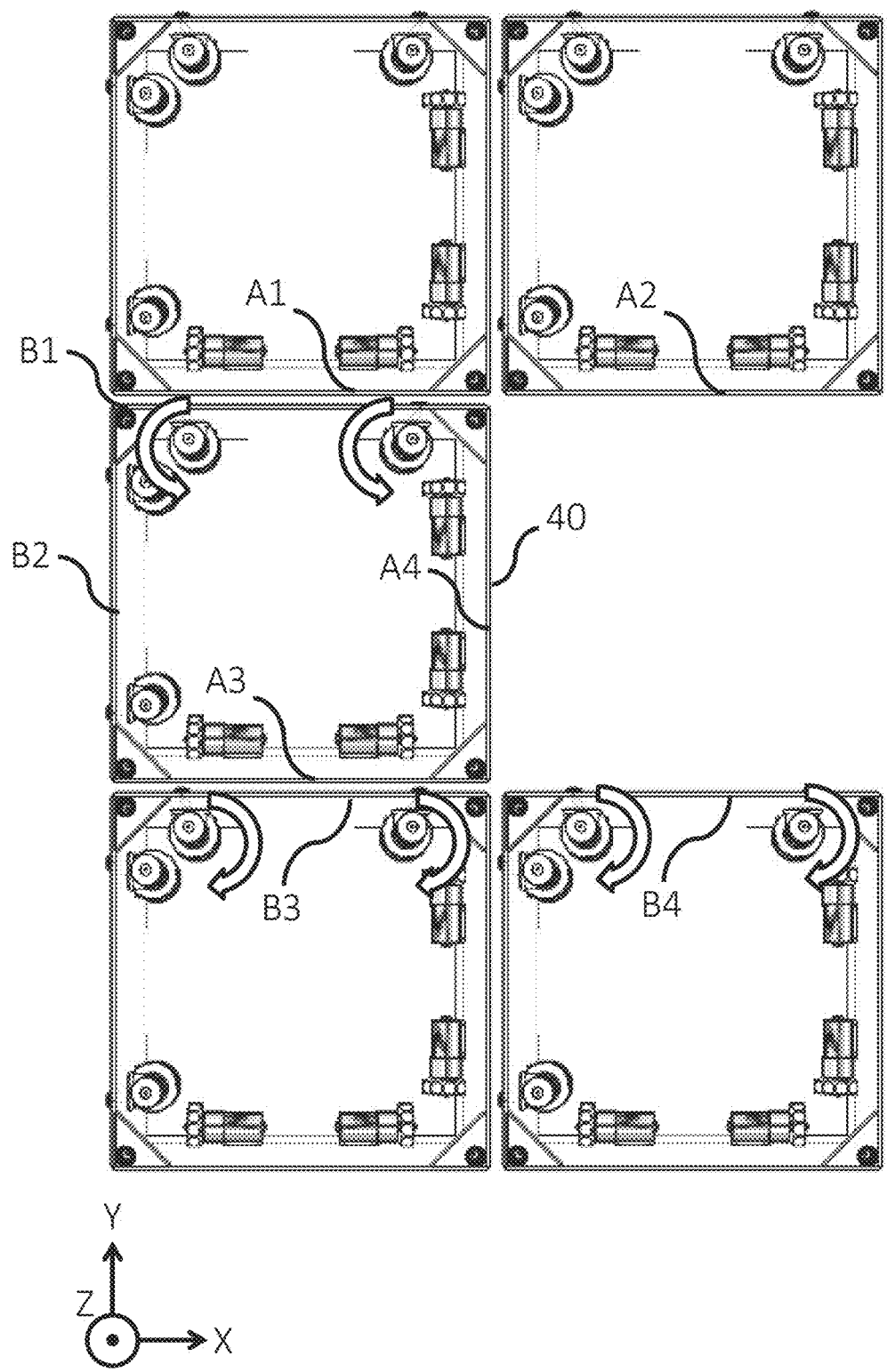
FIG. 39 shows how movement of a transporting device is effected in an X-direction, where a relocating unit of a transporting device comprises a third example of a magneto-mechanical mechanism.
Figure 40:
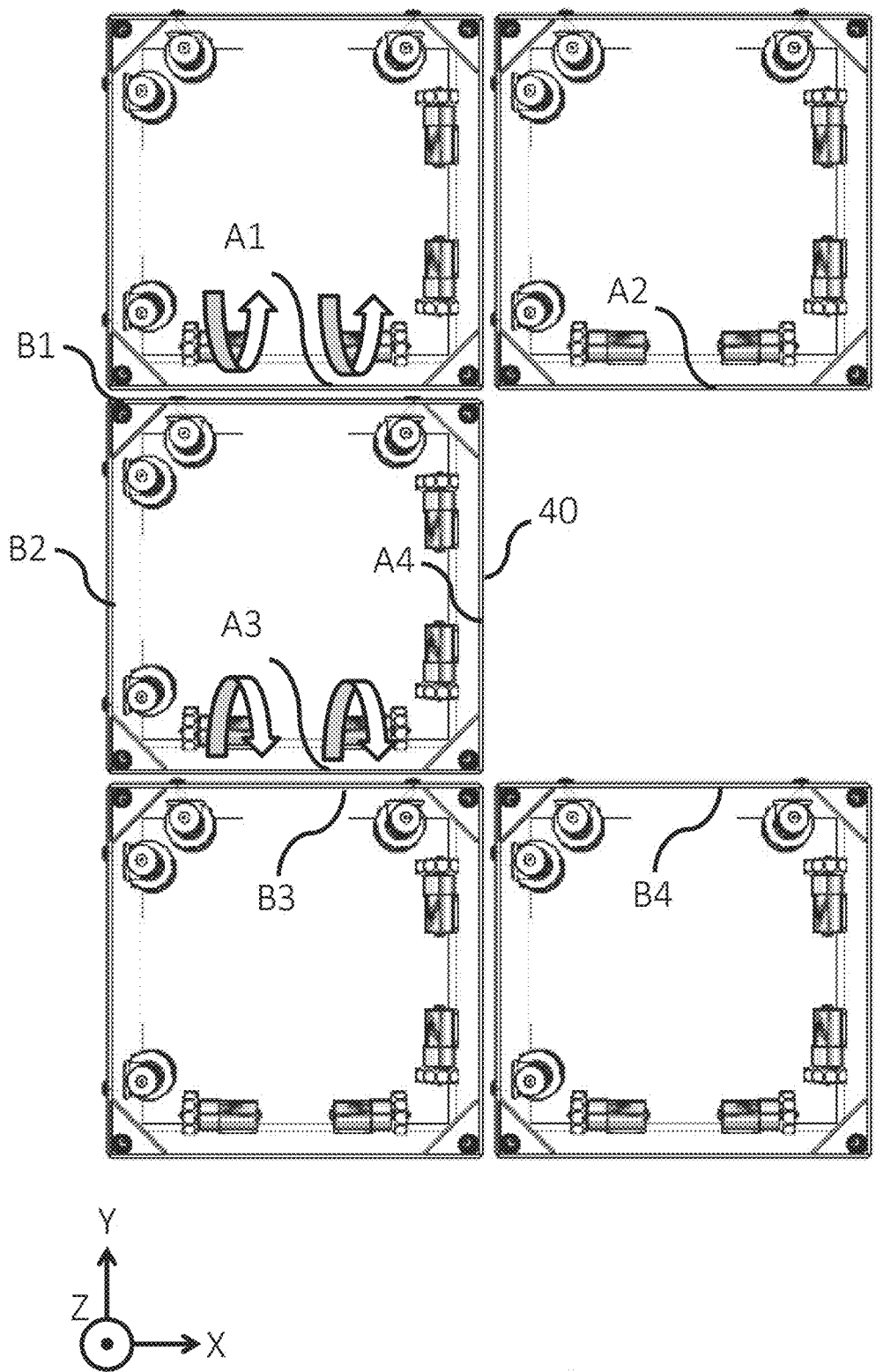
FIG. 40 shows how movement of a transporting device is effected in a Z-direction, where a relocating unit of a transporting device comprises a third example of a magneto-mechanical mechanism.

To understand the movements utilised to move a transporting device 40, the movement of a transporting device will be broken down into movement in each of the X-direction, Y-direction or Z-direction. FIGS. 39 and 40 will be used in this connection to explain example magnetic wheel 91 movements to effect the movements in each direction.

In particular, and as shown in FIG. 39, to effect movement of a transporting device 40 in an X-direction requires the activation of magnetic wheels 91 on a B-face of the transporting device 40 because the magnetic wheels 91 on the B-faces of the transporting device 40 are arranged horizontally, i.e. in an X-direction. FIG. 39 shows the rotation of magnetic wheels 91 to effect a positive X-direction movement. For example, FIG. 32a shows on the right-hand side thereof a B-face with magnetic wheels 91 which are rotated to move the transporting device 40 in an X-direction. In FIG. 39 this B-face is labelled as B1.

However, the magnetic wheels 91 on the B-face shown on the left-hand side of FIG. 31a are not activated because the magnetic wheels 91 shown in this Figure are arranged to move the transporting device 40 in a Y-direction which is shown in FIG. 39 as the B-face labelled as B2.

The magnetic wheels 91 on the A-faces of the transporting device 40 are not activated to effect an X-direction movement.

By rotating the magnetic wheels 91 on the B-face B1 in an anti-clockwise direction then movement of the transporting device 40 in a positive X-direction can be effected. Similarly, movement in a clockwise direction results in movement in a negative X-direction. In this way, B-face B1 shown in FIG. 32a cooperates with the magnetic track 93 on a corresponding A-face of a neighbouring transporting device 40. In FIG. 39 this A-face is labelled as A1. Moreover, as the transporting device 40 moves in the positive X-direction eventually the magnetic wheels 91 of the B-face B1 cooperate with the magnetic track 93 on the next neighbouring transporting device 40, specifically, the magnetic track 93 located on the next A-face labelled as A2. In this way, the magnetic wheels 91 of the B-face B1 crawl along the magnetic tracks on the A-face A1 and then on the A-face A2.

At the same time, the A-face shown on the left-hand side of FIG. 31b is used to aid the X-direction movement. In FIG. 39 this A-face is labelled as A3. In particular, the A-face A3 is arranged on an opposing side of the transporting device 40 to the B-face B1. Accordingly, the A-face A3 is used to support the movement of magnetic wheels 91 arranged on the B-face B1. In particular, the magnetic track 93 on A-face A3 is arranged to cooperate with the magnetic wheels 91 on a B-face B3 of a neighbouring transporting device 40. Therefore, to cause the movement of the transporting device 40 in a positive X-direction the magnetic wheels 91 of the B-face B3 are arranged to rotate in a clockwise direction. In this way, the magnetic wheels 91 of the B-face B3 effectively push the magnetic track 93 of the A-face A3 in a positive X-direction. As will be appreciated, this requires coordination between the transporting device 40 to be moved (which activates its magnetic wheels) and at least one neighbouring transporting device 40 which remains stationary (but which still activates its magnetic wheels). As the transporting device 40 moves further in the positive X-direction then the magnetic wheels 91 of the B-face B4 are also arranged to rotate in a clockwise direction to maintain the cooperation between the magnetic track 93 of the A-face A3 and the magnetic tracks 93 of the B-faces B3 and B4. In this way, the interaction between these faces effectively supports and manoeuvres the transporting device 40 in the X-direction. As will be appreciated, rotation of the magnetic wheels 91 of the B-faces B3 and B4 in an anti-clockwise direction would result in a negative X-direction movement of the transporting device 40.

It will be appreciated, that due to the rotational symmetry of the transporting device 40 then operation in the Y-direction is similar to operation in the X-direction except that the faces utilised are perpendicular to those described above. For example, the magnetic wheels 91 used on the B-face B2 are activated to cause movement in the Y-direction whilst the magnetic wheels 91 on the B-face B1 are not activated for such movements. In this way, the magnetic wheels 91 of the B-face B2 are used to traverse the magnetic track 93 on the A-faces of neighbouring transporting devices 40. Similarly, the B-faces of neighbouring transporting devices 40 may be activated to push against the magnetic track 93 of the A-face A4 arranged in a Y-direction.

Movement in a Z-direction is described with reference to FIG. 40. In this Figure the Z-direction is shown coming out of the page of the Figure. To effect movement in a positive Z-direction utilises rotation of the magnetic wheels 91 on at least one A-face of the transporting device 40.

In this example, movement in a Z-direction will be effected using the magnetic wheels 91 on the A-face A3, therefore the magnetic wheels 91 on this face are activated whilst the magnetic wheels 91 on the A-face A4 are not activated. In this example, the A-face A4 cannot be used to effect a Z-direction movement because the A-face A4 is not located next to a neighbouring transporting device 40 with which the magnetic wheel 91 of the A-face A4 can cooperate.

However, in an example in which both the A-faces A3 and A4 are cooperating with neighbouring transporting device 40 then the magnetic wheels 91 on both A-faces A3 and A4 may be used to effect a Z-direction movement. In this way, in a Z-direction it is possible that a transporting device 40 has more driving power compared to an X-direction or a Y-direction movement. However, in many situations only the magnetic wheels 91 on one of the A-face A3 and A4 may be used to move in a Z-direction to conserve energy.

To make a movement in positive Z-direction then the magnetic wheels 91 on the A-face A3 are caused to rotate in an anti-clockwise direction. In this way, the magnetic wheels 91 on the A-face A3 interact with and climb up the magnetic tracks 94 and 95 on the B-face B3. Although not shown, as the transporting device 40 moves above the top of the B-face B3 then the magnetic wheels 91 of the A-face A3 begin to interact with the magnetic tracks 94 and 95 of the next neighbouring transporting device 40 arranged above (i.e. in a positive Z-direction) the B-face B3. Therefore, the engagement of the magnetic wheels 91 transition from one B-face to another.

To support the opposing side of the transporting device 40 then the magnetic wheels 91 of the A-face A1 of a neighbouring transporting device 40 are utilised and interact with the magnetic tracks 94 and 95 of the B-face B1 of the transporting device 40 to be moved. To achieve a positive Z-direction motion then the magnetic wheels 91 of the A-face A1 are caused to rotate in a clockwise direction. In this way, the interaction of the magnetic wheels 91 on A-face A1 with the magnetic tracks 94 and 95 of the B-face B1 cause an effective pushing of the B-face B1 in a positive Z-direction. Moreover, as the B-face B1 moves above the top of the A-face A1 then the magnetic wheels 91 of the transporting device on the A-face directly above the A-face A1 are also caused to rotate in a clockwise direction to interact with the magnetic tracks 94 and 95 of the B-face B1 to continue the pushing of the magnetic tracks in a positive Z-direction. In this way, the B-face B1 is effectively supported by the action of magnetic wheels 91.

As will be appreciated, movement of a transporting device 40 in a negative Z-direction may be effected by causing the rotation of the magnetic wheels 91 on the A-face A3 in a clockwise direction whilst the rotation of the magnetic wheels 91 on the A-face A1 in an anti-clockwise direction. In this way, the transporting device 40 will be caused to move in a negative Z-direction.

It is envisaged that a similar movement in either a positive or negative Z-direction may be effected using the magnetic wheels 91 on the A-face A4 and the magnetic tracks 94 and 95 on the B-face B2.

To generalise the above discussion, in one example, the transporting device 40 to be moved (whether in an X, Y or Z direction) may activate at least one set of its magnetic wheels 91 (i.e. the magnetic wheels on at least one face of the transporting device 40 to be moved). In another example, to move the transporting device 40, a neighbouring transporting device may activate the magnetic wheels 91 on at least one of its faces. In yet another example, both the transporting device 40 to be moved and a neighbouring transporting device 40 activate a magnetic wheel 91 on at least one of their faces. Similarly, a transporting device located one space away in the X, Y or Z-direction to which the transporting device 40 to be moved is translating may also activate the magnetic wheels on at least one of its faces. In this way, the transporting device 40 effectively pulls itself towards its target destination and/or is pushed towards its target destination.

Advantageously, movement in an X-direction or Y-direction may be improved by causing an incremental Z-direction movement prior to causing the required X-direction or Y-direction movement. For example, a positive Z-direction movement of a single magnet may be effected before causing the required X-direction or Y-direction movement. Advantageously, this results in a reduction in drag on a movement of the transporting device 40. In particular, by causing a single magnet Z-direction movement then the chance of corners of the moving transporting device 40 colliding with the corners of neighbouring transporting device 40 as the transporting device 40 is moved is reduced. However, such movement may require the use of the double magnetic wheels 91 shown, for example, on the right-hand side of FIG. 32a. In particular, as the transporting device 40 moves up one magnet then the lower magnetic wheel 91 engages with a corresponding A-face whilst the upper magnetic wheel 91 of a neighbouring transporting device engages with a corresponding A-face. With reference to FIG. 39, movement of one magnet in a positive Z-direction may be effected, for example, as described with reference to FIG. 40. Once the positive Z-direction has been effected movement in the X or Y-direction may occur. In this configuration, the lower of the magnetic wheels 91 on the B-face B1 engage with the magnetic track 93 on the A-face A1. Conversely, the upper of the magnetic wheels 91 on the B-face B3 engage with the magnetic track 93 on the A-face A3.

Moreover, due to the upwards Z-direction movement of the transporting device 40 then prior to the X-direction or Y-direction all of the transporting devices 40 located directly and immediately above the transporting device 40 to be moved must also be moved upwards one magnet. Accordingly, effective cooperation between, potentially, a large number of transporting device 40 in a cluster 5 needs to be effected.

Referring again to a positive X-direction movement of a transporting device 40 shown in FIG. 39, optionally as the X-direction movement is performed a "break-away manoeuvre" may be performed. In particular, due to the interaction between the magnetic wheels 91 located on the B-face B2 and a magnetic track 93 on a neighbouring transporting device (not shown) then movement in a positive X-direction may be difficult to begin because the magnetic attraction force may tend to pull the transporting device 40 in a negative X-direction. Therefore, a "break-away manoeuvre" may be performed to reduce this magnetic attraction force. This is achieved by causing the two sets of magnetic wheels on the B-face B2 to counter rotate at the same time as performing an action to relocate a transporting device 40 in, for example, the positive X-direction (in other words, perform the relocation the transporting device 40 in the direction commanded). For example, if the magnetic wheels closest to the A-face A3 are caused to rotate in an anti-clockwise direction then the magnetic wheels 91 closest to the B-face B1 are caused to rotate in a clockwise direction. In other words, the magnetic wheels 91 on the same B-face B2 are caused to rotate in opposing direction. As a result movement in the X-direction can be more easily achieved. As will be appreciated, a corresponding "break-away manoeuvre" applies to the Y-direction. For example, if the transporting device 40 were desired to move in a positive Y-direction then the magnetic wheels 91 on the B-face B1 would be caused to counter rotate, i.e. one set of magnetic wheels 91 rotating in one direction whilst the other set of magnetic wheels on the B-face B1 rotating in an opposing direction. This effectively breaks the magnetic attraction between the magnetic wheels 91 and magnetic tracks 94 and 95 of the B-face B1 with the magnetic wheels 91 and magnetic track 93 of the A-face A1.

In the second embodiment, the transporting devices 40 may require a power source to relocate within the cluster 5. It is envisaged that any appropriate power source may be used for this function. For example, each transporting device 40 may comprise a battery, for example a rechargeable and/or non-rechargeable battery. Additionally or alternatively, power transfer means may be arranged to transfer power to each transporting device 40 by way of power transfer contacts arranged on/in each transporting device 40. Moreover, the power transfer means may be used to transfer information to and from the transporting devices 40 such as communications information and/or positioning information of the transporting device 40. In this way, commands may be sent and received from the transporting device 40. Additionally, the power transfer means may be used to recharge a rechargeable battery. In this way, transporting devices 40 may be recharged at predetermined locations in the cluster where recharging stations may be provided. In another example, the power transfer means may use inductive transfer techniques to allow adjacent transporting devices to participate in a power distribution network throughout the cluster, for example one transporting device can provide electrical power to an adjacent transporting device.

Therefore, the above described example of the second embodiment of the present invention provides a system which supports transporting device 40 to move in three dimensions. Each transporting device 40 is self-contained without the need for a fixed structure or framework that exists even in the absence of transporting devices 40.

Figure 41:
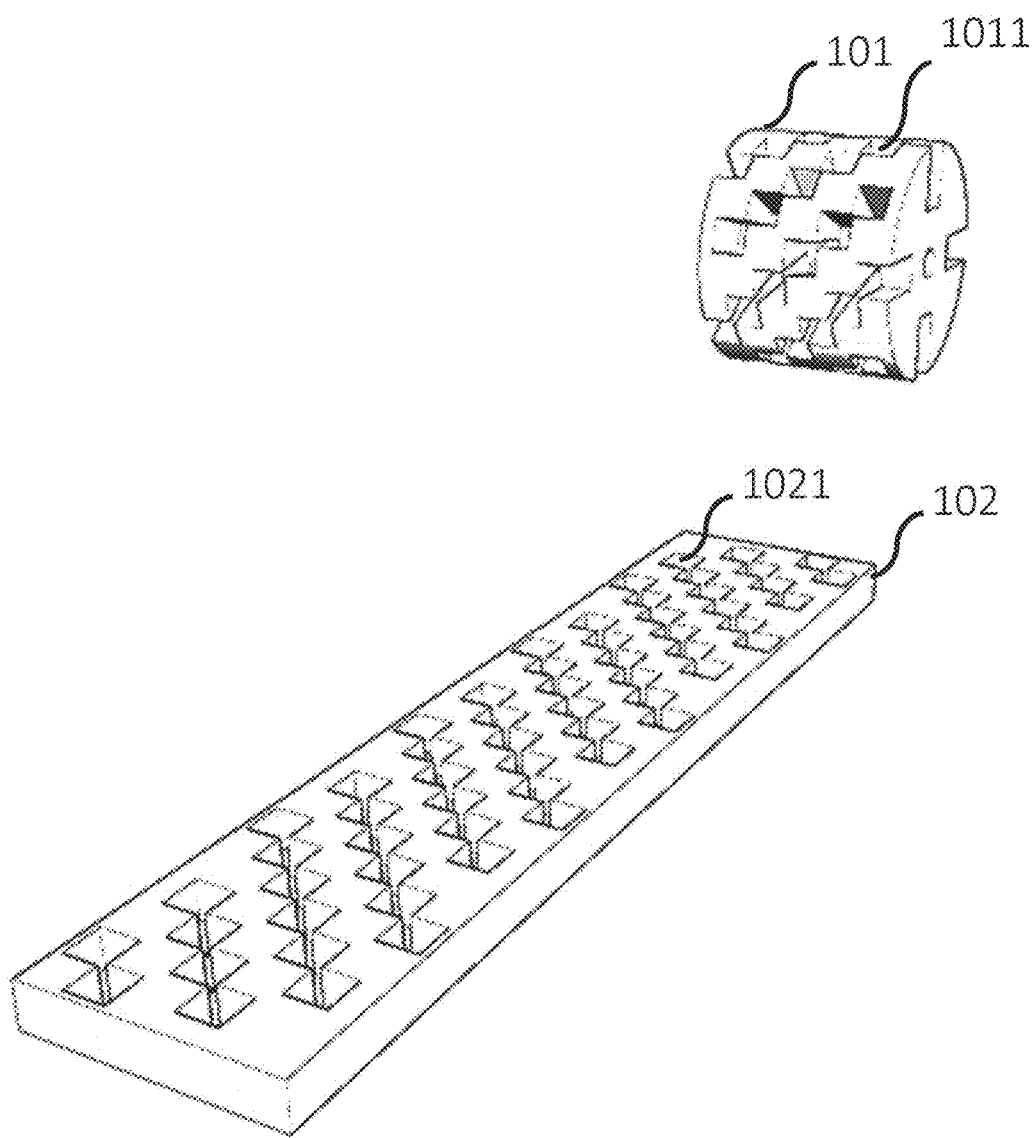
FIG. 41 is an example of a further modification to a transporting device similar to the transporting device comprising a third example of a magneto-mechanical mechanism.

FIG. 41 shows a modification to the third example of a magneto-mechanical mechanism described above with regard to the transporting device 40 of the second embodiment. Previously, for simplicity, a magnetic wheel 91 was been described with a single track of magnets arranged around the periphery of the magnetic wheel 91. However, this was provided by way of example only. Instead, FIG. 41 shows another example of a magnetic wheel 101 and a magnetic track 102 which comprise the third example of the magneto-mechanical mechanism. As will be appreciated, these are also provided by way of example and other manners of implementing the magnetic wheel 101 and the magnetic track 102 are envisaged. To aid understanding, the magnetic wheel 101 performs substantially the same function as the previously described magnetic wheel 91. Similarly, the magnetic track 102 performs substantially the same function as any of the magnetic tracks 93, 931, 94 or 95.

In this example, the magnetic wheel 101 comprise a plurality of magnets 1011 arranged side by side around the periphery of the magnetic wheel 101. In other words, the magnetic wheel 101 is arranged to fit a plurality of magnets across the width of the periphery, instead of the one magnet previously described. In this example, where there are two magnets arranged side by side, then the magnets either side of a central magnet are of opposing poles. Moreover, the magnetic track 102 comprises a plurality of magnets 1021. In this example, the magnetic track 102 is arranged to fit a plurality of magnets across its width.

As will be appreciated the above examples of magnetic wheels 91 and 101 and magnetic tracks 93, 931, 94, 95 and 102 are given by way of example only. Other arrangements of magnets within different the magnetic wheel and magnetic track are envisaged. The arrangement of magnets in the magnetic wheel are arranged to complement the arranged of magnets within the magnetic track. More specifically, the magnetic wheels that drive in a first direction also form a continuation of the magnetic track in a second, different direction. In this way, when the magnetic wheel on one transporting device is face-to-face with a magnetic wheel on a neighbouring transporting device, then there is an option of driving either magnetic wheel in a first direction and/or a second direction. In this way, at a meeting point of two magnetic wheels on two transporting devices, a choice of movement in more than one direction is possible (for example, choice to move in a positive/negative X-direction or a positive/negative Y-direction). Similarly, the polarity of a magnet need not be arranged perpendicular to the face of a transporting device as other orientations of magnets may provide benefits.

Figure 42:
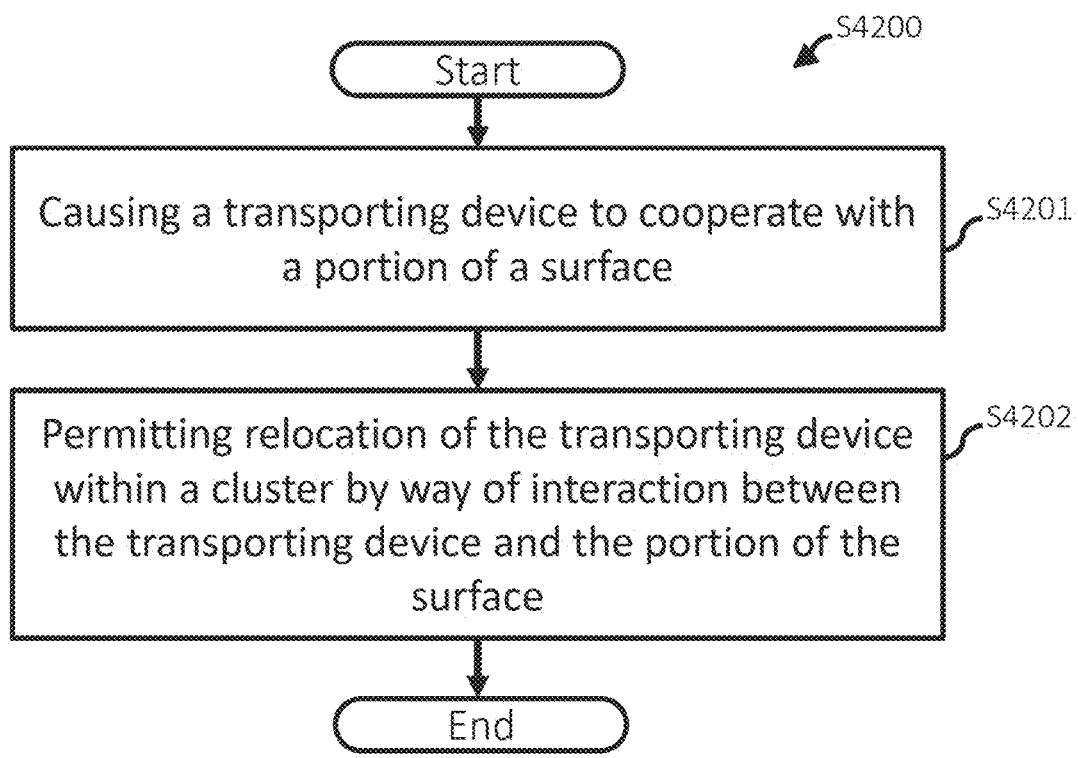
FIG. 42 is a flowchart of the steps performed by a method to move a transporting device according to the first embodiment of the present invention.

FIG. 42 shows a flowchart of method steps S4200 of moving a transporting device according to the first embodiment. The transporting device is arranged in a cluster with a reconfigurable physical topology. At step S4201 a transporting device is caused to cooperate with a portion of a surface. As described previously with regard to the first embodiment, transporting devices may be arranged on a surface. The surface may be formed as a wall and/or as a floor to permit the relocation of a transporting device and/or a plurality of transporting devices in any direction. For example, by locating a transporting device on the surface cooperation between the transporting device and the surface is achieved.

At step S4202, relocation of the transporting device is achieved by way of an interaction between the transporting device and the portion of the surface. As has been described previously, relocation is achieved using suitable mechanisms such as mechanical, magnetic or electromagnetic mechanisms. In this way, the cluster comprising a plurality of transporting devices may be physically reconfigured by way of causing the relocation of particular transporting devices to other locations of the cluster and/or external to the cluster.

Optionally, the method steps S4200 may further comprise the step of receiving a signal and, in response to the received signal, relocating the transporting device within the three-dimensional cluster. For example, the signal may comprise information about the location to which the transporting device is to be moved and therefore the surface may use the information to relocate the transporting device. Alternatively, the signal may comprise instructions to the surface to move the transporting device in one particular direction. By sending multiple signals to multiple cells of the surface a transporting device can be moved in the cluster.

Figure 43:
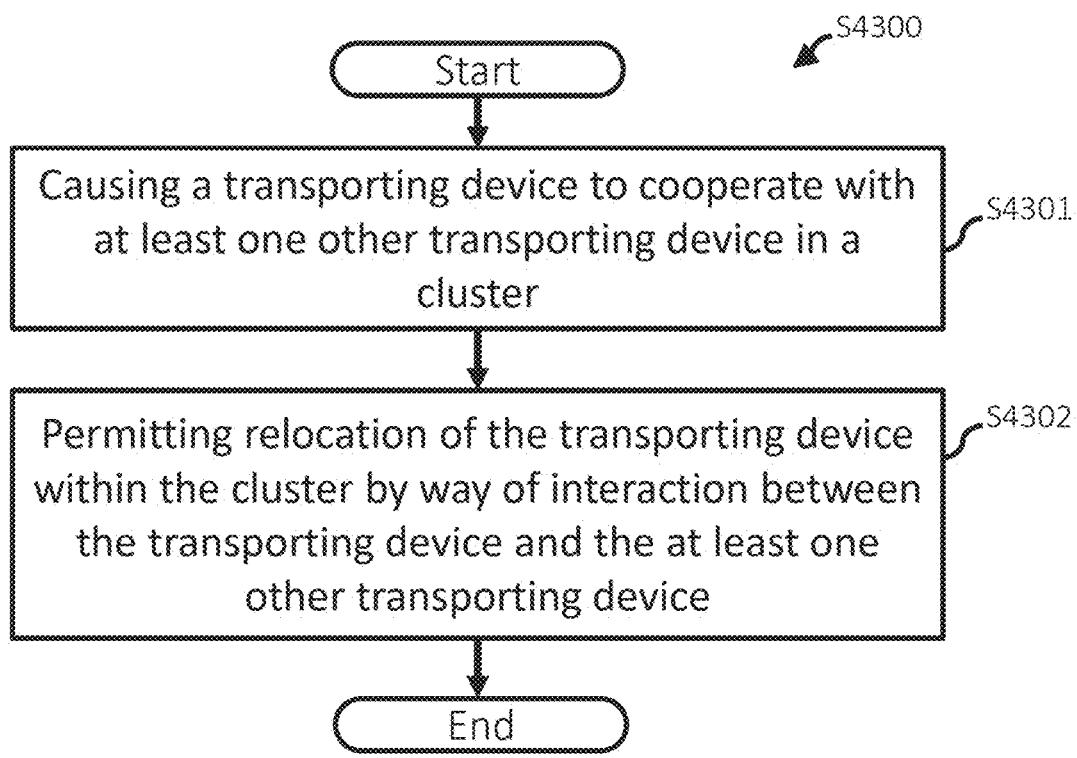
FIG. 43 is a flowchart of the steps performed by a method to move a transporting device according to the second embodiment of the present invention.

FIG. 43 shows a flowchart of method steps S4300 of moving a transporting device according to the second embodiment. The transporting device is arranged in a cluster with a reconfigurable physical topology. At step S4301 a transporting device is caused to cooperate with at least one other transporting device. As described previously with regard to the second embodiment, transporting devices may be arranged in a cluster. A cluster comprises a plurality of transporting devices. The plurality of transporting devices cooperate with one another.

At step S4302, relocation of the transporting device is achieved by way of an interaction between the transporting device and at least one other transporting device. As has been described previously, relocation is achieved using suitable mechanisms such as mechanical, magnetic or electromagnetic mechanisms. In this way, the cluster comprising a plurality of transporting devices may be physically reconfigured by way of causing the relocation of particular transporting devices to other locations of the cluster and/or external to the cluster.

Optionally, the method steps S4300 may further comprise the step of receiving a signal and, in response to the received signal, relocating the transporting device within the three-dimensional cluster. For example, the signal may comprise information about the location to which the transporting device is to be moved and therefore the transporting devices of the cluster may use the information to relocate the transporting device. Alternatively, the signal may comprise instructions to one particular transporting device instructing it to move in one particular direction. By sending multiple signals to multiple transporting devices of the cluster a transporting device can be moved in the cluster.

As one example, the transporting device may be provided with a first face. The first face may comprise a first magnetic wheel arranged to rotate in a first direction. Moreover, the first face may comprise a first magnetic track. A second face of the transporting device may comprise a second magnetic wheel arranged to rotate in a second direction. Moreover, the second face may comprise a second magnetic track. In this example, the first direction and the second direction are perpendicular to each other.

By selective activation of each of the first and second magnetic wheels then relocation of the transporting device may be effected. In particular, the first magnetic wheel may be arranged to interact with a corresponding magnetic track on a face of a neighbouring transporting device and the second magnetic wheel may be arranged to interact with a corresponding magnetic track on a face of a neighbouring transporting device.

For example, movement in a first direction may be effected by performing the step of activating of the first magnetic wheel which, by way of interaction with the corresponding magnetic track, causes the movement of the transporting device.

Similarly, movement in a second direction may be effected by performing the step of activating of the second magnetic wheel which, by way of interaction with the corresponding magnetic track, causes the movement of the transporting device.

Optionally, the transporting device may further comprise a third face. The third face may comprise a third magnetic wheel arranged to rotate in a second direction. Moreover, the third face may comprise a third magnetic track. A fourth face of the transporting device may comprise a fourth magnetic wheel arranged to rotate in a first direction. Moreover, the fourth face may comprise a fourth magnetic track.

The third magnetic track may be arranged to interact with a corresponding magnetic wheel on a face of a neighbouring transporting device and the fourth magnetic track may be arranged to interact with a corresponding magnetic wheel on a face of a neighbouring transporting device.

Therefore, movement of the transporting device may also be effected by causing the magnetic wheel of the neighbouring transporting device corresponding to the third magnetic track to rotate. Similarly, movement of the transporting device may also be effected by causing the magnetic wheel of the neighbouring transporting device corresponding to the fourth magnetic track to rotate.

By causing the rotation of selective magnetic wheels in the transporting device to be moved together with the rotation of selective magnetic wheels in neighbouring transporting devices, then effective relocation of the transporting device to be moved may be achieved.

Advantageously, movement of the transporting device to be moved is achieved by the transporting device itself (by interaction with neighbouring transporting devices) and therefore no external structure, framework or handling device is required to achieve the movement.

Modifications and Variations

Many modifications and variations can be made to the embodiments described above, without departing from the scope of the present invention.

The transporting devices are shown comprising a housing that, in this example, comprises a base and four side walls, defining an open cavity, a top surface of the housing being closable by a top surface or lid. In this example, the side walls surround a periphery of the base and are either fixed to the base or integrally formed therewith. However, it is envisaged that other forms and designs of transporting devices may be used. Moreover, a transporting device may further comprise a lid to container the items in the item-receiving space.

Although previously the transporting devices of the first and second embodiments have been described as comprising an item receiving space, in specific applications such an item receiving space may be omitted from the transporting device. In other words, the item receiving space may be an optional feature. In particular, utilising transporting devices for purposes other than storing and transporting is envisaged. For example, transporting devices may be used to create dynamic structures such as temporary bridges or platforms. Moreover, transporting devices may be used to collaborate to transport an item that is much larger than could be transported by an individual transporting device such as an item of machinery, a stranded vehicle, a pallet of bricks or the like. In this way, the structure of each transporting device is utilised in a dynamic manner to facilitate the formation of dynamic structures or to transport larger items.

Faces of the transporting device have been previously described as comprising one mechanism, whether that is mechanical mechanism, a magnetic mechanism, a magneto-mechanical mechanism or the like. However, it is to be appreciated that each face of the transporting device may comprise more than one mechanism, for example a face of the transporting device may comprise both of a magnetic mechanism and a magneto-mechanical mechanism. In this way the advantage of two mechanisms may be realised on a face of a transporting device. As will be appreciated more than two mechanisms may be employed on each face of the transporting device.

Although magnets have been generally referred to as permanent magnets or electromagnets other types of magnet may be utilised, for example electropermanent magnets which advantageously have a relatively high strength when not electrically operated thereby saving power. Moreover, although the magnets have been shown to be circularly/cylindrically shaped other shapes of magnets are envisaged. For example, square/cubically shaped magnets are envisaged and provide the advantage of allowing the closer placement of magnets because they tessellate. Additionally, ferromagnetic material may be used.

Alternatively or additionally, planar motor technology may be employed in place or in addition to the above described magnets. For example, the transporting device may comprise vertical planar motors to levitate and/or relocate it to another location within the cluster. Additionally or alternatively, Sawyer motors may be used. Similarly, electro-dynamics planar motors may be used. Moreover, direct-drive motors may be used.

Additionally or alternatively other magnetic technologies may be used in place of the permanent magnets and/or electromagnets described previously. For example, MagLev (magnetic river/sea) may be used. In particular, use of Lenz effect/Halbach arrays (using magnets to levitate transporting devices, and keep them in a fixed position without twisting) to allow transporting device movement in one or more perpendicular directions. Similarly, a virtual spinning/moving Halbach array may be used to achieve the same effect with electromagnets. Moreover, a curved copper track on a top edge of transporting device may be used to provide self-stabilising & steering. Also, creating the same effect with a mixture of conducting/non-conducting materials. Similarly, different shapes of coils (wide coils etc.), angles of coils and cores, overlaps of coils and spacing of cores may be used to obtain different effects such as enhanced attraction/repulsion or optimal magnetic fields for movement.

Additionally or alternatively, Linear motors may be used in a manner similar to the MagLev system described above. In this way, drive and levitation may be provided using, for example, at least one of synchronous/induction linear motors, use of ferritic tabs to enhance linear motors, use of magnetic epoxy (iron powder in epoxy resin) to have a ferritic material with no eddy current, high permeability and adaptable form for specific purposes. "c-shaped" magnets may be used to enhance the field which provides drive. Additionally or alternatively, longitudinal magnetic drive rail with two rows of magnets/coils horizontally arranged with a magnet above and between them may be used.

Transporting devices previously described may comprise wheels/balls arranged on the sides thereof to provide a driving force wherein the wheels/balls are magnetically attracted to adjacent transporting devices. Additionally or alternatively, transporting devices may use conventional (for example electromotor) wheels on the side/bottom of a transporting device, with a rubberised tyre. Additional magnets may be placed to provide the traction between transporting devices moving vertically. The wheels/balls may be retractable or omni-directional. Wheel switching may be dependent on if the transporting device is powered or not—for example if the transporting device becomes powered then the vertical wheels engage, if it becomes unpowered then the horizontal wheels engage to stop the transporting device moving.

Moreover, each transporting device may utilise linear motors for use with a wheel instead of levitating the transporting device. In this arrangement, magnets located in a wheel are attracted along a linear array of electromagnets to drive the transporting device.

Moreover, transporting devices may utilise technologies other than mechanical/magnetic mechanisms for movement and levitation of transporting devices. For example, air streams may be used. Similar to the popular game of air hockey whereby pucks are levitated on streams of air providing low resistance pseudo-levitation. In this manner, transporting devices may be levitated on air streams and guided in air-hockey style tracks with air-hockey streams which are directable. The air streams may come from the floor which can be channeled through the transporting device stack to make a top transporting device have an air buffer at its top.

Additionally or alternatively, ferritic rods, conductive pegs or variants thereof may be used for a number of purposes with regards to the first embodiment or the second embodiment which will be described below. In particular, transporting devices (according to the first embodiment or the second embodiment) may be suspended from a ceiling by such means so as to aid in relocation of transporting devices. Moreover, such means may be used to provide an accurate location of transporting devices within a horizontal grid. Such means may be used to anchor a transporting device and permit it to apply a force to a neighbouring transporting device (such as dragging and/or lifting). Moreover, ferritic rods, conductive pegs or variants thereof may be used to transfer power and/or communications to/from a transporting device.

The transporting devices described previously may have a number of different uses and be used in many different situations. For example, the transporting devices and clusters thereof may advantageously be used in low-gravity/zero-gravity environments. Therefore, reference herein to X, Y and Z directions and planes are exemplary only and other reference frames can be employed, depending upon the environment and/or orientation of the cluster, for example in a zero-gravity environment, for example orbiting a planet, the z-direction can differ from the z-direction on a surface of a planet. Transporting devices may also be used in vans/ships/fridges/attics/cupboards/corner shops for storing items in a reconfigurable configuration. In one example, transporting devices may be loaded into a van. Whilst the van is moving to a delivery location the transporting devices may reconfigure their physical topology to provide those transporting devices required for the next delivery are located conveniently for example, at the front of the cluster. Transporting devices may be further arranged to concertina to thereby accommodate other transporting devices. In this regard, the item receiving space may open onto any convenient side/top of the transporting device to permit easy access to the contents of the item receiving space.

Each transporting device may be arranged to hold many different goods. Each transporting device can contain different goods within a single row or column of transporting devices. Furthermore, transporting devices can be empty whilst stored in the cluster or can contain items such as parcels or other items for future delivery.

As will be appreciated, the transporting devices are configured to move around the cluster and to perform operations. Operations, in this example, include moving a transporting device from one location within the cluster to another. The transporting devices may be assigned to communicate with the one or more base stations (not shown). The transporting devices are not necessarily all of the same type of transporting device. In this respect, the cluster can comprise different robotic devices, for example transporting devices, with various shapes, designs and purposes, for example, transporting devices can vary in dimensions and volumes occupied.

In this example, the transporting devices have, respectively, radios, digital signal processors, processors, real time controllers, batteries and motors, magnets, sensors, and/or connectors. Some of these can be optional.

Although the transporting devices described previously have been illustrated as formed of bases with walls arranged around the base, it is envisaged that the transporting device may be formed as a container and/or a pallet. Therefore, the transporting device is not limited to a four-walled container but is envisaged to take other forms such as a base only without walls and/or a base with walls which number fewer or greater than four.

With specific regard to the first embodiment described previously, it is envisaged that the transporting device 10 may operate in an active mode whilst the surface 21 is arranged to be passive. In other words, inverting the arrangement described previously of an active surface 21 moving a passive transporting device 10. In this regard, it is envisaged that the mechanisms described with the regard to the surface of the first embodiment may instead be applied to the transporting devices 10 of the first embodiment whilst the mechanisms of the transporting device 10 are applied to the surface 21. For example, the transporting device may comprise a mechanical mechanism to move the transporting device on the surface 21. Additionally or alternatively, the transporting device 10 may comprise a magnetic mechanism such as an electromagnet which is selectively activated whilst the surface comprises, for example, a permanent magnet. In this way, cooperation between the active transporting device 10 and the passive surface 21 permits relocation of the transporting device 10.

With regard to both of the first embodiment and the second embodiment, the above implementations lend themselves well to a warehouse comprising the cluster. In this regard, the cluster may be employed in a warehouse and/or a cluster or a plurality of clusters may constitute warehouses and/or form part of a larger warehouse in an online retail system. However, the skilled person should appreciate that the above system finds applications in other environments, for example within a vehicle or in an aeronautical context, for example in space.

In this respect, the system and apparatus described herein can be scaled to any desired size, for example the cluster could form part of a domestic piece of equipment, such as a refrigerator where an item stored in the refrigerator is selected through a user interface associated with the refrigerator and the item, for example butter, is stored in a transporting device in a cluster in the refrigerator and the transporting device carrying the desired item instructed to be translated to a port for provision to an operator, thereby removing the need to open a door of the refrigerator too often. Alternatively, the cluster could be much larger and disposed within a so-called Materials Handling Equipment (MHE) storage and picking system forming part of an online retail operation.

In such an example, the transporting devices of the cluster of the MHE can contain items being stored such as groceries for example, or could contain customer orders awaiting shipment (which may be held in further containers known as delivery containers held within the transporting devices) or could contain empty delivery containers comprising bags awaiting customer orders being placed therein.

In a further example, there could be two systems associated with each other, a chilled system for storing goods requiring storage in chilled conditions and an ambient system for storing groceries not requiring chilling, such as cereals, tissues, sparkling water, etc. Indeed, a frozen system can be provided for holding frozen goods, such as ice cream, therein.

In other examples, the transporting devices could individually comprise chilling means so that the whole cluster or a region of the cluster need not be chilled. This also allows different transporting devices to be employed to contain goods requiring specific storage temperatures. Indeed, the transporting devices can additionally or alternatively support living organisms, for example plant life and so can be arranged to contain a growing membrane and/or a water reservoir.

Additionally or alternatively, the cluster can be employed to store parcels and/or other packages and can support sequencing of the transporting devices and shipping.

As intimated above, the transporting devices can comprise other services, for example their own power supplies to support for example lighting systems, computing means, heating means, chilling means and/or communication means. The transporting devices can be capable of device-to-device communication via any appropriate means.

Although in some embodiments described above, walls of an environment in which the cluster is disposed are provided, the skilled person should appreciate that in some embodiments, such supporting walls are not required.

In the above example, it is sometimes desirable to move a transporting device to a port where the transporting device is further "processed", for example for picking an item from the transporting device or onward transportation of the transporting device, for example using a conveyor or other mechanism.

It will be appreciated that whilst the system described above is in the context of transporting devices traversing a cluster, the above technique can be applied to any number of systems where a number of moveable items need to be moved across a volume, for example but not exclusively, a three-dimensional structure without interference in as simple yet quick manner as possible. It should also be appreciated that although the above examples have been described in the context of relocation of one or more transporting devices within the cluster, the term "within" is intended to embrace relocation of one or more transporting devices at a peripheral surface of the cluster.

Transporting devices may be suspended from a ceiling with a powered electromagnet on base of each transporting device. Transporting devices may be suspended from wall by having an attraction between a top edge of a transporting device and a potentially active portion of the wall, and a repulsion between a bottom edge of a transporting device and a potentially active portion of the wall.

In is also envisaged that transporting devices which fail inside a cluster may be removed from the cluster by way of the action of neighbouring transporting devices. For example, transporting devices flanking the stricken transporting device may move the stricken transporting device.

In the previously described embodiments, some of the described transporting devices were arranged to follow a track. It is envisaged that the track may be formed by any of RF, magnetic, electrostatic or optical means.

Other mechanisms are envisaged such as toroidal motors which comprise fixed coils arranged in a circle, with fixed magnets arranged inside this in a circle. Such a motor may be used in a mechanical mechanism e.g. cog teeth.

Transporting devices may comprise a magnetic sphere, held in a socket in a transporting device, arranged to drive up an electromagnetic ladder on the side of an adjacent transporting device/wall.

Other principles of movement for the transporting device are envisaged. For example, the transporting device being able to move in one direction but slide due to magnetic interactions in another. Momentum drive may be used by which the principle of rotating weights and their momentum may be used to drive movement in transporting devices.

Moreover, wheels in the bottom of the transporting device may be arranged to transfer power and/or data so that the transporting device can move without other transporting devices being nearby. Similarly, wheels on the corners of the transporting device may be used to transfer power and/or data and which can twist between positions and keep drive through concentric drive axles.

Moreover, each transporting device may comprise a magnetic suspension system (a magnetic bearing). Using such a system the magnetic force may be adjusted to accommodate particular transporting device mass. For example, the heavier the item being transported then the more force may be used to hold the position of the transporting device.

The transporting devices and clusters described previously may be used as a part of a grocery order fulfillment system. In this connection, the cluster may be utilised with at least one peripheral arranged to perform a function in combination with the cluster.

For example, the fulfillment system may further comprise a decant station arranged to provide a location at which manual/automated removal of packaging of inbound products may be effected with the inbound products are placed in transporting devices.

The transporting device may then be stored in the cluster until a time at which they are requested to be used in the fulfillment of an order. To achieve this, the cluster may be used with a picking station at which transporting device storing products are transported together with transporting devices arranged to store a customer's order. In one example, a removable container is located inside the transporting device. At a picking station, manual/automated means may be used to move at least one product from a storage transporting device into a transporting device for storing a customer's order. In one example, the at least one product may be moved into a container located inside the transporting device. After the process of picking has been completed, the storage transporting device may be re-stored in the cluster along with the transporting device arranged to store a customer's order.

As mentioned, in one example, a removable container may be located inside the transporting device for use in receiving products of a customer's order. A load station may be located adjacent to the cluster at which transporting devices are loaded with an empty removable container and then loaded into the cluster.

The cluster may also be used with an unloading station at which transporting devices are located when they have been filled with a particular customer's order (a customer order may comprise one or more different products or varying quantities). At a loading station, the transporting device may be loaded onto a frame suitable for loading onto a van. Alternatively, the transporting device may be loaded directly onto a van for delivery to a customer. Alternatively, a container located inside the transporting device may be removed for loading onto a van whilst the transporting device returns to the cluster. Additionally or alternatively, once the container located inside the transporting device has been removed, the transporting device may be directed to the load station to receive an empty removable container for receiving a customer's order or the transporting device may be directed to the decant station to receive inbound products to be stored in the cluster.

Transporting devices may also be cleaned once returned from a customer location. At a cleaning station, the transporting device may be emptied of any dirt/leftovers and, optionally, cleaned with a solvent e.g. water. After emptying/cleaning the transporting device may be reintroduced into the cluster for use with another order/storage of products. Additionally or alternatively, once the transporting device has been emptied/cleaned, the transporting device may be directed to the load station to receive an empty removable container for receiving a customer's order or the transporting device may be directed to the decant station to receive inbound products to be stored in the cluster. It will be appreciated that references to a van are envisaged to include references to other means of transportation such as trailer trucks, drones, trains etc.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A transporting device arranged to cooperate with a portion of a surface, and the transporting device arranged to cooperate with at least one other transporting device in a cluster with a reconfigurable physical topology, the transporting device comprising:
   an item receiving space;
   a relocating unit configured to provide relocation of the transporting device within the cluster by way of interaction with a portion of the surface; and
   an engagement unit configured to engage with the at least one other transporting device.

2. The transporting device according to claim 1, wherein the transporting device is individually addressable within the cluster.

3. The transporting device according to claim 1, wherein the transporting device is arranged to be driven from within the cluster.

4. The transporting device according to claim 1, wherein the transporting device is arranged to move relative to the at least one other transporting device in the cluster.

5. The transporting device according to claim 1, wherein the transporting device is a container.

6. The transporting device according to claim 1, wherein the relocating unit comprises at least one of:
   a mechanical mechanism;
   a non-contacting mechanism;
   a magnetic mechanism; or
   an electromagnetic mechanism.

7. The transporting device according to claim 6, wherein the magnetic mechanism comprises at least one of:
   a plurality of permanent magnets;
   a plurality of moving magnets;
   a material of a predetermined magnetic permeability; or
   an array of magnets.

8. The transporting device according to claim 3, wherein the mechanical mechanism comprises at least one of:
   wheels;
   cogs; or
   omniwheels.

9. A storage system comprising:
   a surface; and
   a plurality of transporting devices, wherein each transporting device is configured to cooperate with a portion of the surface and each transporting device is arranged to cooperate with at least one other transporting device in the plurality of transporting devices, each transporting device including:
      an item receiving space;
      a relocating unit configured to provide relocation of the transporting device within the cluster by way of interaction with a portion of the surface; and
      an engagement unit configured to engage with the at least one other transporting device,
   wherein the plurality of transporting devices are arranged in a three-dimensional cluster with a reconfigurable physical topology.

10. The storage system according to claim 9, wherein the portion of the surface is configured to relocate at least one of the plurality of transporting devices.

11. The storage system according to claim 9, comprising:
    a controller arranged to determine a path for at least one transporting device of the plurality of transporting devices from a start location to a destination location and to cause movement of the at least one transporting device using the determined path.

12. The storage system according to claim 9, wherein the surface comprises:
    a communication unit arranged to receive at least one instruction.

13. The storage system according to claim 12, wherein the portion of the surface is configured to relocate a transporting device of the plurality of transporting devices within the three-dimensional cluster in response to an instruction received by the communication unit.

14. The storage system according to claim 12, comprising at least one of:
   a pick station disposed adjacent to the cluster and configured to communicate with the cluster;
   a decant station disposed adjacent the cluster and configured to communicate with the cluster;
   a load station disposed adjacent the cluster and configured to communicate with the cluster; or
   an unload station disposed adjacent the cluster and configured to communicate with the cluster.

15. A transporting device configured to cooperate with at least one other transporting device in a cluster with a reconfigurable physical topology, the transporting device comprising:
   an item receiving space;
   a relocating unit configured to permit relocation of the transporting device within the cluster by way of interaction with the at least one other transporting device; and
   an engagement unit configured to engage with the at least one other transporting device.

16. The transporting device according to claim 15, wherein the relocating unit comprises at least one:
   a mechanical mechanism;
   a non-contacting mechanism;
   a magnetic mechanism; or
   an electromagnetic mechanism.

17. The transporting device according to claim 15, wherein the transporting device comprises:
   a communication unit arranged to receive at least one instruction.

18. The transporting device according to claim 17, wherein the relocating unit is configured to relocate the transporting device within the cluster in response to an instruction received by the communication unit.

19. The transporting device according to claim 15, wherein the relocating unit comprises:
   a first magnetic wheel on a first face of the transporting device, the first magnetic wheel configured to rotate in a first direction; and
   a second magnetic wheel on a second face of the transporting device, the second magnetic wheel configured to rotate in a second direction,
   wherein the first direction and the second direction are perpendicular to each other, and
   wherein the first magnetic wheel is configured to interact with a first magnetic track on a face of a first neighbouring transporting device and the second magnetic wheel is configured to interact with a second magnetic track on a face of a second neighbouring transporting device.

20. The transporting device according to claim 19, wherein the transporting device comprises:
   a third magnetic track on a third face of the transporting device, the third magnetic track configured in the second direction; and
   a fourth magnetic track on a fourth face of the transporting device, the fourth magnetic track configured in the first direction.
   wherein the third magnetic track is configured to interact with a third magnetic wheel on a face of a third neighbouring transporting device, and
   the fourth magnetic track is configured to interact with a fourth magnetic wheel on a face of a fourth neighbouring transporting device.

21. The transporting device according to claim 4, wherein the first face of the transporting device includes a fifth magnetic track, the second face of the transporting device includes a fourth magnetic track, the third face of the transporting device includes a first magnetic wheel, and the fourth face of the transporting device includes a second magnetic wheel.

22. A storage system comprising:
   a plurality of transporting devices, wherein each transporting device is is configured to cooperate with a portion of the surface configured to cooperate with at least one other transporting device in the plurality of transporting devices, each transporting device including:
      an item receiving space;
      a relocating unit configured to provide relocation of the transporting device within the cluster by way of interaction with a portion of the surface; and
      an engagement unit configured to engage with the at least one other transporting device;
   wherein the plurality of transporting devices are configured in a three-dimensional cluster with a reconfigurable physical topology.

23. The storage system according to claim 22, comprising:
   a controller configured to determine a path for at least one transporting device of the plurality of transporting devices from a start location to a destination location and to cause movement of the at least one transporting device using the determined path.

24. The storage system according to claim 22, comprising at least one of:
   a pick station disposed adjacent to the cluster and configured to communicate with the cluster;
   a decant station disposed adjacent the cluster and configured to communicate with the cluster;
   a load station disposed adjacent the cluster and configured to communicate with the cluster; or
   an unload station disposed adjacent the cluster and configured to communicate with the cluster.

25. A method of relocating a transporting device arranged in a cluster with a reconfigurable physical topology, the method comprising:
   causing the transporting device to cooperate with at least one other transporting device in the cluster;
   relocating the transporting device within the cluster by way of interaction between the transporting device and the at least one other transporting device; and
   engaging the transporting device with the at least one other transporting device.

* * * * *